US005754434A

United States Patent [19]

Delfer et al.

[11] Patent Number: 5,754,434

[45] Date of Patent: May 19, 1998

[54] CONTINUOUS FORMS INTEGRATED SYSTEM

[75] Inventors: Frank W. Delfer, Loomis; Charles B. Clupper, El Dorado Hills; Steven L. Mulkey, Cameron Park; Jonathan D. Emigh, Somerset, all of Calif.

[73] Assignee: International Billing Services, Inc., Rancho Cordova, Calif.

[21] Appl. No.: 498,547

[22] Filed: Jul. 5, 1995

[51] Int. Cl.[6] .......... G06F 17/00

[52] U.S. Cl. .......... 364/478.11; 364/478.08; 270/58.06

[58] Field of Search .......... 364/478.07–478.12, 364/464.02, 464.03, 478.13–478.15; 270/1.02, 58.01, 58.06, 1.01, 58.23; 53/493, 266.1, 284.3, 154

[56] References Cited

U.S. PATENT DOCUMENTS

| | | | |
|---|---|---|---|
| 2,114,814 | 4/1938 | Rosebush | 53/569 |
| 3,911,862 | 10/1975 | Lupkas | 118/7 |
| 4,733,359 | 3/1988 | Luperti et al. | 364/478 |
| 4,733,856 | 3/1988 | Gunther | 270/1.1 |
| 4,734,865 | 3/1988 | Scullion et al. | 364/478 |
| 4,798,040 | 1/1989 | Haas et al. | 53/460 |
| 4,800,505 | 1/1989 | Axelrod et al. | 364/478.09 |
| 4,922,689 | 5/1990 | Haas et al. | 53/569 |
| 5,027,587 | 7/1991 | Ramsey | 53/493 |
| 5,039,075 | 8/1991 | Mayer | 270/1.1 |
| 5,067,088 | 11/1991 | Schneiderhan | 364/478 |
| 5,207,412 | 5/1993 | Coons, Jr. et al. | 270/1.1 |
| 5,220,770 | 6/1993 | Szewczyk et al. | 53/493 |
| 5,245,547 | 9/1993 | Ramsey | 364/478.11 |

FOREIGN PATENT DOCUMENTS

| | | | |
|---|---|---|---|
| 1538066 | 1/1979 | United Kingdom | B65H 39/07 |

*Primary Examiner*—Reba I. Elmore
*Assistant Examiner*—Steven R. Garland
*Attorney, Agent, or Firm*—James M. Ritchey

[57] ABSTRACT

A bulk mailing system for controlling and processing mailing envelopes containing selected combinations of documents and inserts comprises a programmable computer controller, a plurality of printers, a controller interfaced collator for merging document pages from the printers, a document folder, and a controller interfaced inserter for filling the mailing envelopes with the selected combinations of document pages and inserts. Associated with the inserter are devices for marking the edges of envelopes with desired information indicia and for wetting and sealing the flaps of selected envelopes. Further, the controller verifies that the correct document forms, inserts, and mailing envelopes are matched and inserted into the mailing envelopes. Additionally, the controller selects and includes any desired combination of enclosures and inserts in the mailing envelopes.

28 Claims, 31 Drawing Sheets

CONTINUOUS FORMS INTEGRATED SYSTEM

BACKGROUND OF THE INVENTION

1. Field of the Invention

A billing system is provided that produces a high number of mailable final bill packets per hour. More usually, the billing system disclosed is monitored and regulated by a controller and includes a document or billing statement supplying device or printer and normally a plurality of high-speed printers, a collator for merging the printed bill sheets of each of the high-speed printers, a folder for folding the collated sheets into an appropriate size and shape, and an inserter for placing the merged and folded bill sheets and other selected inserts (inserts include return mail envelopes and the like) into a mailing envelope. Further encompassed in the subject system are additional means under oversight by the controller including means for verifying that the correct forms and envelopes are utilized, means for selecting and including the enclosures and inserts in the mailing envelope, means for marking the edges of the mailing envelopes with desired information indicia, and means for wetting and sealing the envelope flaps.

2. Description of the Background Art

Bulk mailers have employed various techniques to mail their items with as much speed and efficiency as practicable at the time. Bulk mailers usually rely on a very thin profit margin per mailed piece and are successful only when they maximize their bulk mailing operations for processing speed, reliability, postal discounts, and the like.

In mailing a large number of items, several standard individual processing elements are required such as means for generating documents, means for folding the documents, and means for placing the documents in a mailing envelope. Devices that function for each of these needed processing elements exist, but are not particularly efficient at what they do nor have the processing elements been integrated into an efficient, interacting, and controllable complete system.

Numerous standard printers exist and include DELPHAX, SIEMENS, XEROX, IBM, and like devices that print on one (simplex) or both (duplex) sides of sheets. Also, a PHILLIPSBURG inserter is a standard apparatus for filling mailing envelopes with incoming documents and inserts that are stored in various hoppers.

SUMMARY OF THE INVENTION

An object of the present invention is to provide an integrated bulk mailing system that permits a massive number of mailable pieces to be generated per hour with a minimum amount of operator involvement.

Another object of the present invention is to supply an integrated bulk mailing system that includes means for monitoring multiple critical operational steps.

A further object of the present invention is to produce an integrated bulk mailing system that includes a controller, a plurality of document producing devices, a document collating apparatus, and an inserter for filling a mailing envelope with desired documents and other items.

Still another object of the present invention is to disclose a sophisticated bulk mailing system that integrates several processing elements into a complete whole that is monitored and regulated by an overseeing controller or computer.

Yet a further object of the present invention is to create an integrated bulk mailing system that efficiently links together an overseeing controller with a plurality of document generating devices, a document collating means, a folder, and an inserter having an envelope wetting and sealing means whose operation is directed by the controller and an apparatus for marking the edges of items with information containing indicia with means for verifying that proper forms and envelopes are utilized and means for selectively including specified enclosures (a document and inserts) into any mailed envelope.

Disclosed is a bulk mailing system for controlling and processing mailing envelopes. Each mailing envelope contains enclosures constituting a combination of inserts and a billing document. The billing document has at least a summary billing page and, if selected, one or more detailed billing pages. Usually a minimal configuration of the subject system is comprised of a programmable computer controller, a simplex printer for printing summary billing information on one side of the summary billing page, a duplex printer for printing detailed billing information of both sides of any selected detail billing pages, a controller interfaced collator for merging into the billing document the summary billing page with any selected detailed billing pages, a folder situated after the collator for folding the billing document, a controller interfaced inserter positioned after the folder for filling each of the mailing envelopes with the selected combination of the inserts and billing document, controller interfaced means associated with the inserter for wetting and sealing flaps of selected mailing envelopes, and controller interfaced means associated with the inserter for marking edges of the mailing envelopes with desired information indicia. Additionally, the subject bulk mailing system further comprises means for verifying that correct document forms, inserts, and mailing envelopes are inserted into the mailing envelopes. Further, the subject bulk mailing system further comprises means for selecting the combination of enclosures in the mailing envelopes.

Other objects, advantages, and novel features of the present invention will become apparent from the detailed description that follows, when considered in conjunction with the associated drawings.

DESCRIPTION OF THE PREFERRED EMBODIMENT

Referring now to FIGS. 1–32, there is shown a preferred embodiment of an integrated system for efficiently processing bulk mailing items. Typically, a bulk mailing item is a mailing envelope that contains selected enclosures such as inserts (such as advertisements, fliers, return envelopes, coupons, and the like) and a document having one or more sheets or pages (often single or multiple page billing statements with a summary billing page printed on one side of a suitable form and one or more detail billing pages printed on both sides of suitable forms).

For clarification purposes, and not by way of limitation, a general overview will be presented and then a more detailed discussion will be presented on some of the critical elements of the subject system. Generally, the subject bulk mailing system for controlling and processing mailing envelopes, with each mailing envelope containing enclosures selected from combinations of inserts and a document having one or more pages, comprises a controller, preferably a programmable computer. Also included is at least one document page supplying device that is usually a high-speed printer and more usually at least a simplex printer for printing information on one side of a document sheet and a duplex printer for printing information of both sides of a document sheet. The document is often a bill having a one sided summary billing page and one or more two sided detailed billing pages.

Further comprising the subject invention is a controller interfaced collator for merging supplied document pages. Clearly, if the document pages are supplied by more than one the document page supplying device, the collator merges the page streams into one document for inserting into a mailing envelope. Receiving and forwarding the documents from the collator is a folder that folds the documents into appropriate sized structures for fitting within the upcoming mailing envelopes. Following the folder is a controller interfaced inserter for filling the mailing envelopes with the enclosures. Ordinarily, the inserter is fitted with controller interfaced means for marking the edges of mailing envelopes with desired information indicia and controller interfaced means for wetting and sealing the flaps of selected mailing envelopes.

Preferably, the subject system contains several added features including means for verifying that correct document forms, inserts, and mailing envelopes are inserted into the mailing envelopes and means for selecting the exact enclosures that will be placed in the mailing envelopes.

Figure 1:
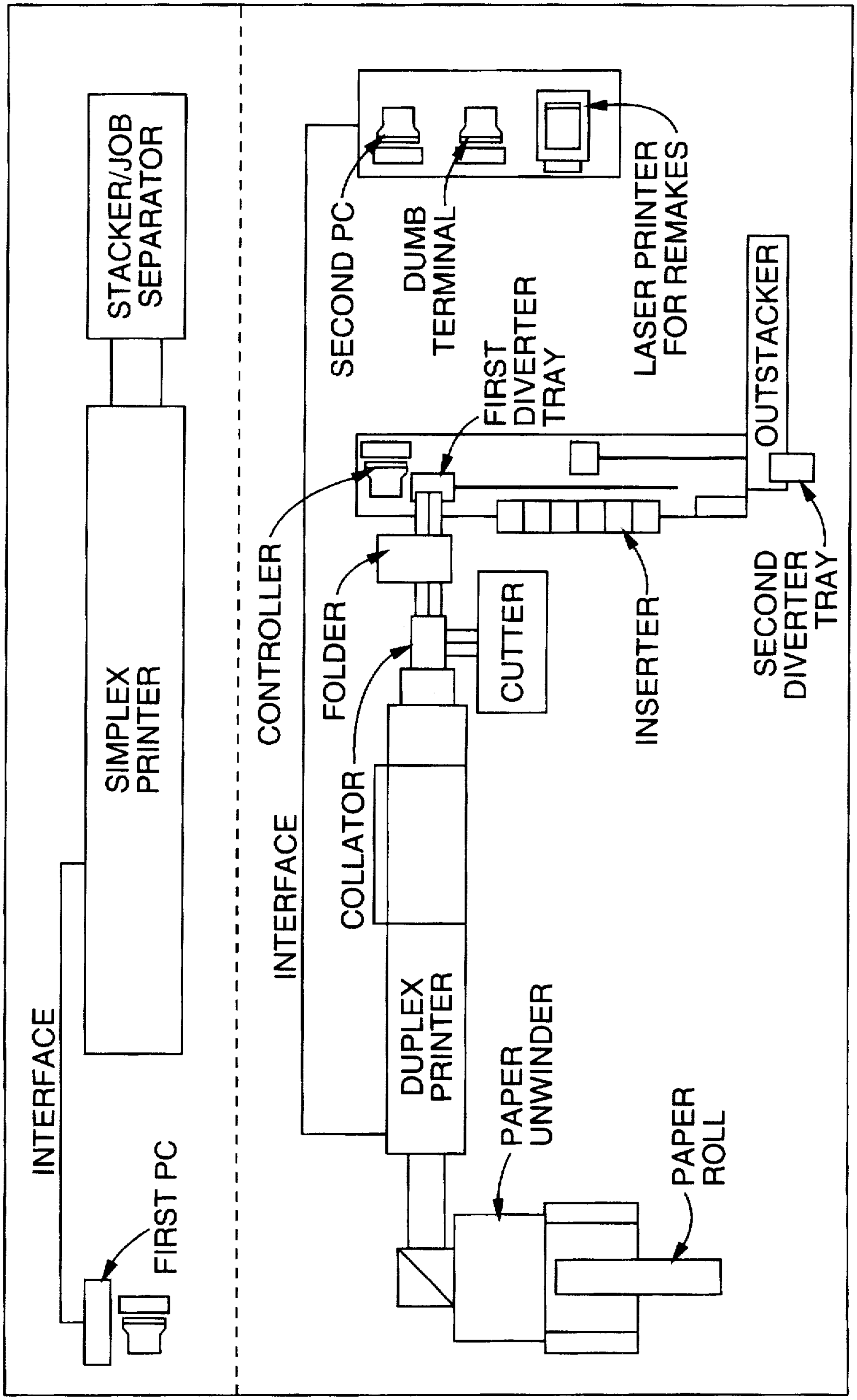
FIG. 1 is a pictorial diagram of the subject invention using exemplary simplex and duplex printer notation.

See FIG. 1 for a more specific description of the subject invention. Typical, a user of the subject invention is an organization that bills consumers for services rendered by a service provider. The bills generated by the billing organization are often single or multiple page bills. The subject system preferably exploits the high performance of at least two separate laser or equivalent performance printers (usually one is a simplex printer such as a SIEMENS 2300 printer and the other is a duplex printer such as a DELPHAX 3001E printer, however, any combination of simplex and duplex printers is considered within the realm of this disclosure) to achieve high production rates of up to about 10,600 bills per hour (larger rates are considered within the realm of this disclosure, however, existing rates with the stated printers are currently in this 10,600 bill per hour range).

A controller oversees and regulates the operation of the subject system. Usually, the controller is a programmable computer (often a personal computer, PC, such as a 486, PENTIUM, or similar CPU equipped unit) that, among other processes, facilitates the complex collation of the two high-speed printer paper paths. The controller also directs the insertion of the collated bill pages and inserts into mailing envelopes. A program in the controller PC interfaces with and monitors numerous system sensors and checks for paper jams within the paper transferring components of the subject invention.

Usually, an operator oversees the functioning of the system. The operator receives system status and error conditions, as well as corrective instructions, through the program utilized by the controller.

Generally, the billing organization receives from the service providers billing image data concerning customer usage of a particular service which is then transferred to or stored in a central information computer CIC. After the billing organization has received and stored the billing image data from the service provider, a suitable processor (i.e. a Silicon Graphics UNIX Processor) augments the data within the central information computer with printable and non-printable post-processing information (e.g., insertion plan, number of sheets, bill identification information, and the like). For illustrative purposes only, the exemplary system will be described in terms of a first or simplex printer and a second or duplex printer, however, any combination of simplex with simplex, simplex with duplex, or duplex with duplex printers is acceptable. Clearly, when the subject system utilizes other than the simplex to duplex printer arrangement appropriate variations in suitable operation techniques are employed such as selecting suitable paper and the like. Thus, an exemplary system comprises a first PC at a first or typically a simplex printer that downloads summary page and bar code data from the central information computer processor. A similar second PC at a second or typically a duplex printer downloads detail sheet and post-processing data from the central information computer. Suitable programs convert and transmit the data stream from the first and second PCs to their respective printers via appropriate interfaces.

For example with the illustrative simplex to duplex arrangement of printers, the simplex printer generates the cover sheets (summary bill pages on forms that match a particular service provider's demands such as company logos, general information, and the like) in batch mode on a continuous form stack of tractor-fed paper which are fed to a stacker/job separator (such as a HUNKELER stacker/job separator). Before starting a print job with the subject system, an operator loads the stack of simplex-printed cover sheets (or for other types of printers suitable sheets) into the system's cutter (such as a BOWE cutter) which separates the continuous paper stack into separate sheets.

The operator controls and monitors the subject system through the controller PC. A suitable network (ETHERNET or the like) links the subject controller PC to the exemplary duplex printer. To start a print job, the operator usually enters the job number and optionally, if not downloaded by the associate computer holding this information, the job information (e.g., insert hopper assignments and envelope codes that are utilized by the means that specifically selects and verifies inserts and forms) into a configuration screen at the subject controller PC. When the print job starts, billing and post-processing data are sent to the duplex printer, from which post-processing data propagate through the subject system. The operator uses the second PC (also interfaced with the duplex printer) to process remakes of bill pages (necessary when certain mistakes are detected) with an additional printer (often an HP LaserJet 4Si printer or the like). Since the second PC is interfaced with the duplex printer, remakes also can be processed in batch mode on the duplex printer. A "dumb" terminal (usually located next to the second PC for operator easy access) connects directly to a computer (also usually UNIX-based) inside the duplex printer, and is used only for printer control.

The duplex printer is usually supplied with a continuous roll of paper that is fed into the printer via a paper unwinder. As the duplex printer prints detail sheets (often both sides of pages), a bar code reader at the cutter identifies a previously printed cover sheet. Software verifies that it corresponds to the detail sheets being printed by the duplex printer. As the last detail sheet of a bill emerges from the duplex printer, the cutter trims the cover sheet to size (removing the bar code) and sends the cover sheet into a tray within the collator. The detail sheets for each cover sheet accumulate in another tray of the collator. When the system controller has identified that a complete bill document is in the collator, a kicker in the collator sends the bill document (with one or more bill pages) into the folder's transport belts. The folder transport belts then deliver the complete bill to the folder (typically a MBO folder).

The folder folds the bill document (in half or in some other configuration) and delivers the folded bill via transport belts to the inserter (preferably a PHILLIPSBURG) insert track. If the bill document did not fold or collate properly, a diverter mechanism sends the bill into a diverter tray.

Once the folded bill document is in the inserter's insert track, the system's controller uses insertion plan data (propagated electronically with the bill) to select the appropriate inserts to go with each bill document within the mailing envelope. After the bill document successfully completes its course past the insert hoppers, the mailing or sending envelope is opened (usually by compressed air). Then, as the inserter slips the bill document and inserts (including any return envelope) inside, a bar code reader identifies the return envelope, if any, and verifies (with data keyed in at the job configuration screen or downloaded electronically from an associated computer holding the required data) that it is the right one for the bill document. Another bar code reader later verifies that the appropriate mailing envelope was used. If either envelope (return or mailing) does not match the keyed or downloaded data, the system diverts the packet at the outstacker to a diverter tray. The two bar code readers (with any additional readers), the operator-keyed or downloaded job configuration data, and the controller comprise the forms and envelopes verification means of the subject system.

With forms and envelopes verification process completed, the inserter seals the sending envelope and marks it on its edge, if appropriate (e.g., to indicate tray boundary, or for quality control). Finally, the filled mailing envelope is sent (usually by an envelope eject roller) either to the diverter tray above the outstacker (if it failed forms and envelopes verification procedure, if selected for additional quality validation, or for improper bill makeup such as missed or doubled inserts and the like) or to the outstacker, where the operator collects the results into mailing trays and sends the trays to further processing areas.

Figure 2:
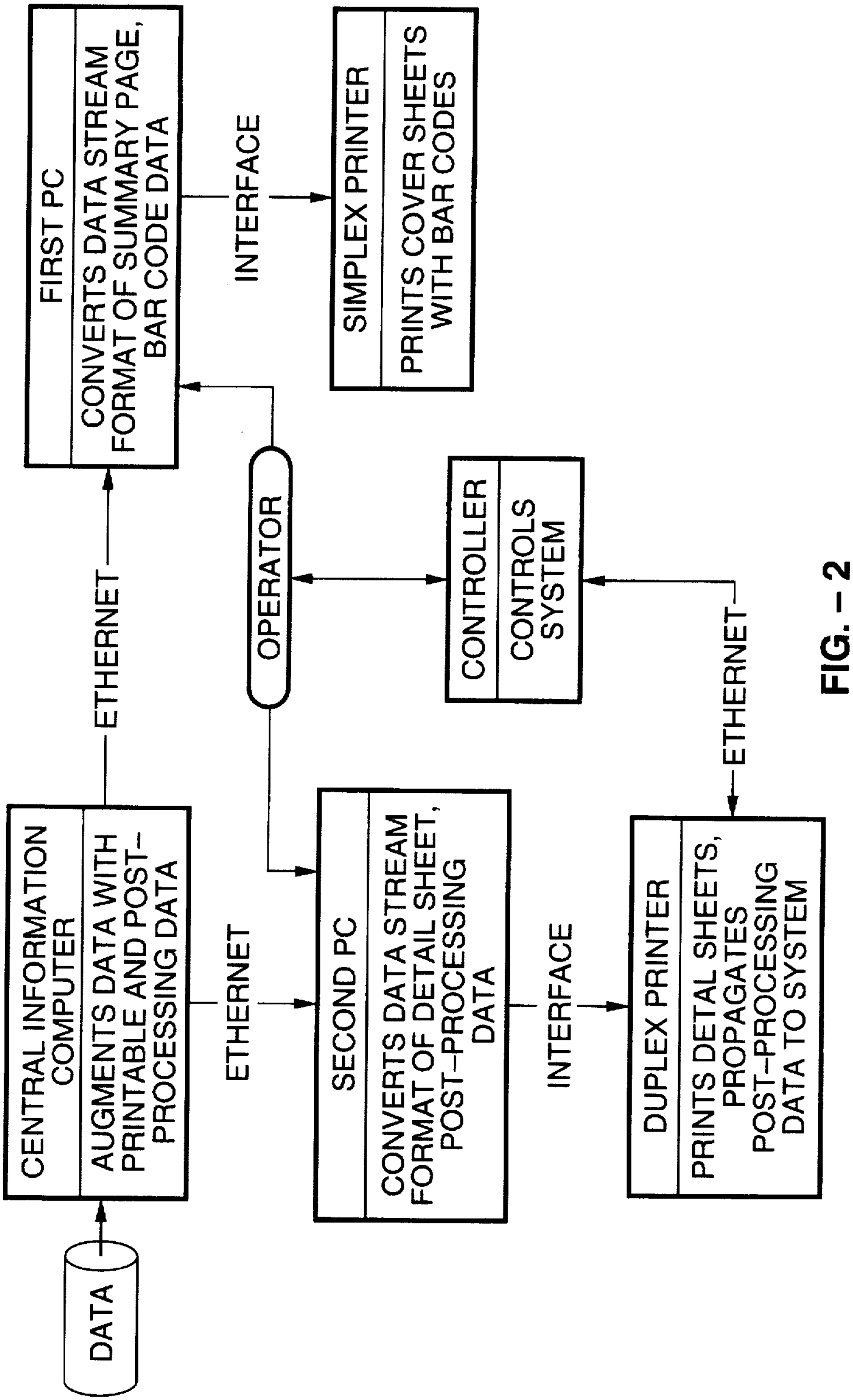
FIG. 2 is a block diagram for data flow and control of the subject invention using exemplary simplex and duplex printer notation.
Figure 3:
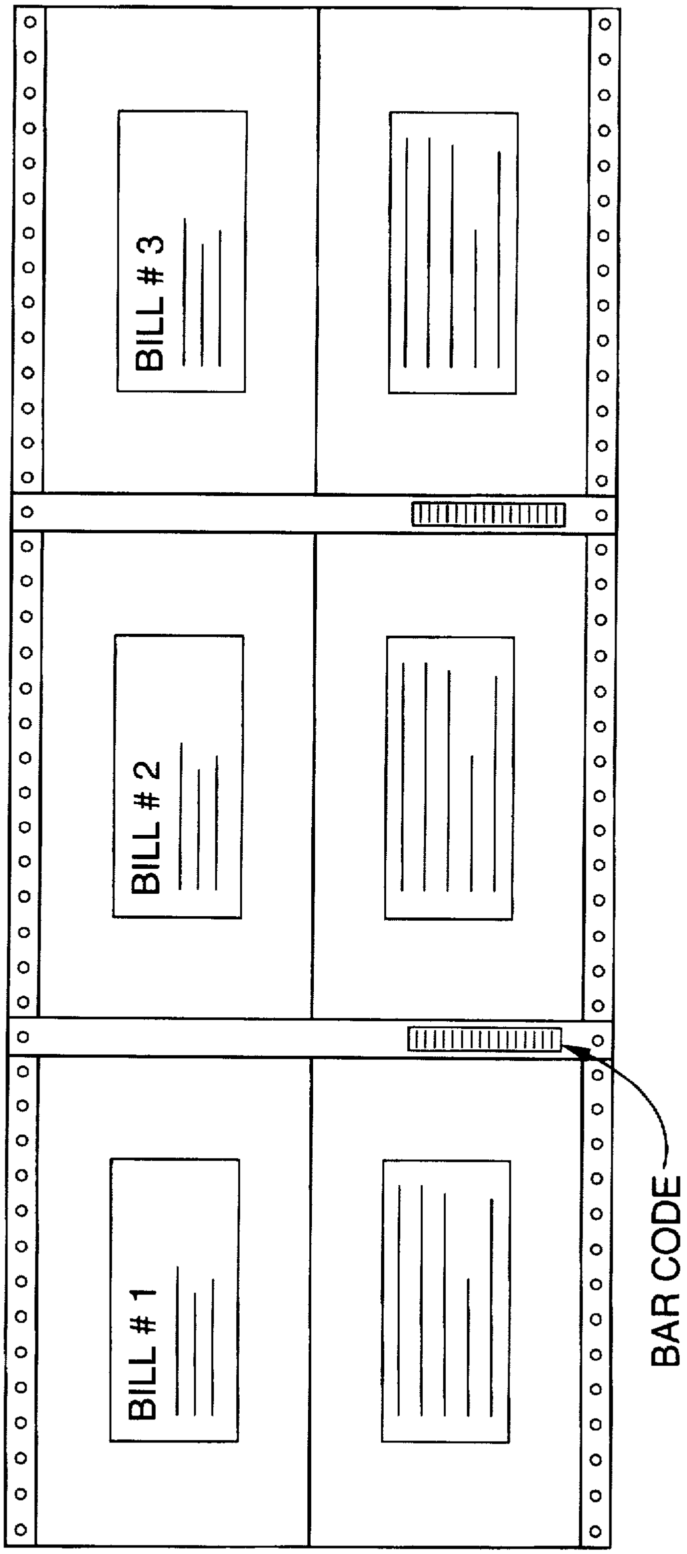
FIG. 3 is a pictorial diagram for billing coversheets with associated bar codes for the subject invention.

FIG. 2 illustrates the general flow of information for the subject system. Generally, an ETHERNET network carries billing and bar code data from the processor in central information computer to the first PC at the first or exemplary simplex printer. Likewise, an ETHERNET network usually carries billing and system data (printable and non-printing) from the processor in central information computer to the second PC at the second or exemplary duplex printer.

The central information computer (which may be one or several computers interconnected by direct and indirect means) augments billing image data with post-processing information (e.g., insertion plan). When an operator starts a batch job on the first or exemplary simplex printer, the processor in central information computer downloads summary page and bar code data to the first PC at the simplex printer. The format of the data stream from the central information computer may need to be altered by an appropriate program to a form compatible with the first PC which sends the reformatted data to the first or exemplary simplex printer. These cover pages later are loaded into the cutter for later collation with the detail sheets.

When an operator starts a print job, the processor in the central information computer downloads detail sheet and post-processing data to the second PC at the second or exemplary duplex printer. As with the first or exemplary simplex printer, a suitable program converts the data stream format and sends the printable data to the second or exemplary duplex printer. Printable data exit the system in the form of printed bill documents; the system uses post-processing data to control and monitor the printing, insertion, and envelope marking processes. If any bills require remakes, the system operator inputs the bill sequence number into the second PC; an appropriate printer in the system prints remade bills. The system operator also can process remakes directly on the duplex printer in batch mode.

FIG. 2 depicts that the necessary printing job information arrives at the first PC usually via ETHERNET and, after conversion, an appropriate interface carries the data to the first or exemplary simplex printer. Similarly, the necessary printing job information arrives at the second PC via ETHERNET and, after conversion, an appropriate interface carries the data to the duplex printer.

As depicted in FIG. 2, the central information computer augments original billing information supplied by the service providers with both printable and post-processing data. The first PC (usually an IBM-compatible computer with, for example, a 486DX2 CPU running at 66 MHz) at the first or exemplary simplex printer downloads cover sheet (summary billing document page) and bar code data from the central information computer. Typically, a bar code number is composed of a "job type" flag indicating the general nature of the particular billing, an assigned bill sequence number, and a bill's file number ("summary only" (no additional detail pages needed) print jobs use bar codes composed of different information). Together, they form a unique number, which the subject system uses to later collate cover summary sheets and detail sheets. After converting the data stream format, if necessary, the first PC transmits the data to the first or exemplary simplex printer.

The first or exemplary simplex printer prints the cover sheets (with bar codes) in batch mode on a continuous form stack of tractor-fed paper. Usually, it presents the cover sheet information in "lazy portrait" mode (see FIG. 3). As the paper exits the printer, an apparatus (for example a Hunkeler EFM Stacker/Job Separator or selected device for other purposes) refolds and restacks it. Any cover sheet remakes are spliced back into the stack, so that the cover sheets remain in a continuous form stack. The continuous form stack is necessary for later integration with the detail billing pages in the subject system's collator.

Generally, an ETHERNET network or equivalent carries data from the central information computer to the first PC, where appropriate and standard software converts the data stream format into a suitable form. Usually, a standard BUS & TAG interface then carries the data to the first or exemplary simplex printer.

Usually, the subject controller is a PC or equivalent (for example, an IBM-compatible computer with a 486DX CPU running at a suitably high Mhz value) that runs UNIX-based processes to control drivers, which in turn control the various components of the subject hardware. The processes (listed in FIG. 4) are described more in detail below. The subject controller PC receives control data (e.g., insertion plan, bill ID, and the like) from another UNIX-based computer inside the second or exemplary duplex printer.

Currently, by way of example and not by way of limitation, the console program running on the subject controller PC is an X-Windows UNIX shell, giving the operator a graphical user interface (GUI) with which to control and monitor the subject system. The subject software gives priority to "downstream" processes; that is, if a paper jam develops in the collator, any bills already in the folder and the inserter (downstream) finish processing their current cycle before the system halts. When problems arise (e.g., a paper jam) and the system halts, the console program displays a series of "dialog boxes" on the subject controller PC's monitor that tell the operator what went wrong, as well as step-by-step instructions on how to correct the error and restart the print job.

The subject controller PC receives post-processing data from the duplex printer's computer via, usually, ETHERNET. Appropriate and standard PC boards provide the interface between the application drivers and the system hardware. The X-Windows console program interfaces with the UNIX processes via appropriate facilities.

In particular and as indicated above, the central information computer augments original billing information with both printable and post-processing data. The post-processing data includes such items as the total number of pages in the bill, the insertion plan for the bill (exactly what inserts are to be introduced into a mailing envelope with the billing document), a unique sequence number for matching bar code data, and other information.

If problems with the subject system result in the need for bill remakes, the operator enters each bill number at the second PC terminal; typically an HP LaserJet 4Si duplex printer or equivalent at the terminal prints the required cover sheet and detail sheets. Although an automated system is contemplated to be within the realm of this disclosure, usually, the operator then manually collates, folds, and inserts the bill into an envelope along with the appropriate inserts. An alternate method of processing remakes involves printing the cover and detail sheets on the second or exemplary duplex printer in batch mode, then manually collating, folding, and adding inserts to the remade bills.

An Ethernet network carries data from Information Systems to the VIP PC, where Emtex VIP software converts the data from an AFP data stream format to IPDS format. A BUS & TAG interface then carries the data to the printer. For remakes, a standard parallel printer cable connects the LaserJet printer to the VIP PC.

Figure 4:
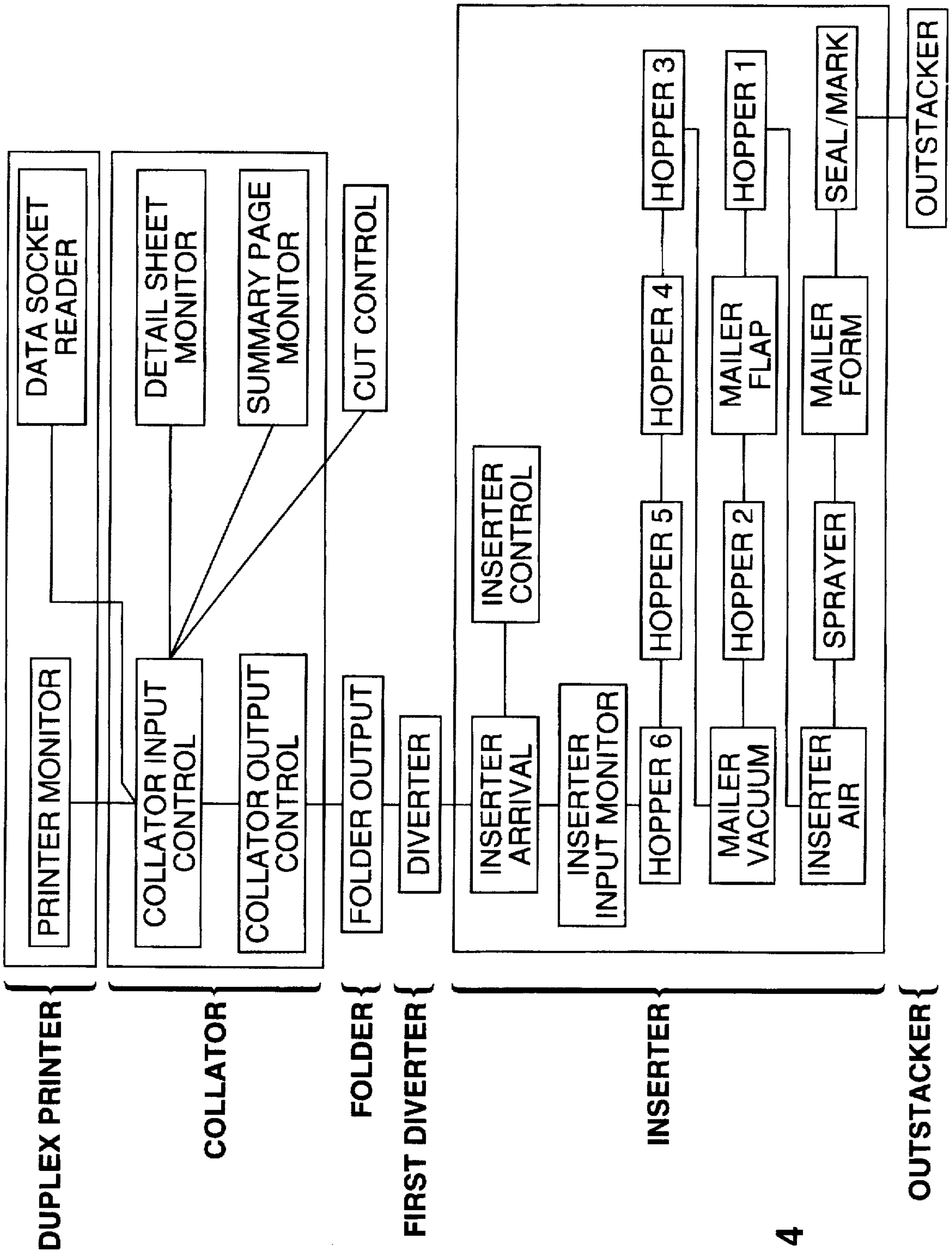
FIG. 4 is a block diagram for subsystem application data flow of the subject invention using exemplary duplex printer notation.

As appropriately formatted data (particular printers often require incoming data to be in a required format for recognition and suitable standard software is readily available or can be written for this process) enter the computer (often UNIX-based) inside the second or exemplary duplex printer, the printer prints detail sheet data while the computer sends post-processing data to a "data socket reader" process in the subject controller PC (see FIG. 4). However, the subject controller PC usually receives the information six to ten seconds before the billing statement emerges from the first or exemplary simplex printer, due to post-printing processes (e.g., scrapping, fusing, cutting, and the like). So, the post-processing data remain in a software queue in the subject controller PC until the printer kicks out the bill's first detailed sheet. The "data socket reader" process collects the post-processing data for each bill and loads the data into a circular buffer in shared memory, where other processes can access it.

As the second or exemplary duplex printer prints, a printer monitor process: a) checks the second or exemplary duplex printer status and relays the information to the controller system; b) transmits a "sent pulse" message to a collator input control process whenever a sheet is printed; and c) transmits a "last sheet" message to the collator input control process when the last sheet of a particular bill is printed. The printer monitor process interfaces with other processes via standard message transfers, semaphores, and shared memory.

Generally, as the collator input control process receives each "sent pulse" message from the printer monitor process, it communicates that information to a detail sheet monitor process; if the "sent pulse" is for the bill's last detail sheet, the collator input control process also alerts summary page monitor and cut control processes. The collator input control process supervises collation of the bills and, in the case of errors, exerts control on the printer.

The detail sheet monitor process controls a set of air nozzles that direct compressed air onto each sheet as it emerges from the second or exemplary duplex printer into the collator; this helps sheets stack in the collator properly. Sensors in the collator notify the detail sheet monitor process if a sheet does not enter the collator properly, resulting in a system halt. Should that occur, the operator manually clears the collator and restarts the print job, remaking any affected bills later.

At the same time a bill's last detail sheet emerges from the second or exemplary duplex printer, its cover sheet (after being printed by the first or exemplary simplex printer and from the cutter via a cut control process, discussed below) enters the collator. Sensors in the collator notify the summary page monitor process if a cover sheet does not enter the collator properly, resulting in a system halt.

After the second or exemplary duplex printer prints the final detail sheet of a particular bill document, the collator input control process sends a "bill ready" message to the collator output control process. The collator output control process lifts a collator stopper and actuates the kicker, sending the collated bill document into transport belts, where the cover and detail sheets merge. Sensors in the collator check to make sure that each bill document leaves the collator properly. If the sheets take too long to clear the collator, or if a sheet was left behind, an error flag sets and the system halts. Otherwise, the process sends a "bill en route" message to the folder output process controlling the folder.

The second or exemplary duplex printer's transport belt system delivers cut pages to the collator. Transport belts deliver cut pages from the cutter to the collator and carry the assembled bill from the collator to the folder.

The collator input control, detail sheet monitor, summary page monitor, and collator output control processes interface with other processes via standard message transfers, semaphores, and shared memory.

The cutter is utilized by the subject system as an intermediate holding location of the summary cover sheets between the first or exemplary simplex printer and the collator. Before starting a print job, the operator loads the continuous form stack of the appropriate cover sheets (printed earlier on the first or exemplary simplex printer) into the cutter, preferably a BOWE 310 type device. As the last detail sheet for a bill document emerges from the second or exemplary duplex printer, the cut control process receives a message. The cut control process controls the cutter, as well as the bar code reader located inside. As the bar code reader identifies the bar code on the cover page, the process compares the bar code number with bill information stored in shared memory. If they match, the cutter trims the cover sheet and ejects it into the collator just as the last detail sheet arrives. If they do not match, an error flag sets and the system diverts printed detail sheets until the bar codes "resynchronize." If the bar code reader cannot read a bar code, the cutter still ejects the cover sheet into the collator, but the system diverts the collated bill. If two consecutive no-reads occur, the system diverts the bills and halts. Sensors in the cutter notify the cut control process if the cover sheet does not leave the mechanism properly or is mis-cut; these errors also result in a system halt.

Transport belts deliver cut pages from the cutter to the collator. The cut control process interfaces with other processes via standard message transfers, semaphores, and shared memory.

When the folder output process receives a "bill en route" message, it uses sensors: a) to make sure the collated bill passes successfully from the transport belts to the folder, preferably a MBO B26 or equivalent device; b) that the folder correctly folds the bill in half or other appropriate configuration; and c) that the folded bill properly exits the folder. If the folder jams, an error flag sets and the system halts. If the bill folds incorrectly, the folder output process alerts the diverter process via a suitable message.

The folder output process also calculates a "motion profile" for each bill. Since some bills take longer to print than others (due to the varying number of pages), the inserter cannot efficiently run at a constant speed. The inserter control process uses the motion profile to control the speed of the inserter through a motor controller card. The folder output process then chooses between executing the motion profile itself, or delaying the bill and letting the inserter arrival process execute the motion profile (the folder output process usually executes the motion profile only on one- or two-page bills, but see details below).

Transport belts deliver the assembled bill from the collator to the folder, and then deliver the folded bill from the folder to the inserter or to the diverter mechanism. The folder output control process interfaces with other processes via standard message transfers, semaphores, and shared memory.

The subject system diverts folded bills before they reach the inserter if they are incorrectly folded or if the inserter halts. If the diverter process receives a "bad fold" message from the folder output process, the diverter process sends the bill into the diverter tray mounted and purges the bill's data from shared memory. Usually, the operator remakes any bills with bad folds. Also, if the inserter stops for any reason, the inserter control process sets a flag telling the diverter process to send en route bills into the diverter tray, holding them for the operator to restart the system. The diverter process interfaces with other processes via standard message transfers, semaphores, and shared memory.

Concerning the general procedures of the inserter, if the subject system does not divert the bill document, flow control passes to the inserter arrival process. If the folder output process did not already execute the motion profile for the bill, the inserter arrival process executes it as the bill reaches the inserter.

A sensor at the inserter's arrival station notifies the process if a folded bill document lands incorrectly in the inserter's insert track. If the folded bill does not land correctly in the insert track, the inserter arrival process alerts the inserter control process, which in turn halts the system. Preferably, the inserter control process has jurisdiction over all paper jams and hardware problems on the inserter; it either stops the inserter when problems occur, or, if possible, diverts problem bills to the diverter tray proximate the outstacker. The process also monitors the inserter's control buttons (e.g., reset, jog, etc.), as well as its motor shaft speed and angle.

If the folded bill lands correctly in the insert track, the inserter arrival process alerts the inserter input monitor process with a message. As the inserter moves the bill along the insert track to the "blank" hopper station, the inserter shaft rotates. When it reaches an angle denoting that the bill has left the arrival station, the inserter input monitor process checks a sensor at the blank hopper station. If the sensor does not detect a bill, the inserter control process halts the inserter; otherwise, the bill (and flow control) passes to the first insert hopper.

All of the insert hopper processes (usually six with a PHILLIPSBURG inserter and this six hopper example will be utilized to present the subject system below) are activated when the inserter shaft achieves a particular radial angle. When the angle occurs, each hopper process checks for a message from the previous process indicating that a bill is present at its respective hopper. If a bill is present, the process checks the insertion plan in shared memory; the insertion plan determines whether or not an insert is selected. If the hopper is included in the insertion plan, the process activates the hopper's vacuum system or equivalent. This pulls the insert down into the path of the inserter arm, which grasps the insert's edge.

Once a hopper's vacuum is on, the hopper process "sleeps" until another pre-set shaft angle occurs, at which time the process turns off the vacuum and lets the inserter arm carry away the insert. Then the process sleeps until a third inserter shaft angle occurs; at that time, the process checks sensors to make sure the inserter arm picked up one (and only one) insert. The hopper process also monitors when an inserter arm picks from a hopper that is not enabled for the insertion plan. Depending on the error, the inserter control process (via the hopper process) may halt the inserter, pick the insert at another hopper (depending on the insertion plan), or flag the bill and divert it into the tray above the outstacker.

As the bill passes through the hopper processes for exemplary hoppers 6, 5, 4, and 3 in order, the message indicating the bill's presence "moves" with it. When the bill moves to hopper 2, the hopper 3 process transmits the message to the mailer vacuum process, which in turn sends it to the hopper 2 process. At a pre-set inserter shaft angle, the mailer vacuum process activates the vacuum beneath the mailing (sending) envelope hopper, pulling the envelope into the parallel inserter track. Once the vacuum is on, the mailer vacuum process sleeps until another pre-set shaft angle occurs, at which time the process turns off the vacuum and lets the inserter advance the envelope.

After the hopper 2 process executes (if appropriate to the insertion plan), it transmits the message to the mailer flap process, which in turn sends it to the hopper 1 process. At a pre-set inserter shaft angle, the process instructs an air nozzle or equivalent to direct compressed air across the mailing envelope, forcing open its flap. Once the compressed air is on, the mailer flap process sleeps until another pre-set shaft angle occurs, at which time the process turns off the air. A sensor checks to make sure the envelope's flap is open; if not, the inserter control process (via the mailer flap process)sets a flag which stops the inserter.

After the hopper 1 process executes (if appropriate to the insertion plan), the inserter air process receives a message indicating that a bill is present at the merge station. The process forwards the message to the sprayer or wetter process (detailed below). Then, at a pre-set inserter shaft angle, the process instructs a set of air nozzles or equivalents to direct compressed air into the sending envelope, slightly inflating it. Once the compressed air is on, pusher arms push the bill into the envelope and a bar code reader identifies the bar code printed on the return envelope (the last insert). The inserter air process then sleeps until another pre-set shaft angle occurs, at which time the process: a) turns off the bar code reader; b) turns off the compressed air; and c) sleeps again until the bar code data arrive from the reader via a serial port. When the process receives the information, it compares the return envelope bar code with data in shared memory. If it does not match, the inserter control process (via the inserter air process) flags the bill and diverts it into the diverter tray proximate the outstacker. If the information matches, the flow control passes to the sprayer process. A sensor checks for paper jams; if one exists, the inserter control process (via the inserter air process) sends a paper jam message and stops the inserter.

As the inserter air process passes flow control to the wetter or sprayer process, the sprayer process forwards a message to the mailer form process indicating that a bill is on its way. Then, at a pre-set inserter shaft angle, the sprayer process instructs a water nozzle to spray atomized water onto the sending envelope's flap, readying the envelope for sealing. Once the spray is on, the inserter air process sleeps until another pre-set shaft angle occurs, at which time the process turns off the spray.

Flow control then passes to the mailer form process for verification of forms and envelopes (see details below). When the inserter shaft rotates to a pre-set angle, the mailer form process instructs the sending envelope bar code reader to identify the bar code on the sending envelope. The mailer form process then sleeps until another pre-set shaft angle occurs, at which time the process: a) turns off the reader; b) forwards a message to the sealer process (see below for details) indicating that a bill is on its way; and c) sleeps again until the bar code data arrive from the reader via a serial port. When the process receives the information, it compares the envelope bar code with data in shared memory. If it does not match, the inserter control process (via the mailer form process) flags the bill and diverts it into the tray above the outstacker. If the information matches, the flow control passes to the sealer process. As the bill moves down the insert track to the "sealer," a fitting on the inserter folds the sealing flap back down.

When the sealer process receives flow control, it forwards a message to the outstacker process indicating that a bill is on its way. Then, at a pre-set inserter shaft angle, the sealer process activates the sealer, which seals the envelope by pressing the moistened envelope flap against the envelope. While the envelope flap is being pushed down, the process also engages a set of edge markers (see below for details). The markers mark the edge of the envelope according to information in shared memory (e.g., tray boundary, zip code boundary, and the like). The markers disengage on their own. Once the sealer engages, the sealer process sleeps until another pre-set shaft angle occurs, at which time the process disengages the stomper and passes the bill (and flow control) to the outstacker process.

Transport belts deliver the folded bill from the folder to the inserter. An envelope eject roller delivers the filled and sealed sending envelopes from the inserter to the outstacker or to the diverter tray that is usually positioned above the outstacker. The outstacker process interfaces with other processes via standard message transfers, semaphores, and shared memory.

The inserter arrival, inserter control, inserter input monitor, hopper (1–6 for a PHILLIPSBURG inserter), mailer vacuum, mailer flap, inserter air, wetter or sprayer, mailer form, and sealing processes interface with other processes via standard message transfers, semaphores, and shared memory.

When the inserter shaft rotates to a pre-set angle, the outstacker process cycles the outstacker motor on and off just long enough to offset the arriving bill from the previous one. The system operator organizes the stacked bills in mailing trays for placement at a desired area.

Any bill diverted by the inserter control process lands in the diverter tray located proximate the outstacker. The operator manually corrects any insert deviations, or remakes the bill if necessary.

When a bill successfully processes, the outstacker process flags the area of shared memory used for that bill so that another bill entering the post-processing stream may use it.

Generally, a circular buffer in the controller PC's shared memory stores control data and monitoring data for each bill from the time it prints to the time the inserter kicks it to the outstacker. The buffer has the capacity to store data for a plurality of bills, usually up to at least 100 bills, though the system in practice rarely needs to store more than 20 bills. Although the buffer may utilize any suitable language, currently the buffer uses a C language user-defined type structure to store the data for each bill.

Additionally, the controller PC stores other control and monitoring data with user-defined type structures such as: information for the insertion plan and the forms and envelopes verification parameters; information for the predetermined motion profile information; and information measurements of folder and inserter dynamics.

Preferred Collator Details

Related is a system for collating a plurality of incoming document sheet or page streams into a unified packet. More specifically, disclosed are a collating apparatus and control system for merging and stacking document sheet or page streams that converge in a central tray from a plurality of input directions and levels. The collated document packet is then ejected to further processing equipment.

Disclosed is a collating apparatus for producing a document packet from an incoming document page or pages. Specifically for an apparatus that receives pages from usually two sources, a collating means for producing the document packet comprises a first collating tray for receiving at least a first document page and a second collating tray secured to the first collating tray and having two opposing side walls and a bottom plate for receiving any second document page or pages. Further, provided is an outputting means for transferring the document packet created by the collating means to a subsequent processing means. The outputting means comprises means for concurrently ejecting all document pages from the collating means to produce the document packet and means for receiving from the ejecting means and transferring to the subsequent processing means the document packet.

Additionally, first inputting means is included for feeding a first document page from a first incoming source into the collating means. The first imputing means comprises a first source containing the first document page for each document packet to be produced and means for transferring the first document page into the collating means.

Further, a second inputting means is supplied for feeding a second document page from a second incoming source into the collating means. The second imputing means comprises a second source containing the second document page for each document packet to be produced and means for transferring the second document page into the collating means. Usually, the second inputting means is displaced approximately 90° from the first inputting means. Likewise, additional inputting means are provided if more than two incoming sources are present and oriented at approximately 90° to one another or in elevationally displaced positions to one another.

Preferably, the collating means further comprises a first detection means for establishing whether delivery of the first document page into the collating means has been performed. Also, the collating means further comprises a second detection means for establishing whether delivery of the second document page into the collating means has been performed. Additionally, the collating means further comprises a third detection means for establishing whether the collating means contains the first or the second document pages. Further, the collating means further comprises a fourth detection means for establishing whether the document packet has exited the collating means to a subsequent processing means.

For illustrative purposes only, the collator will be described in terms of utilization in a billing operation in which customers have received services or products over a past period of time and are regularly billed for those services. A billing process periodically generates billing statements from a database containing relevant information about the customers and the services or goods providers. The billing statements or document packets typically contain at least a summary page that usually has a billing summary printed only on one side of the page, but a double sided summary page is contemplated by this disclosure. Printing of a one-sided summary page is often performed by a simplex-type printer either at the location of the subject collator or at a location distant to the subject collator and then moved to the subject collator.

Generally, included in each billing statement or document packet is an additional page or pages, usually printed on both sides of each page, that provide the details of the transactions for the goods or services. Printing of these detail pages is usually by a duplex-type printer that is often located at the site of the subject collator, but a distant location for the duplex-type printer is also considered possible.

Since a summary sheet and the included detail page or pages must be assembled into a mailing piece or document packet within one envelope, a logistics problem exists that is overcome by the subject collator. A document packet may contain only one document page, however, usually, a first stream of summary pages is merged into the document packet with at least a second stream of detail pages by the collator (it is noted that, depending upon the requirements of a particular document packet creation situation, the first stream may contain the detail pages and the second stream contain the summary pages). Usually, at least two different printers (and even more than two, as seen below) are utilized to print the summary sheet and the detail pages, and as noted, the merging of the two separate streams of pages could cause a logjam to exist if the two types of sheet streams are not collated quickly and reliably merged into a single mailable document packet. The collator rapidly and efficiently assembles the incoming pages into the mailable document packet or final bill.

The subject collating apparatus for producing a document packet from an incoming document bill page or pages comprises a collating means having a plurality of collating trays, preferably displaced from one another in a generally vertical orientation. Each of the collating trays accepts a single document page or multiple document pages. Outputting means are included and coupled to the collating means for transferring the incoming page or pages from the collating means as the document packet to a subsequent processing means. Further, as a preferred portion of the subject invention, multi-directional inputting means are embraced for transferring into the collating means a plurality of streams of incoming document pages from at least two directions. Also comprising the subject invention are detection means for establishing whether the document page or pages have been delivered into the collating means, whether the collating means contains the document page or pages, and whether the document packet has exited the collating means.

Figure 5:
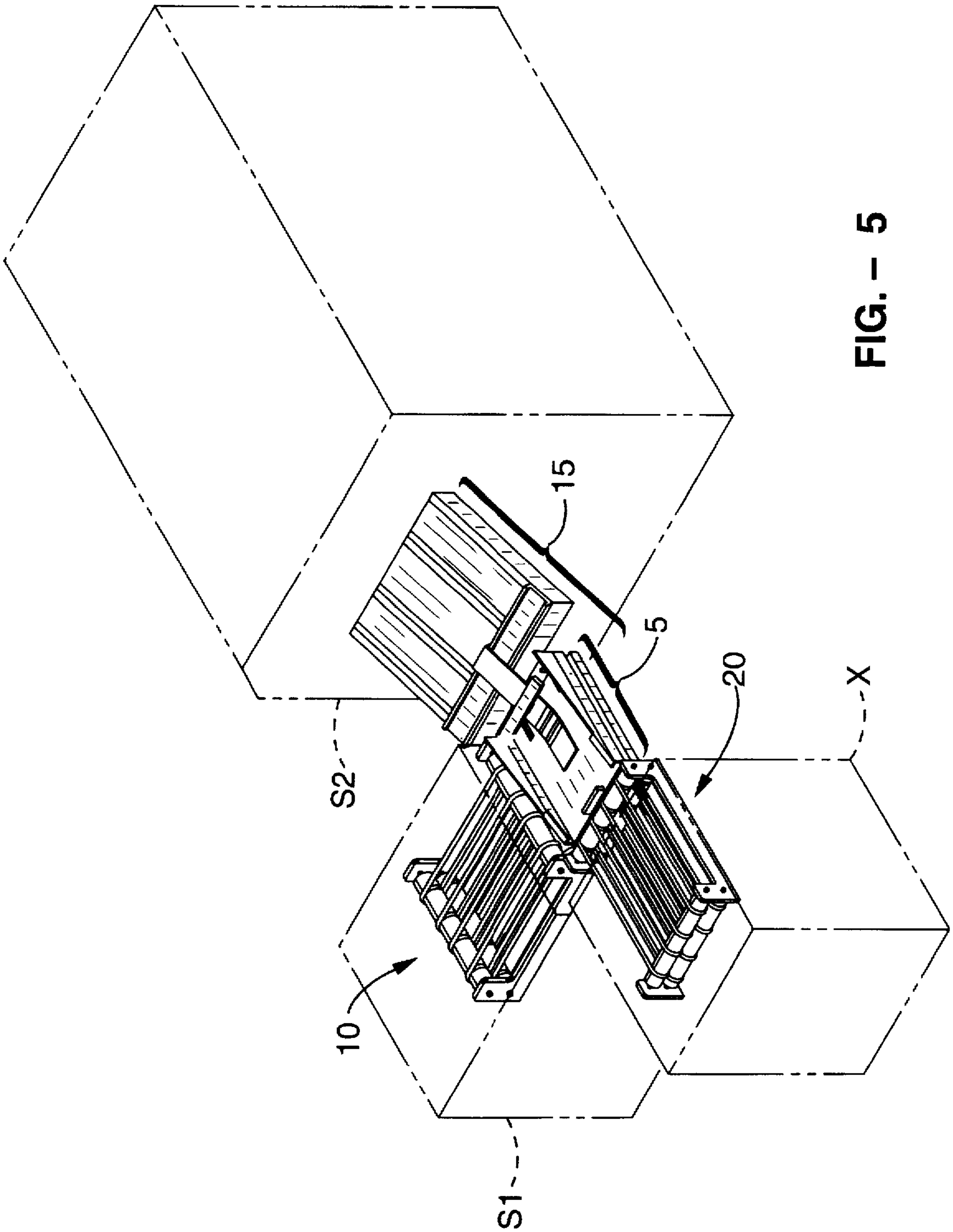
FIG. 5 is a perspective view of the subject invention.

Referring now to FIGS. 5–14, there is shown a preferred embodiment of a collating system comprising inputting means, a collating tray mechanism, outputting means, and typical control instruction shown in flow diagram form. For exemplary purposes only, FIG. 5 illustrates the subject system having two sources or inputting means for supplying to the collating apparatus incoming documents. A first source S1 for a first stream of document pages enters the collating means 5 via a transferring means 10. The first source S1 (usually this is the cutter having the simplex printed cover sheets) supplies either a single document page or a plurality of document pages for each assembled document packet of final bill, usually a single summary page, printed on one side, when the subject apparatus is assembling a billing statement. The first transferring means 10 for conveying the first document pages into the collating means 5 is shown in FIG. 5 to be belts that frictionally feed each desired document page or sheet into the collating means 5, but other equivalent means (i.e. cable drives, air drives, standard combinations, and the like) are considered to be within the realm of this disclosure.

A second source S2 (usually this is the second or exemplary duplex printer) for a second stream of document pages enters the collating means 5 via a transferring means 15. Usually, the second source S2 supplies either a single document page or a plurality of document pages for each assembled document packet, usually a detailed billing page or pages, printed on both sides, if necessary, when the subject apparatus is assembling the exemplary billing statement employed herein. The second transferring means 15 for conveying the second document pages into the collating means 5 is shown in FIG. 5 to be a belt system coupled to a deflector arm having page directing air jets (and other equivalent means are within the purview of this disclosure). The components of the second transferring means 15 will be described in detail below in reference to FIG. 5.

Included in the subject invention is an outputting means. Partially comprising, along with the concurrent ejection means described below, the outputting means is commonly a belt system 20, usually cooperatively paired with upper and lower belts, for transferring the produced document packet from the subject collator 5 to a subsequent processing means X, such as a folder or the like (as just indicated, an additional preferred portion of the outputting means, discussed in detail below, is an element for concurrently ejecting into the exiting-transfer system 20 all of the document pages from the collating means to produce the document packet). Specifically, shown in FIG. 5 are cooperating belts 20 that frictionally grasp the produced document packet. Other acceptable means equivalent to the paired belts 20, such as single belts, cable drives, air or vacuum drives, and the like, are viewed as being within this disclosure.

Figure 6:
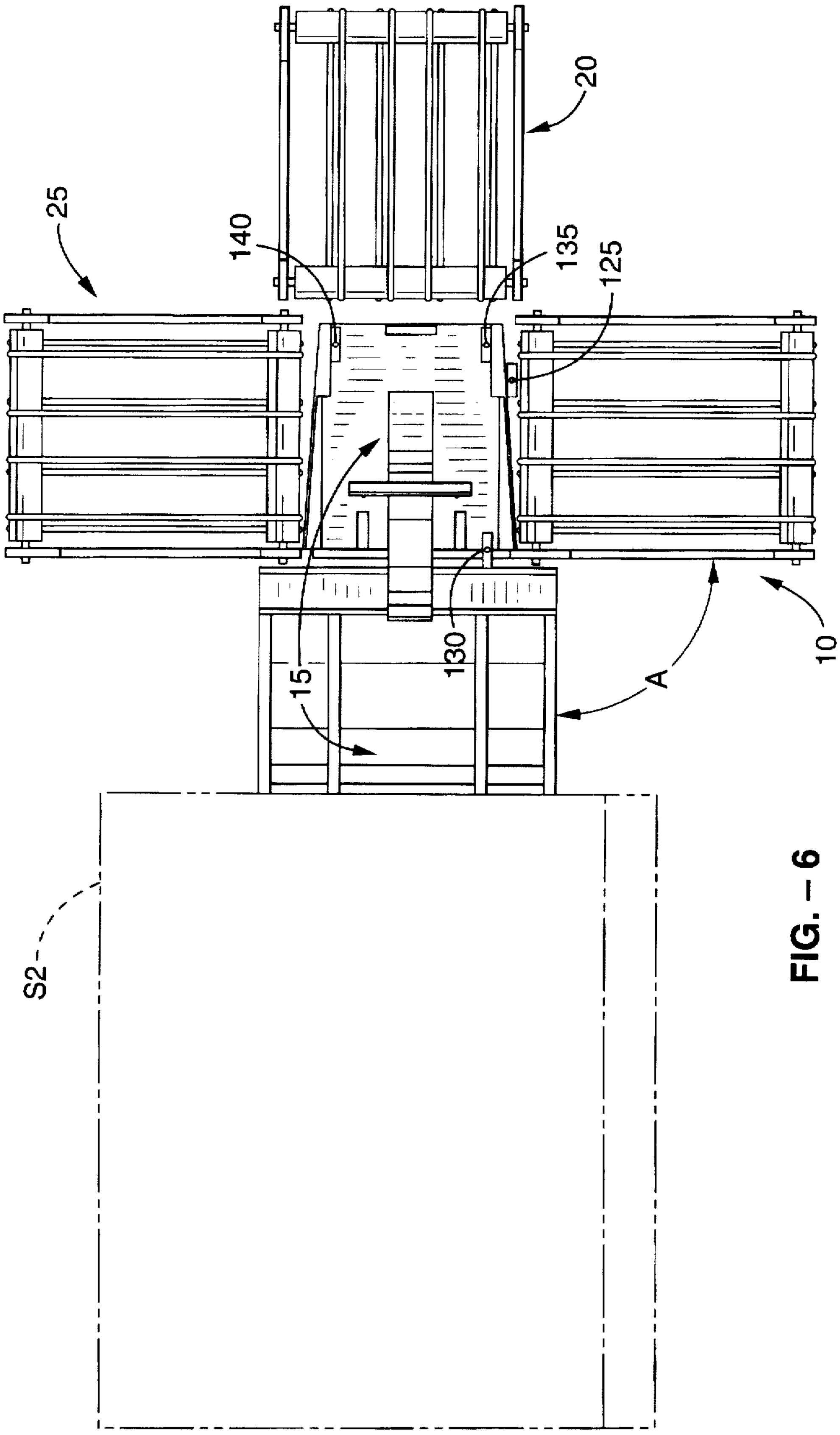
FIG. 6 is a top view of the subject invention.

As seen in particular in FIGS. 5 and 6, the subject apparatus has multi-directional inputting means (first and second inputting means 10 and 15 in FIG. 5 and an additional third inputting means 25 in FIG. 6) for transferring into the collating means a plurality of streams of incoming document pages from directions that are usually separated by approximately 90° from one another, indicated by the letter A in FIG. 6. Although 90° is preferred, other angles suitable for transferring incoming document streams into the subject collating means are acceptable.

Additional inputting means can be incorporated into the subject invention by stacking or off-setting further inputting means beneath, above, or beyond the shown inputting means or by equivalent structural orientations and configurations. Tiered, stacked, or elevationally or vertically displaced inputting means may be utilized to feed additional streams of document pages into a suitably modified collation means 5.

Figure 7:
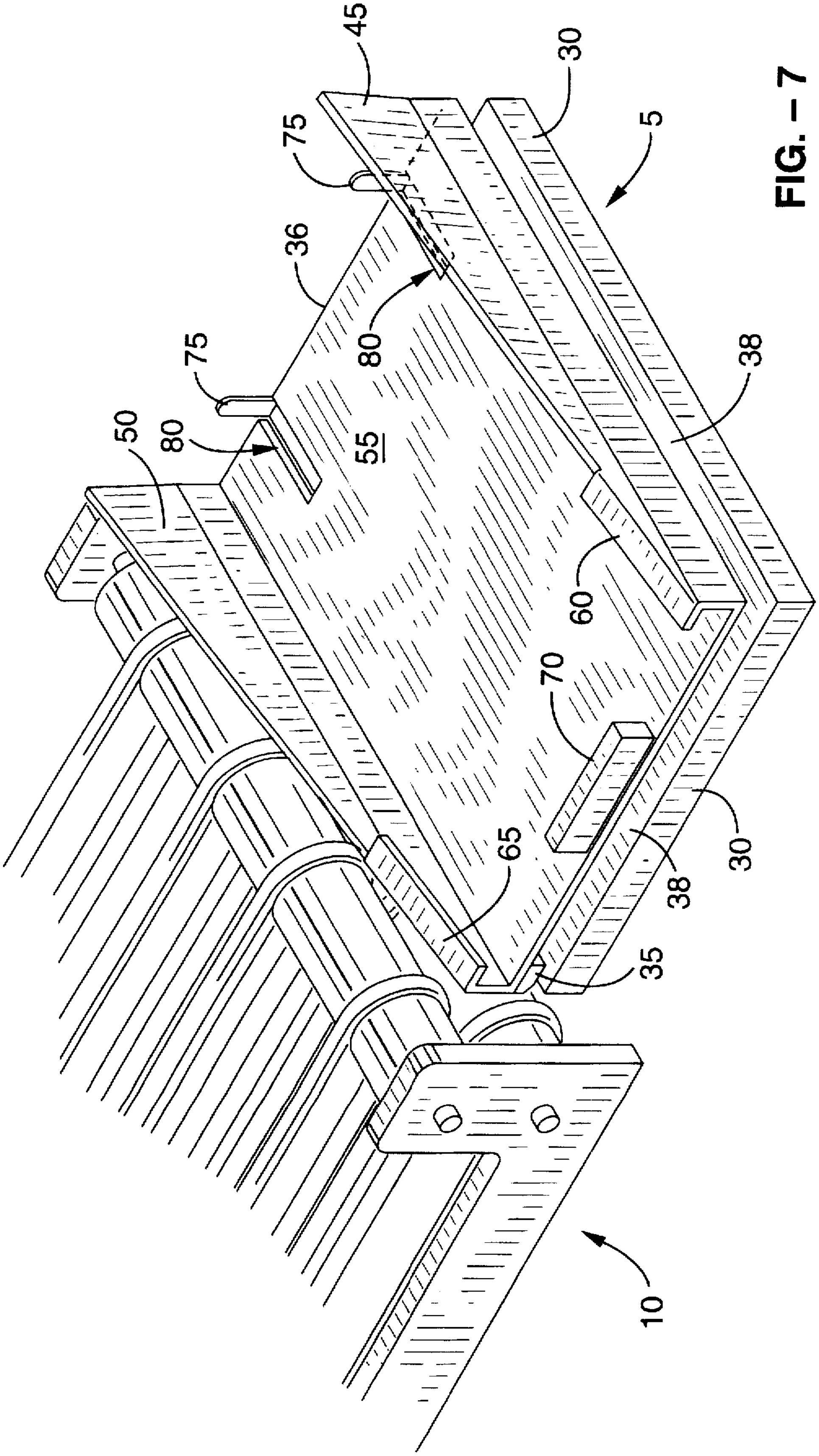
FIG. 7 is a perspective view of the subject collating tray and associated first inputting means.
Figure 8:
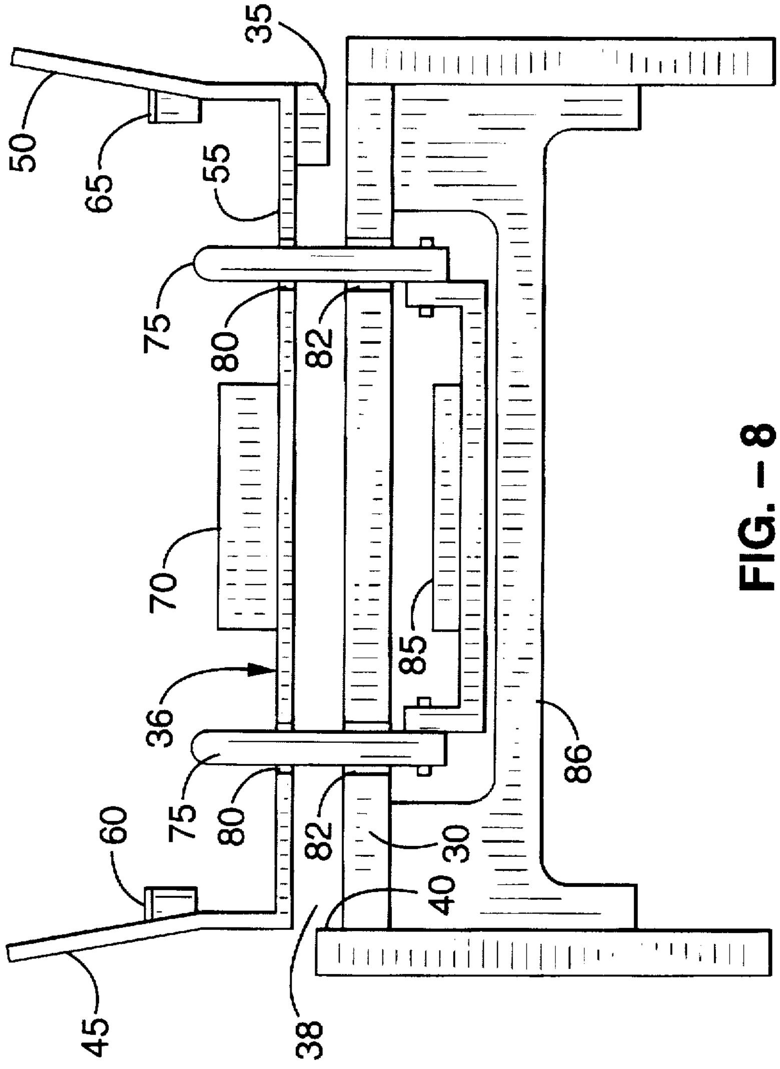
FIG. 8 is an end view of the subject collating means.

A preferred embodiment of the subject collating means 5 is depicted in detail in FIGS. 7 and 8. Comprising the collating means is a plurality of vertically or elevationally displaced collating trays. A first collator tray 30 is configured below a second collator tray 36. Incoming pages from the first source 10 enter into the first collator tray 30 by means of a flared page feeder bar 35 (see FIG. 8) cooperating with the surface of the first collator tray 30. The inputted pages from the first inputting means 10 encounter the edge of the first collator tray 30 and the tapered leading edge of the feeder bar 35 and are funneled into a space 38 above the first collator tray 30 and below the second collator tray 36. A page barrier 40 stops the incoming page's motion within the first collating tray 30. It is noted that additional collating trays beneath or above the first collating tray 30 and similar to the first collating tray 30 may be incorporated into the subject device for accepting incoming document source streams from other directions (such as the third inputting means 25, FIG. 6) and multiple layers of inputting means.

The second collating tray 36 is the top most tray (also, the top most tray in equivalent elevationally displaced systems with more than two trays) and has two opposing side walls 45 and 50 and a bottom plate 55. Often, page guards 60 and 65 are formed into one end of the second tray 36, extending from the side walls (45 and 50, respectively) and above the bottom plate 55. Document pages that enter the second collator tray 36 from the second inputting means 15 have their forward motion stopped by a retractable or movable gate 70. At determined times (preferably determined by an associated computer accessing appropriate billing information, as discussed below), the gate 70 is opened for the document packet to exit the collating means 5. Preferably, the gate 70 is activated to open and close by means such as an air, vacuum, or electric driven solenoid or comparable means.

As indicated above, the outputting means comprises not only the belts 20, but additional means for concurrently removing all document pages from the collating means 5. Preferably, a timed kicker means is combined into the subject apparatus to concurrently eject all of the document pages from all of the included trays (first tray 30, second tray 36, and any additional trays). Specifically, kicker arms 75 are fitted to the collating trays 30 and 36. Slots (80 in the second upper tray 36 and 82 in the first lower tray 30) are included for receiving the kicker arms 75. Usually, a pair of kicker arms 75 are employed, but a single kicker arm or more than two kicker arms are possible. Kicker arm activating means 85 (mounted in a receiving and supporting frame 86) are coupled to the kicker arms 75. At determined times (when a complete document packet has been fed into the collator means 5) and after the gate 70 has been opened, the kicker activating means 85 functions to engage the kicker arms 75, thereby rapidly kicking the collated pages from the involved trays and into the means for transferring the packet to the subsequent processing means. It should be noted that the gate 70 may function to prevent not only the upper document page or pages from prematurely exiting only the second tray 36, but may function to prevent the pages in a lower tray (including the first tray 30) from accidentally exiting into the outputting means before desired.

The kicker activating means 85 usually comprises an air, vacuum, or electric solenoid driven combination of appropriately interacting components, but other equivalent means are considered as potentially suitable. When the kicker activating means 85 is engaged the kicker arms 75 rapidly retract into the slots (80 and 82), thereby quickly forcing the pages within the trays to rapidly exit into the receiving means or set of belts 20.

Figure 9:
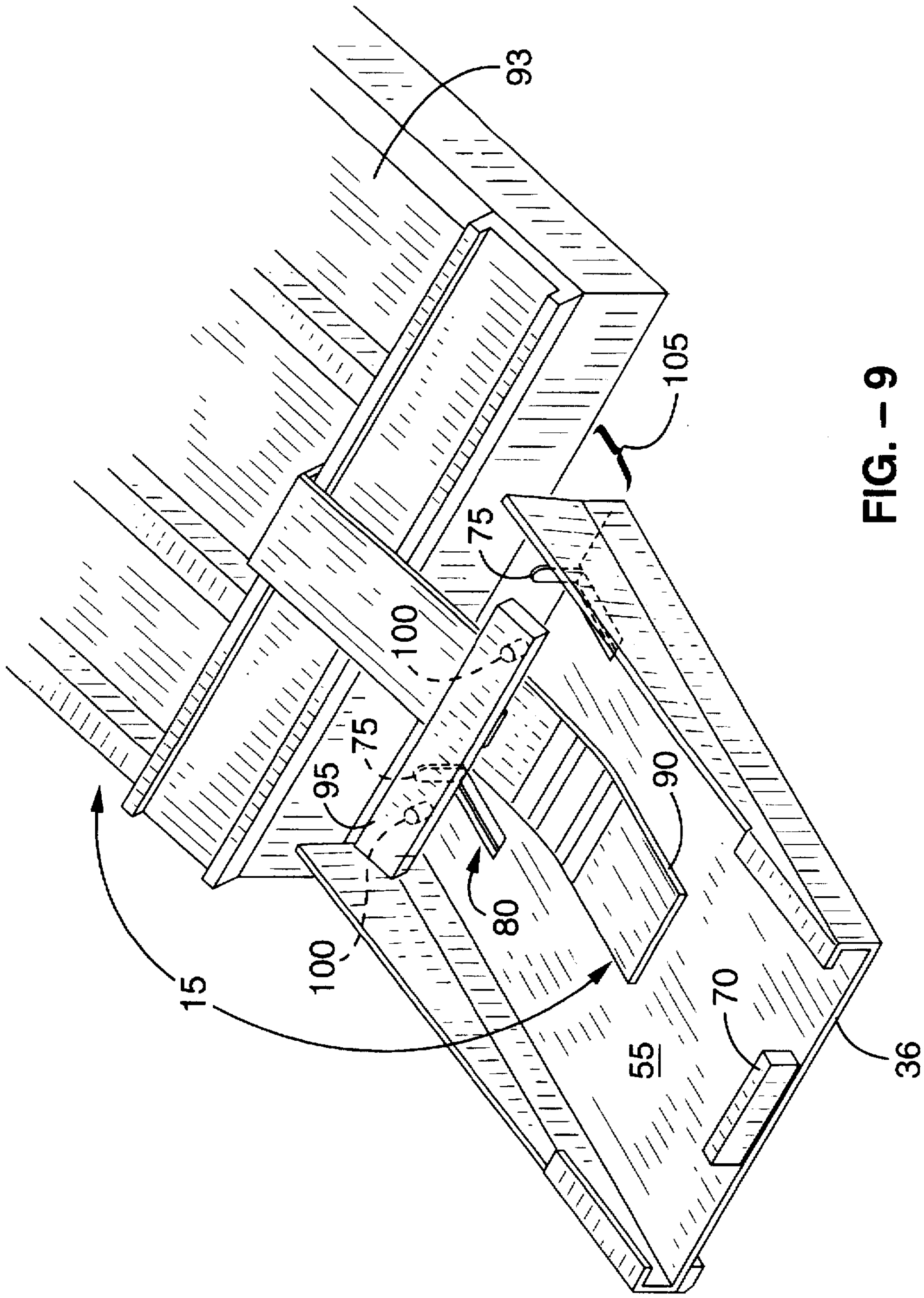
FIG. 9 is a perspective view of the collating means and second inputting means of the subject invention.

FIG. 9 shows the details of a preferred structure for the second inputting means 15. Although other means may be acceptable, the presented version of the second inputting means 15 is capable of rapidly delivering into the second tray 36 a plurality of simplexed or duplexed pages with a high degree of efficiency. A page settling means (allowing for the settling pages into the receiving tray) is needed for high speed processing and material inconsistencies. Specifically, the page settling means includes a page deflection bar 90 that is attached to a page transfer means 93, which is usually directly attached to the second inputting source (generally, the standard page outputting means, single or paired belts and the like, for a simplex or duplex-type printer is modified to include the deflection bar 90). Secured to the deflection bar 90 is an air nozzle support rack 95 have at least one and preferably two or more air nozzles 100 that assist in settling the incoming pages into the upper tray 36. Incoming sheets or pages pass over the kicker arms 75 and below the deflection bar 90 to enter the second or upper tray 36.

Preferably, a page rejection means is incorporated into the region 105 between the page transfer means 93 and the page deflection bar 90. The page rejection means functions to eliminate from entering the upper tray 36 any non-desired pages. Often a printer will generate waste or extra pages between desired pages for a particular document packet. Such waste pages need to be quickly discarded from inclusion into the document packet. The form of the page rejection means or diverter can vary, but a movable arm, lever, or plate that deflects or directs the waste pages downward into a waste receptacle is contemplated. The page rejection means or diverter is controlled or activated by an associated computer means (see below) that has information concerning the presence or absence of waste pages.

Figure 10:
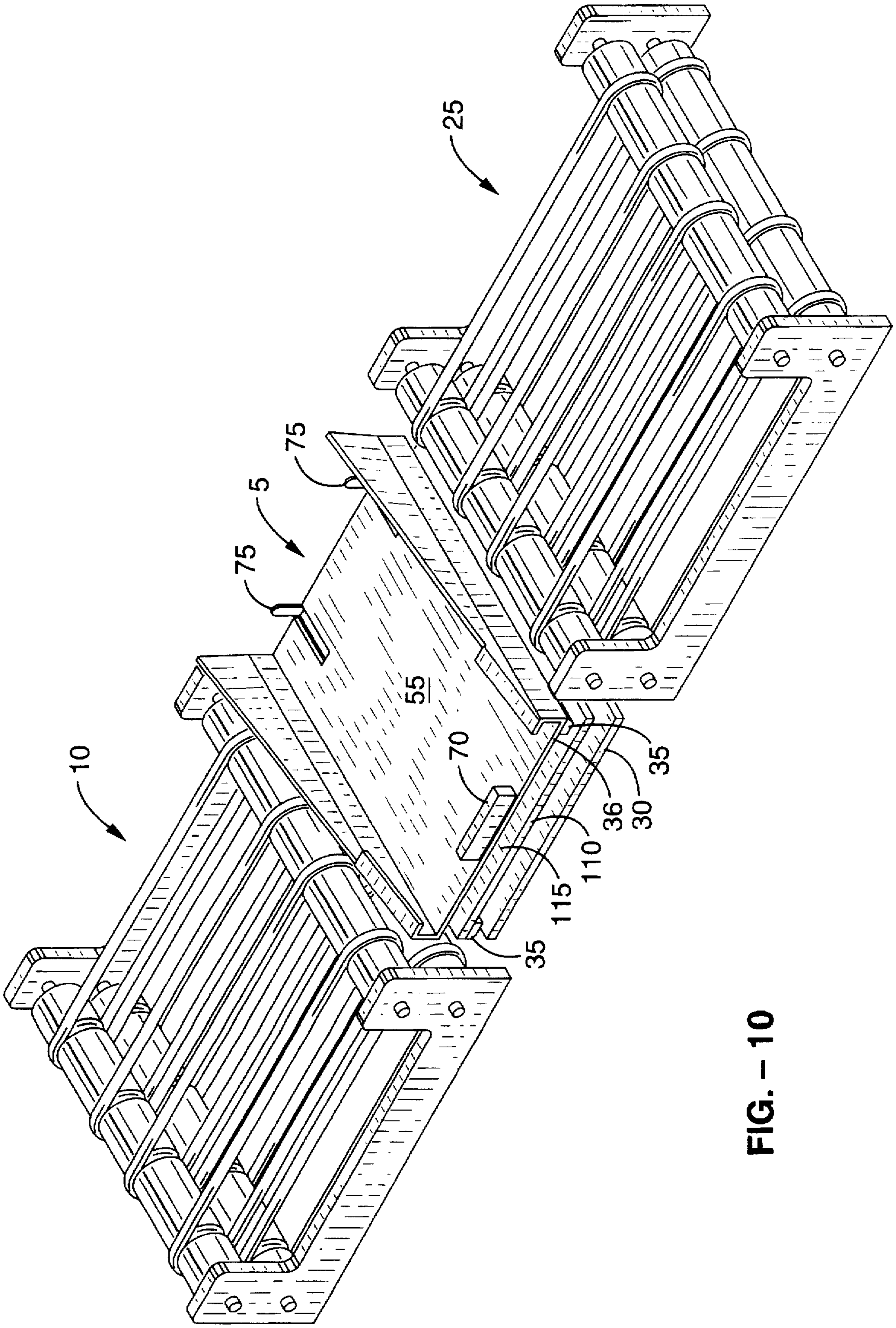
FIG. 10 is a perspective view of the collating means and two inputting means of the subject invention.

FIG. 10 delineates in more detail the orientation of the above recited inputting means when two inputting means 10 and 25 are included. The embodiment illustrate in FIG. 10 depicts an intermediate collator tray 110 with a page accepting space 115 immediate above. Just as with the first tray 30, an equivalent page funneling system is present, including a flared bar, kicker arm slots, and page barrier (not shown). Pages sent into the collator by the third inputting means 25, shown as paired and cooperating belts, enter the provided space 115. All of the pages of a given document packet within the multiple levels of tray are ejected by the kicker arms 75. Clearly, additional collator trays for receiving other source page streams can be positioned below the lower most tray depicted in the subject figures, thus generating an elevationally or vertically displaced plurality of trays. Additional inputting means would be coupled to each added tray layer.

Figure 11:
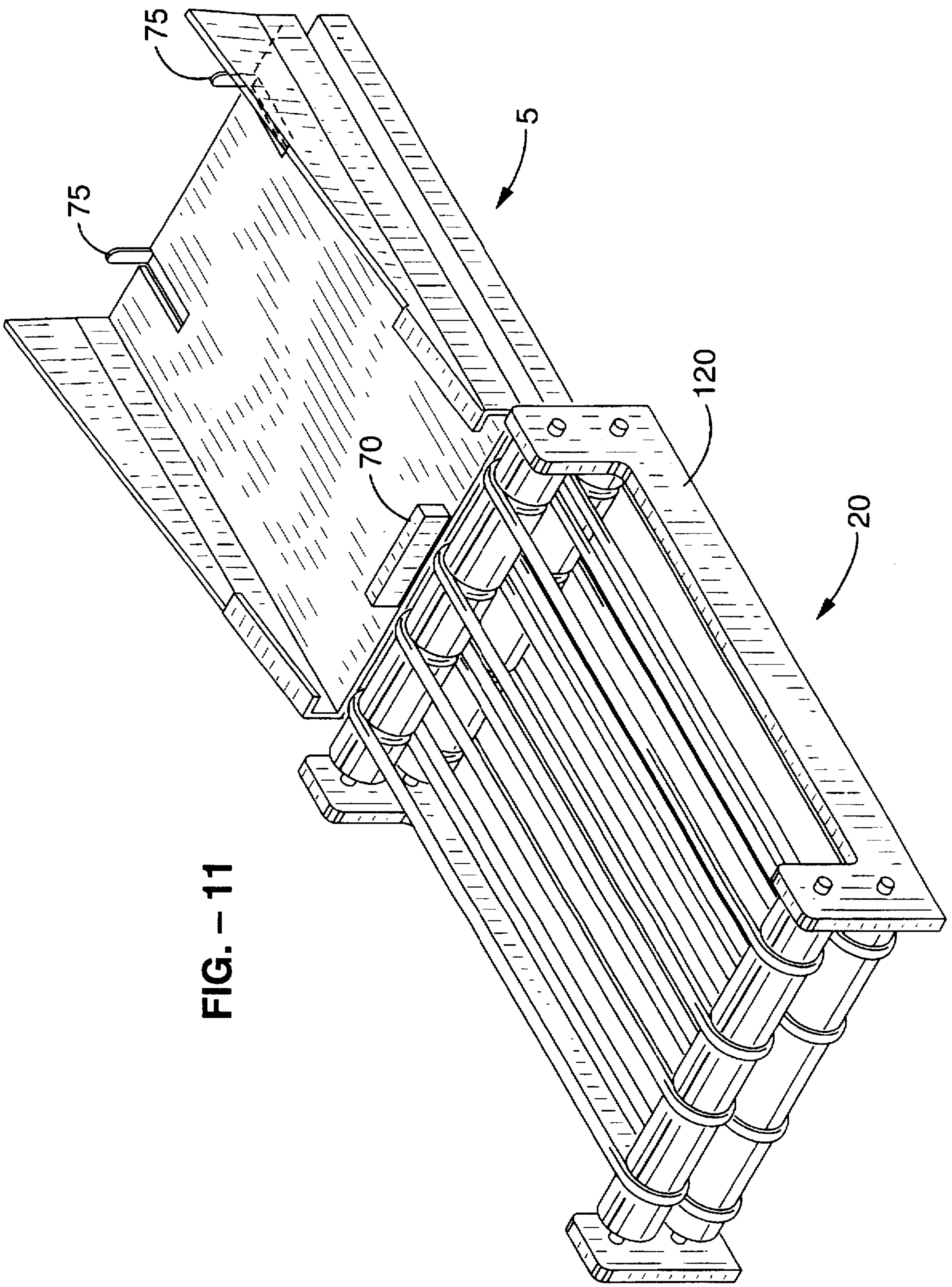
FIG. 11 is a perspective view of the subject collating means and associated outputting means.

FIG. 11 more clearly indicates the relationship between the transferring means 20 of the outputting means and the collator means 5. As described above, the transferring means is preferably a belt system 20, usually a set of cooperatively paired belts with upper and lower belts, for transferring the produced document packet from the subject collator 5 to a subsequent processing means or folder. A suitable frame 120 generally holds the belt system in proper a structural configuration.

Figure 12:
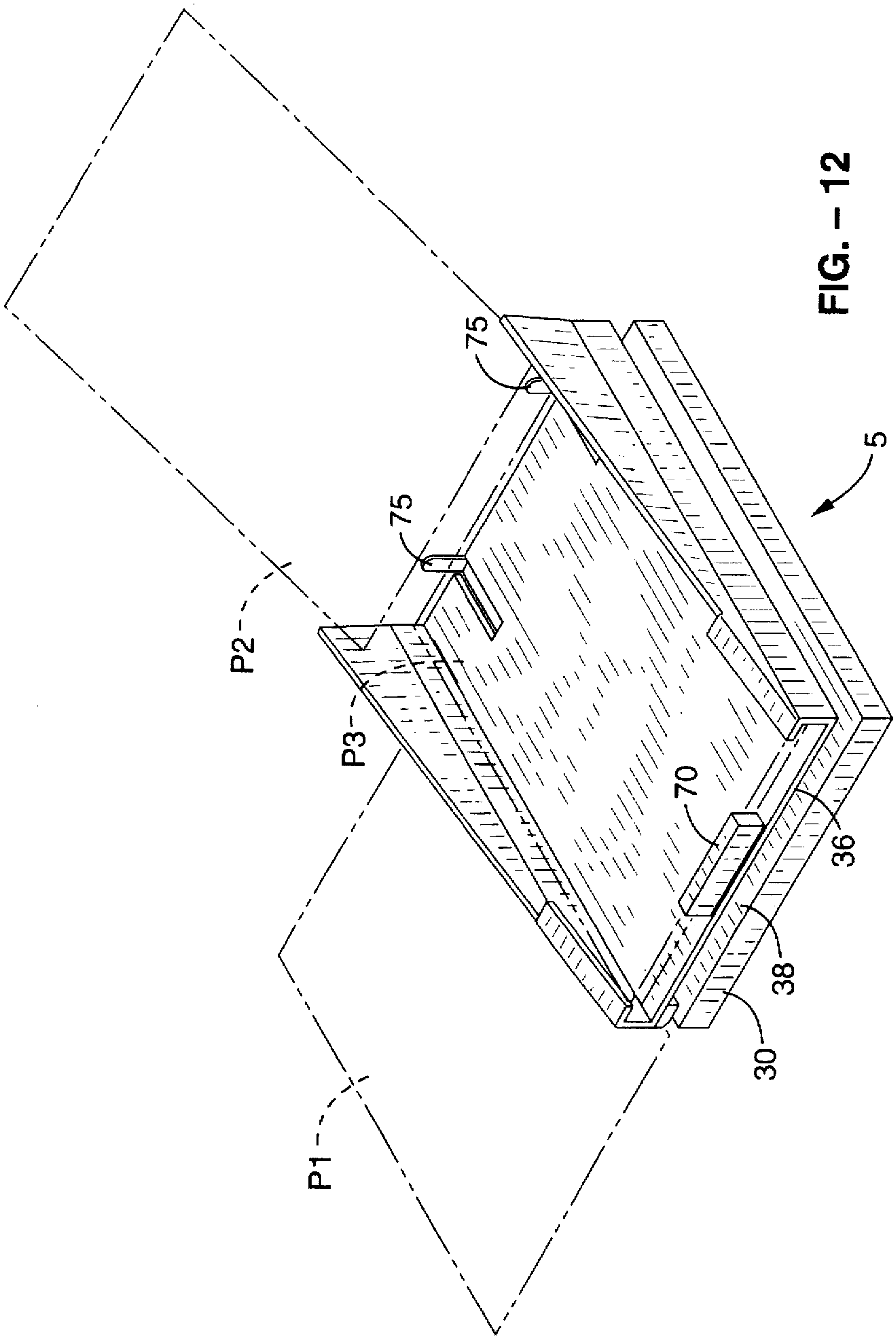
FIG. 12 is a perspective view of the subject invention illustrating the movement of incoming pages into the collating means.

FIG. 12 illustrates the transferal of incoming pages P into the collator means 5. Pages may enter the various tray layers at any time before the final ejection by the kicker arms 75. However, one preferred sequence for incoming document pages is to have all but the last detail page enter the upper tray 36 and then have the last detail page be transferred somewhat concurrently with the summary page into the lower tray 30. Specifically as seen in FIG. 12, one page P1 is entering the lower or first collating tray 30, another page P2 is entering the upper or second collating tray 36, and one or more pages P3 (two pages shown) are sitting within the second collating tray 36 between the gate 70 and the kicker arms 75.

Figure 13:
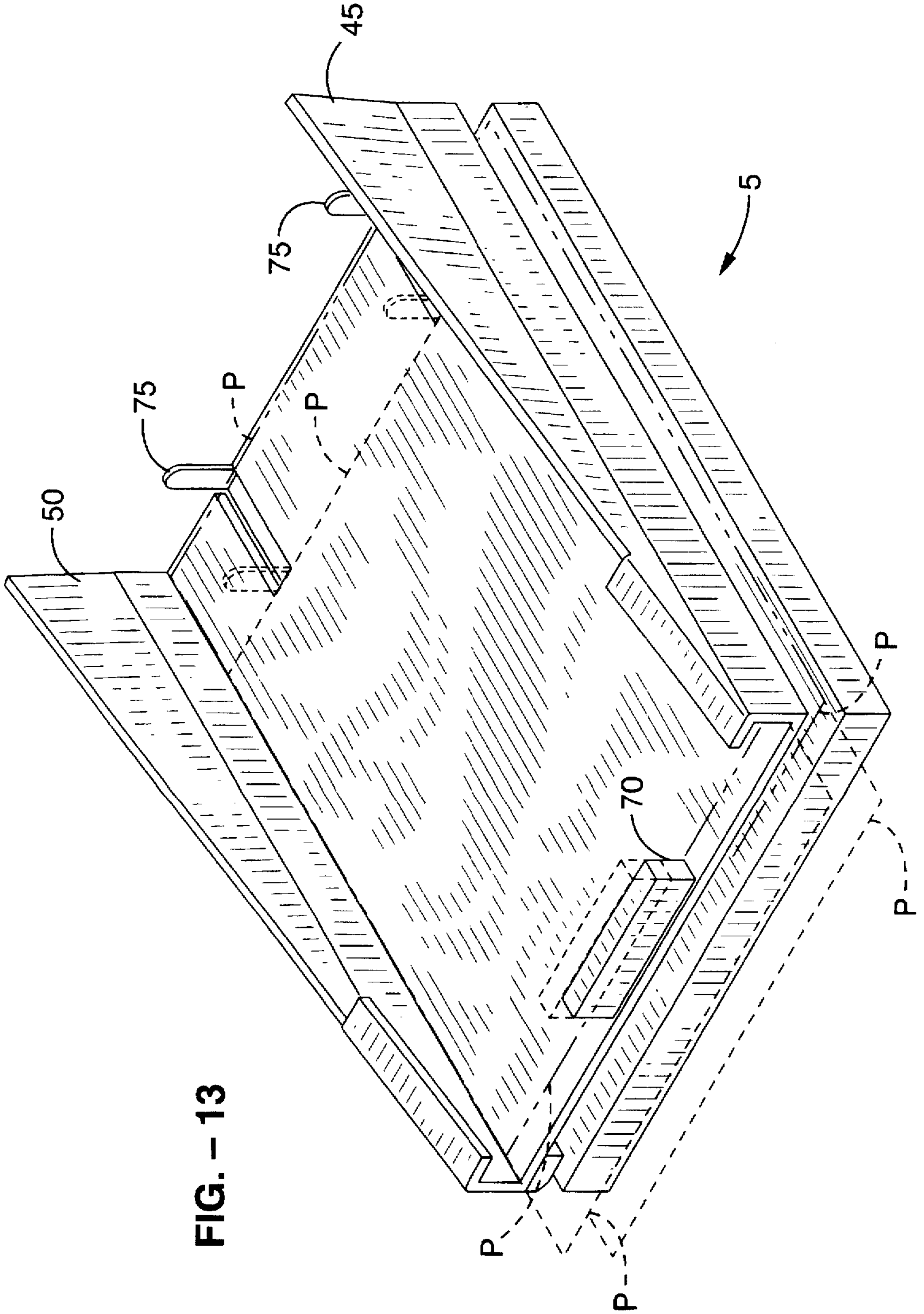
FIG. 13 is a perspective view of the subject invention illustrating the movement of outgoing pages from the collating means into the transferring means.

FIG. 13 portrays details of movement for the ejection of pages, forming the document packet, from the collator means 5 by the kicker arms 75. The dashed lines indicate the position of the activated kicker arms 75 and the ejected position of the transferring pages P. The ejected pages have the edges registered or aligned by the action of the kicker arms 75 and are carried by the transferring belt system 20 and onto the next process station. Only two levels of pages are shown in FIG. 13, however, additional levels of pages are ejected in an equivalent manner.

Preferably, detection means are included in the collating means 5 of the subject apparatus for establishing whether pages have been transferred into and from the collating means 5. The exact form and location of any detection means is not critical, however, a preferred type of detector is a light sensitive detector that signals when a light path is either blocked by the presence of a page or open when no page is present. Light beam detectors, pressure sensitive detectors, and equivalent detectors may be utilized by themselves or in combination in the subject invention. Various attachment points on the collating means 5 are suitable for securing the detection means and are primarily questions of engineering. For some preferred detector means locations the collating trays 30 and 36 and associated components may have apertures to accommodate the light beams (or like considerations) of the detection sensors.

The detection means 125, 130, 135, and 140 shown in FIG. 6 are placed at typical sites around the collating means 5 and in fact may comprise not solely one physical member but two (signal sending, signal receiving, and the like) or more interrelated detection units appropriately positioned to function in the page detection process. More specifically, a first detection means 125 is provided that establishes whether delivery of the first document page into the collating means 5 has been performed. Further, a second detection means 130 is supplied that established whether delivery of the second document page into the collating means 5 has been performed. Plainly, additional page delivery detection means can be included if the collating means 5 contains more than two levels of trays. Additionally, a third detection means 135 is included that establishes whether the collating means 5 actually contains the first or second document pages (or additional pages from other incoming sources). Also, a fourth detection means 140 is furnished that establishes whether the document packet has exited the collating means 5 to a subsequent processing means.

Preferably, the subject system includes for overseeing and directing the production of the document packets by the collating apparatus a computer or controller means, as indicated above. The controller is any suitable data handling and manipulating device now known or later developed that incorporates and utilizes the information in a database. The appropriate database (as indicated below) supplies the controller with information concerning how many first, second, and additional pages comprise any particular document packet. The controller or computer means then functions to regulate the overall process to create the individual document packets.

Figure 14:
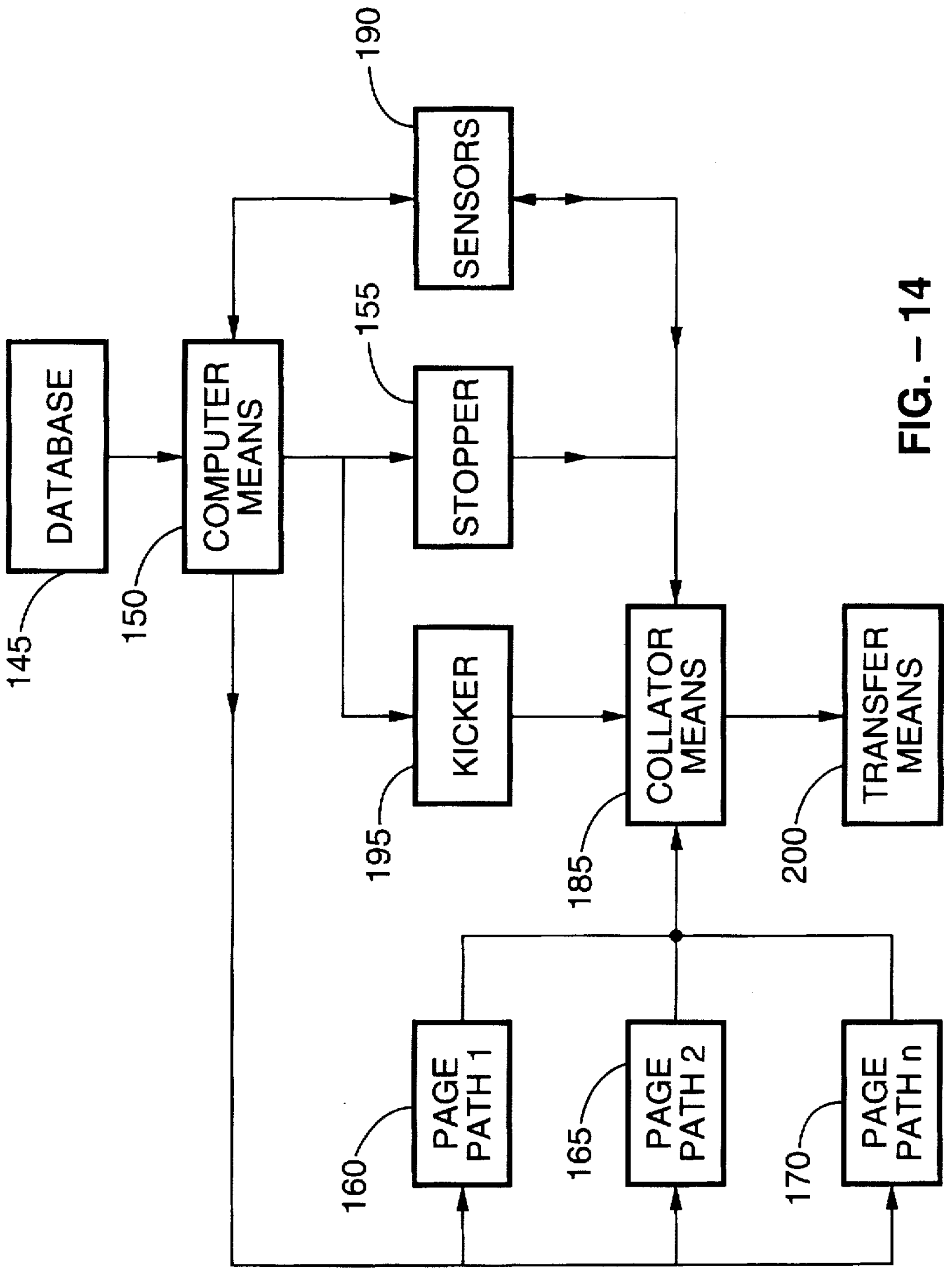
FIG. 14 is a flow diagram indicating a general control scheme and flow of pages in the subject invention.

In particular, FIG. 14 shows the generalized flow diagram that interconnects the appropriate data with the collating system. The database 145 holds the information that directs the number and type of pages destined to fill a particular document packet. For example, the database may contain names, addresses, financial information, current and past statement charges and the like for each customer that will be sent a billing document packet.

The database is utilized by the controller or computer means 150 as instruction for assembling any particular document packet. Between the production of each document packet, the controller or computer means 150 sets the page stopper 155 (or specifically retractable gate 70 in the figures) to block ejecting a still forming document packet from exiting the collating means 185.

By way of example only, if, according to the database and appropriate formatting by the controller or computer means 150, a document packet is to contain one summary page and three detail pages, the computer means directs the page path 1 means 160 or first inputting means to deliver a single summary page (usually printed on only one side of the page) and page path 2 means 165 to deliver three detail pages (usually printed on both sides of the pages, if required). Should additional sources of incoming pages be desired or required, one or more page path n means 170 are similarly provided and controlled by the controller or computer means 150. Generally, the summary page is in the first collator tray 30 in a face-down (printed side down) orientation. The initial face-down orientation of the summary page during formation of the face-down packet allows the created document packet to have the final pages oriented face-up.

The sensor means 190 for detecting page presence or absence includes any one, all four, or any combination thereof for the above described sensors (125, 130, 135, and 140). Once the selected sensors 190 have verified that a suitable state of page transfer has occurred (as determined by the database information), the controller or computer means disengages the stopper 155 and activates the kicker 195 (specifically the kicker arms 75 in the figures). The kicker 195 then ejects the document packet into the transferring means 200 and from there to the subsequent process means.

Preferred Forms and Envelopes Verification Process Details

A system, within the overall total subject system, for verifying that preselected forms and envelopes are correctly matched into a mailing packet or bill is disclosed. More specifically, a dynamically timed system utilizing indicia inscribed items is related that confirms that forms, inserts, return envelopes, and the like are correctly matched for inclusion into a mailing packet.

The system is for use with a mailing packet assembling apparatus that creates a mailing packet from items comprised of machine readable indicia encoded forms and machine readable indicia encoded envelopes that are transferred into the assembling apparatus.

Specifically, the system comprises a data base having information on the items within the mailing packet or bill, thereby establishing which forms and envelopes are required in the assembled mailing packet. Further provided is a set of form and envelope indicia scanning dynamic detectors. Each detector has a scanning period responsive to a transfer velocity for each form or each envelope scanned. Included is computer means for verifying that the data base information and the dynamically detected form and envelope indicia correctly correspond or do not correctly correspond to the forms and envelopes within the mailing packet as established by the data base. A controller or computer means is present for directing the assembling apparatus to form the mailing packet upon the verification of correctly corresponding indicia. Usually, each of the scanning dynamic detectors comprises a bar code reader that scans either the form or envelope indicia during a transfer velocity determined scan cycle.

Preferably, the verification means and the assembly directing means comprise an operator interactive controller, computer, or microprocessor. During operation of the verification system the operator interactive controller responds in a suitable manner. If the detected correspondence is correct, the mailing packet is assembled. If the correspondence can not be determined, an alternate processing route is made available for the item or the item is allowed to be assembled, depending upon operator instructions. Likewise, if the detected correspondence is not correct, an alternate processing route is made available for the item (usually via a diverter).

Figure 15:
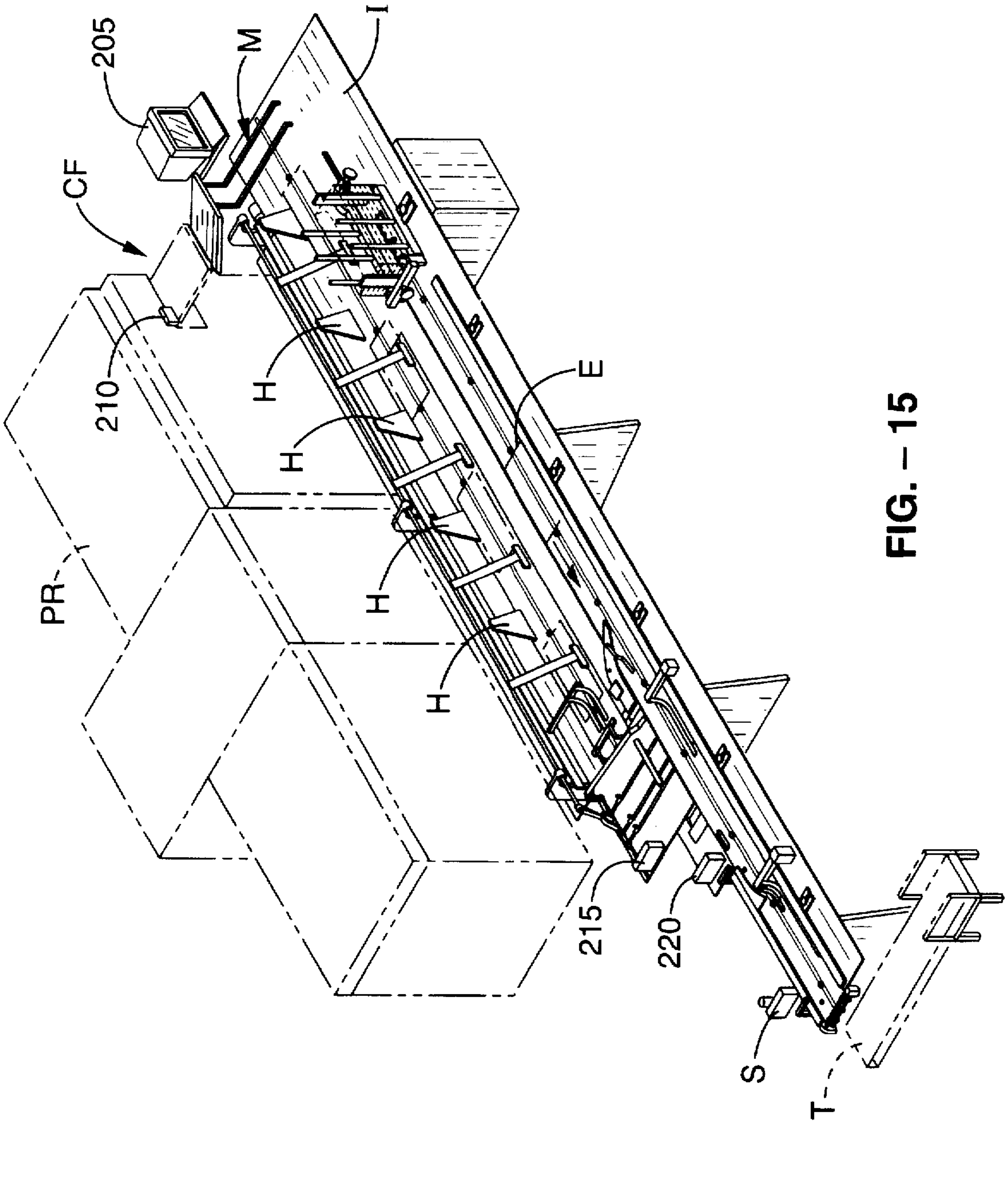
FIG. 15 is a perspective view of a typical mailing packet assembly apparatus employing the subject forms and envelopes verification process in which the introduction of additional sheet streams enter at the CF location from other printers.
Figure 16:
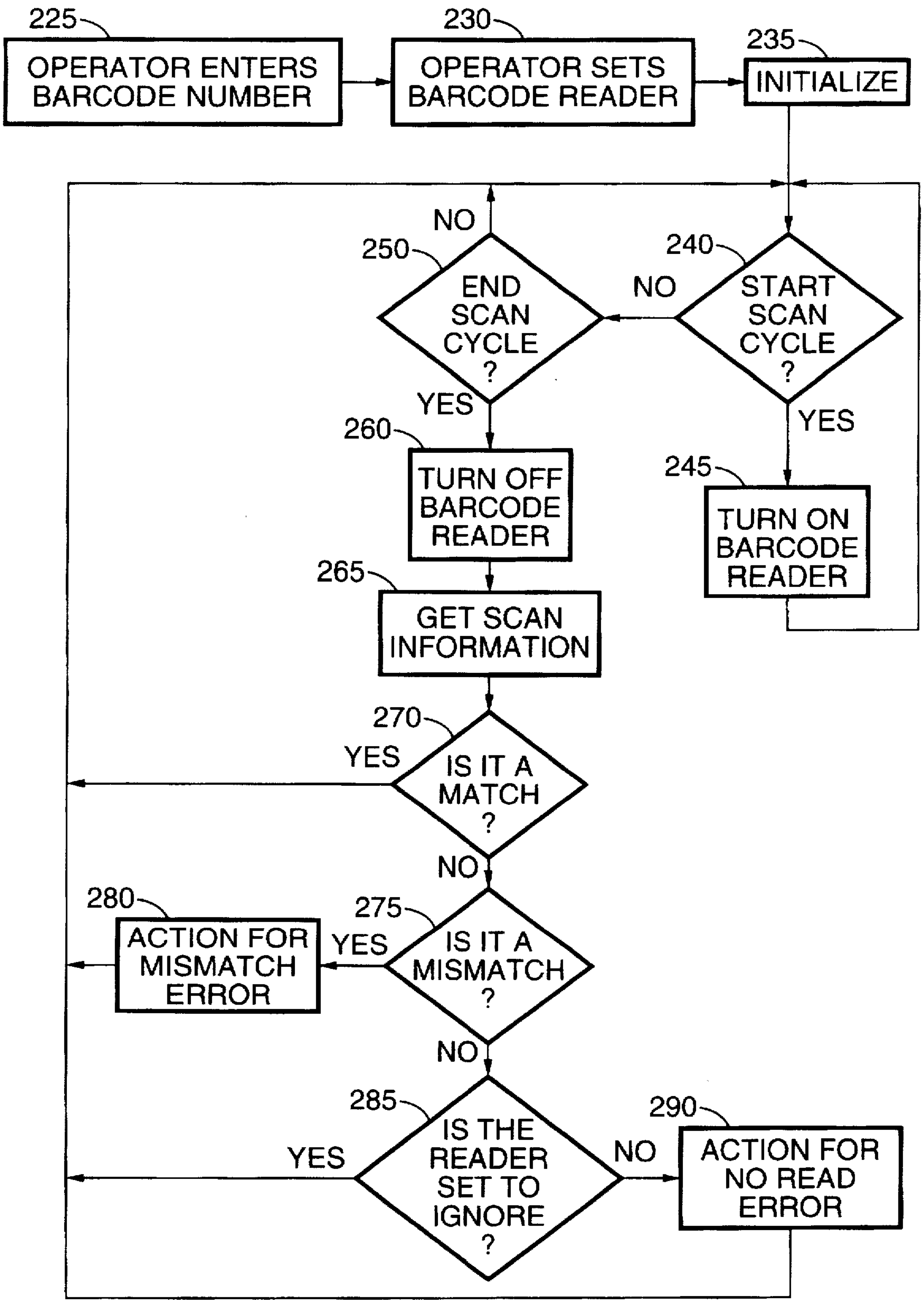
FIG. 16 is a flow diagram of information usually utilized in the subject forms and envelopes verification process.

Referring now to FIGS. 15 and 16, there is shown a preferred embodiment of a dynamic forms and envelopes verification system used to establish that correct forms and envelopes are assembled into a mailing or billing packet. A type of "feedback" control mechanism is incorporated into mailing packet assembly apparatus in which the speed or velocity of the transferred items is linked to the period of time in which the item identification means functions.

As indicated above, the subject verification system is employed in a mailing packet assembly apparatus in which various streams of individual items, comprising various forms and envelopes, are transferred into a final receiving and mailing envelope to create a mailing packet. The forms are often detailed or summary billing statements, check listings, account statements, postcards, advertising fliers, coupons, and similar documents or inserts used by products and services providers and other parties interested in mailing single items or collections of selected items. The envelopes within the mailing envelopes are commonly return envelopes, and the like.

Typically, by way of illustration only and not by way of limitation, the subject verification system is utilized by a bulk mailer to insure that forms and envelopes from one client do not get mixed with forms and envelopes from a different client. For example, a bulk mailer handling the billings for two or more cable television companies or telephone companies may have forms and envelopes that at a quick or first glance appear somewhat similar. However, should one company's form be sent in a second company's envelope, or equivalent type situations, embarrassment and possible loss of a client may result. To facilitate eliminating the possibility of such a mix-up and to run the assembly apparatus at the most efficient speed practical, the subject invention was perfected. Not only does the subject invention dramatically increase the probability of a correctly assembled mailing packet, it allows the assembly apparatus to operate at variable item transferring speeds since the verification process is dynamically coupled through "feed-back" information between the item transferring speed and the item identification process (characteristic indicia scanning process).

Usually, the assembly apparatus is a standard type of mailer inserter that has been modified to include elements necessary for the subject invention. As seen in FIG. 15, a document or form generating device such as a printer PR or the like feeds forms into an inserter I via suitable interfacing hardware such as a sequentially arranged collator to folder CF (combined in FIG. 15 as a general region CF) and an inserter merger region M. Other form generating or supplying devices may be coupled into the incoming flow of items into the inserter I by appropriate means. Various inserts are merged with the form or forms via the inserter I with its associated insert hoppers H. Usually, the inserts include a return envelope. The return envelope transfer means is usually the last hopper, but any of the hoppers H or equivalent means are acceptable. Typically, the mailing envelope E is merged into the flow of items by the inserter I via a mailing envelope pathway (arrow). After assembly by the inserter I the mailing packet is usually sealed by a sealer S and delivered by appropriate means to a transfer means T or outstacker for further processing.

The standard mailing packet assembly apparatus described immediately above is modified in the subject invention to include a data base accessible by an operator interactive controller, computer, or microprocessor. Specifically, a computer 205 is shown in FIG. 15. The data base has information on the exact items that are to be included within each mailing packet or final bill (i.e. the exact enclosures selected from the inserts and document pages). This information may be updated, altered, and the like as necessary. Included in the information within the data base are the types of forms, envelopes (mailing and return), and other inserts required to be within a correctly created and assembled mailing packet.

Each mailable item utilized by the assembly apparatus is marked or encoded with a characteristic machine readable indicia. Usually, the indicia is a bar code (or equivalent means now known or later developed) that identifies the exact type of item. For example, a billing statement for telephone company X with a particular layout, logo, and the like has a characteristic indicia that identifies it as being different from the characteristic indicia on a billing statement for telephone company Z.

Included in the subject invention is means for detecting dynamically the indicia on each indicia encoded form and envelope handled by the assembly apparatus. For clarity, the detection means is described first and then the dynamic element of the detection means is presented. The detection means comprises scanning detectors that are usually bar code readers that scan the indicia encoded items as they pass a particular location in the mailing packet assembly process. Although other equivalent bar code readers are considered as acceptable, a typical brand is a Computer Identics Scan Star operating at about 500 to about 1000 scans per second. Other equivalent means are contemplated to be within the realm of this disclosure and would function in connection with appropriate indicia of the marked items.

The dynamic element of the subject invention is critical in appreciating the advantages that the subject invention has over the prior art devices. Usually, within the controller or computer means is a controlling software program that regulates the scanning period (the time the scanner is scanning the item) each of the scanning devices. This control feature could be hardwired into a microprocessor or the equivalent means for appropriate and suitable situations. Typically the scanners scan the bar codes on each item to be verified as appropriate for inclusion into a mailing packet. The scanners only scan during a scan cycle which is a determined amount of time. The amount of time is determined dynamically based on the transfer speed or velocity of the item being scanned. Since a typical scanner scans a bar code between about 500 and 1000 times per second, even with a rapidly traveling item the scanner will scan the bar code multiple times as the item moves past the scanning device.

Specifically, as noted in FIG. 15, a forms scanner 210 is mounted proximate the printer PR, a return envelope scanner 215 is mounted on the inserter I at a suitable position to detect the indicia encoded on the return envelope, a mailing envelope scanner 220 is mounted on the inserter I at a suitable position to detect the indicia encoded on the mailing envelope. Additionally, scanners can be located at each position that an indicia encoded insert enters the assembly pathway (not shown), but since many inserts are generic in nature and suitable for a plurality of clients, scanners are not as critical and are optional in these locations.

Since the subject scanning detectors are dynamic, each one has a scanning period responsive to the transfer velocity for a particular indicia encoded item. A scan cycle determines the amount of time the indicia detector scans a particular form or envelope. Higher velocities use a shorter scan period while slower velocities use a longer scan period.

In general, during the scanning cycle of the verification process, several possible action requiring events can occur. If a scanner is able to scan and read the bar code, the controller 2055 (computer means or microprocessor equivalent) compares the indicia read (usually a number) with the indicia entered (also, usually a number) by the operator into the computer means from the data base. If the two indicia match, a match counter is incremented. If during the time the item passes by the scanning device, the scanner has read the correct indicia a predefined number of times (dynamically determined based on the time of an item under the scanner at a particular transfer velocity), the item is considered to be correct for transfer to the mailing packet and is transferred to the mailing packet.

If the scanning device is unable to read the bar code the required number of times, a defined action takes place. This action could consist of, but is not limited to, diverting the item for inspection by the operator, stopping the system for inspection of the item by the operator, or allowing the item to be processed normally with no inspection action taken.

If the incorrect indicia from the item is read the required number of times the system takes a defined action. This action could consist of, but is not limited to, diverting the item for inspection by the operator (via the diverter noted above) or stopping the system for inspection of the item by the operator.

The operator can select two different modes for verification of the items. First, the "standard scan mode" causes an error condition only if a "no-read" or "mis-read" occurs. If this happens, a defined action must take place. Second, the "ignore scan mode" causes an error condition only if a "mis-read" occurs. If a "no-read" occurs the controller (computer microprocessor means) allows it to be processed normally.

For clarity of the subject verification process, a controlling flow diagram is depicted in FIG. 16. The FIG. 16 flow diagram is for exemplary purposes only and is not intended to limit the application settings for the subject invention. Either the controller 205 directly accesses the data base or an operator enters 225 directly appropriate information concerning a current mailing packet. Usually, the operator enters 225 a barcode number that will appear on the forms, inserts, or envelopes to be verified. Often the information is presented to the operator on a "job card" that contains the appropriate data base information for a certain batch of mailing packets. For a particular assembly "job" appropriate scan periods for each indicia encoded item are set, based on item transfer velocities, for the scanners.

Once an operator enters 225 the appropriate barcode number, the operator has the option 230 to have the system ignore barcodes that are not readable, for whatever reason, or to stop the system if a "no-read" occurs. The reasons for a "no-read" could be poor print quality of the barcode itself, the system cycles too fast to get a legible read, the reader is out of alignment, or the like.

After the "no-read" option 230, the system is initialized 235 to set all of the possible parameters to the properly selected settings. Following initialization 235, is a control element for starting the scan cycle 240. The start scan cycle 240 element is configured to identify a command sent from whatever source to signal starting the scan cycle. If no command to start the scan cycle is sent, the system will continue to loop until it receives a start command. If a start to scan command is received, the barcode scanner (even though a single barcode scanner is used in this example, usually, more than one barcode scanner is involved) is turned on 245.

Control element 250 involves detecting a command sent from whatever source to end the scan cycle. If no command is received, the system will continue to loop until it receives an end command. If an end scan cycle command is received, the barcode scanner is turned off 260.

Next, the barcode reader information is received 265 and processed 270 to determine if a match of the scanned number to a predetermined number exists. If a correct match exists between the scanned item barcode and the expected barcode number, the form, insert, or envelope is processed normally. If something other than a correct match occurs, a subsequent processing step 275 is initiated. If a scan is a mismatch, a predetermined action is taken so the operator can correct the problem. Often the predetermined action is the system stopping or preferably the item is diverted. If the data is not a mismatch, it is a "no-read" and the item moves to step 285. Note, a mismatch is a number that is readable by the barcode scanner and is different than the predetermined and expected number.

After the mismatch step 285, a question is asked to determine if the scan reader is set to ignore the "no-read." If an ignore setting is selected at step 285, the item is processed normally. If an ignore setting is not selected at step 285, step 290 is initiated. In step 290 if the "no-read" option at step 230 is not set to ignore a "no-read," a predetermined action (the system is stopped, the item is diverted, and the like) will be taken to allow the operator to check the item and correct the problem.

Preferred Dynamic Insertion Process Details

This portion of the subject invention pertains generally to insertion systems for filling enclosures to be mailed together with enclosed billing statements and the like, and more particularly to a dynamic insertion system and method wherein an integrated system controller monitors movement of statements relative to a plurality of insert feeders, and feeds into the statements selected inserts according to stored insert data.

Disclosed is a portion of the subject total system for dynamic insertion of selected enclosures (comprised of inserts and document pages) into bills, billing statements, or mailing packets to be mailed in which post processing mail data, including selective insert parameters, are developed into a data record for mail items and communicated directly to an integrated system controller, which then directs selective insertion of enclosures.

Specifically, this portion of the total system comprises means for preparing mail items, data processing means interfaced with the mail item preparing means, an inserter apparatus having a plurality of insert feeding means, and an integrated system controller interfaced with the data processing means and the inserter apparatus. By way of example and not of limitation, the mail item preparing means generally includes printing means and means for mechanically interfacing the inserter apparatus. The integrated system controller is interfaced with the inserter and directs the insert feeding means to selectively include inserts with the mail items according to stored insert parameter data.

The method of using the present invention generally involves receiving and processing the data for a particular mailing, and developing and storing a record for each mail item. Post processing information is added to this record, including selective insert parameters detailing selective inserts to be included with each mail item. This combined data record is then communicated to the integrated system controller via a network link or other interfacing means. The inserts are placed in feeding means such as insert hoppers, and the system operator enters the insert hopper configuration into the system controller. The mail items are conveyed by the hoppers by suitable means. When the mail items reach the insert hoppers, the system controller searches the data record for the selective insert parameters for each mail item. If a particular insert is required for a mail item according to these parameters, a signal is communicated to the insert hopper by the system controller, activating the hopper and feeding the insert into the mail item.

Since there is no scanning of machine readable codes involved in the matching of selected inserts for each mail item, the insert machine cycle speed is not limited by the speed of scanning detection device cycles. The additional step of printing machine readable indicia on the mail items for scanning and matching has been eliminated. Reliability is enhanced because the danger of insert mismatch from code misreading is eliminated. Identical inserts may be included in more than one insert hopper, with the system controller directing the system controller to switch hoppers when inserts run out, thus eliminating the need for system shutdown to replace inserts depleted from a single hopper.

Figure 17:
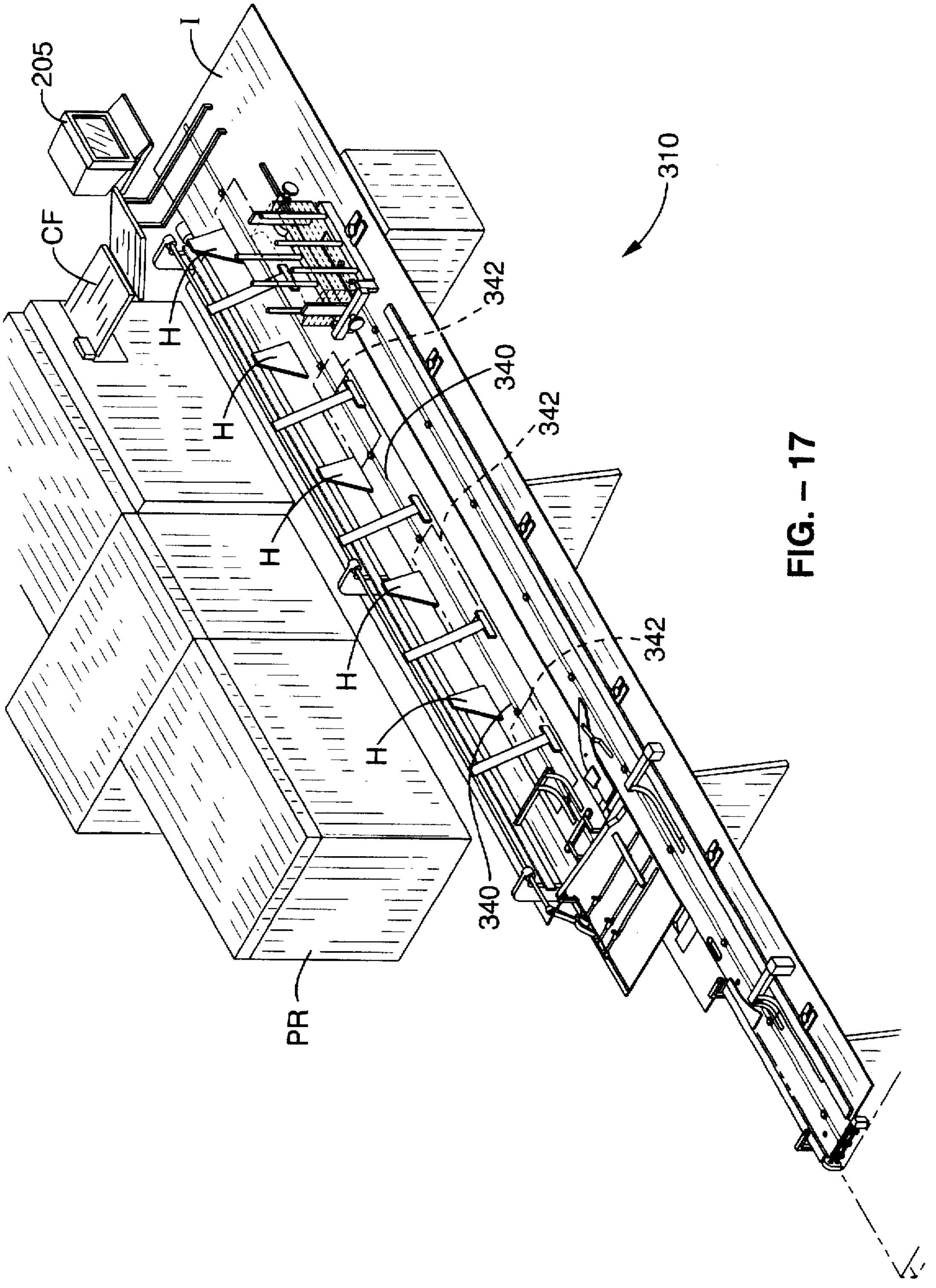
FIG. 17 is a perspective view of a simplified mail inserter apparatus employing the subject invention in which the introduction of additional sheet streams enter at the CF location from other printers.
Figure 18:
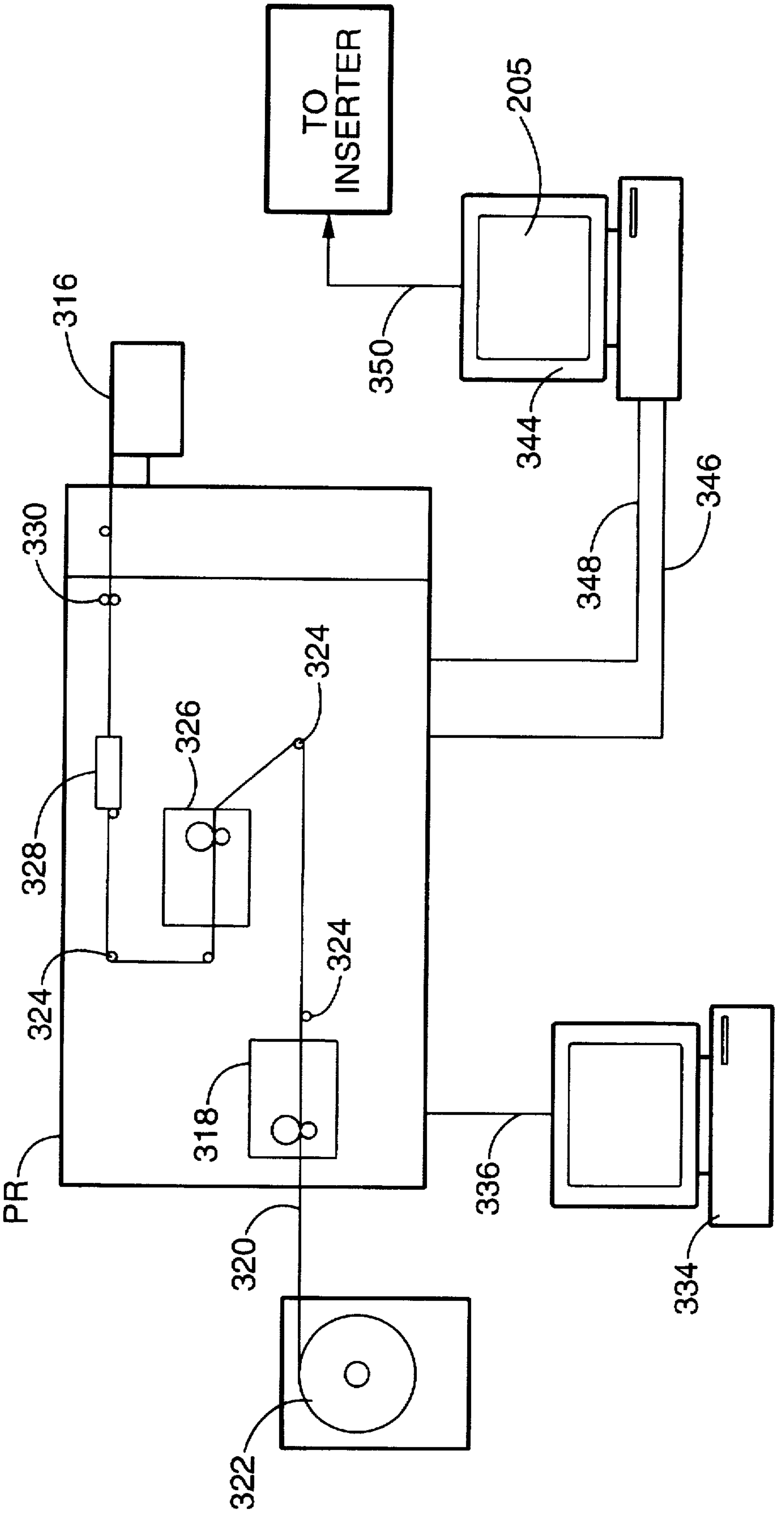
FIG. 18 is a plan view of a typical mail item preparation system employing the subject invention.

Referring now to FIG. 17 and FIG. 18, for illustrative purposes there is shown a preferred embodiment of a process within the total subject invention entitled a dynamic insertion system 310 for including selected inserts in mailed packets or statements. Included are means for preparing mail items or bill document pages, preferably in the form of a mail item preparation apparatus PR, usually an exemplary duplex printer, however, a simplex printer or a combination printer is acceptable. Also, included is the inserter apparatus I which has means for mechanically interfacing to the printer PR. The mechanical interface means preferably includes mail item transferring means in the form of a sequentially arranged collator and folder CF (denoted in FIG. 17 by a generalized region CF).

The duplex printer PR shown in FIG. 18 is typically comprised of two print engines 318 and 326 which print on both sides of incoming paper 320. In the shown duplex printer PR example, a first print engine 318, printing on one surface of the incoming paper 320, receives the paper 320 in a continuous form from an unwinder 322. Although FIG. 18 depicts a paper feeding means that is a spooled system, any paper delivery means is contemplated to be within the realm of this disclosure such as, but not limited to, single sheet providing procedures. Paper 320 is moved through the printer PR by suitable actuation means generally used in the art. Paper 320 is directionally oriented within the printer by a plurality of turnbars 324. As shown, the second print engine 326, printing on the other surface of the incoming paper 320, is included to produce the duplex printing ability. Paper 320, including printed mail items thereon, is directed by turnbars 324 (or other suitable means) from print engines 318 and 326 to separating means such as separator or burster 328, wherein the continuous paper is separated into individual mail items which are generally fed through directing rollers 330 or other directing means to transfer means 316. The transfer tray 16, or equivalent means which is the FIG. 17 denoted collator and folder CF, directs the mail items to the inserter I, as directed by a system controller 205, discussed further below.

The duplex printer PR is driven by internal processing means and by suitable data processing means, preferably in the form of a microprocessor or personal computer 334 (referred to as the "dumb" terminal in FIG. 1, although the "dumb" terminal may be a standard PC), connected to the printer PR by interfacing means for communication, shown here as data communication interface 336.

Referring more particularly to FIG. 17, the inserter apparatus I is of generally longitudinal shape so that a plurality of insert feeding means, preferably in the form of vacuum-actuated insert feeders or hoppers H, are located along the length of inserter I. Conveying means for mail items is shown here as conveyor path 340. Mail items are received by conveyor path 340 from the transfer means by suitable means commonly used in the art. Mail items 342 are translated along conveyor path 340 past each insert hopper H.

The inserter I is driven by integrated system controlling means, preferably in the form of integrated system controller 205. Interfacing communication means, preferably in the form of network linking means such as ETHERNET interface 346 and parallel interface 348 provide data communication from the printer PR and computer 334 to system controller computer 205. Interfacing communication means, shown here as communication interface 350 (various standard types are suitable), allows control instructions from system controller computer 205 to be directed to inserter apparatus I and insert hoppers H. The controller 205 generally includes data processing means, and means for inputting configuration data for the insert hoppers. Data input means may be by keyboard, floppy disk, or by interfacing link to another data processing device. The system controller 205 generally includes means for monitoring the position and movement of mail items along inserter apparatus I relative to insert hoppers H. The monitoring means is typically in the form of one or more photocell detectors or other equivalent position detecting means, which note the presence or absence of mail items at particular locations on the inserter I or a shaft encoder and tracking system within the controller.

Figure 19:
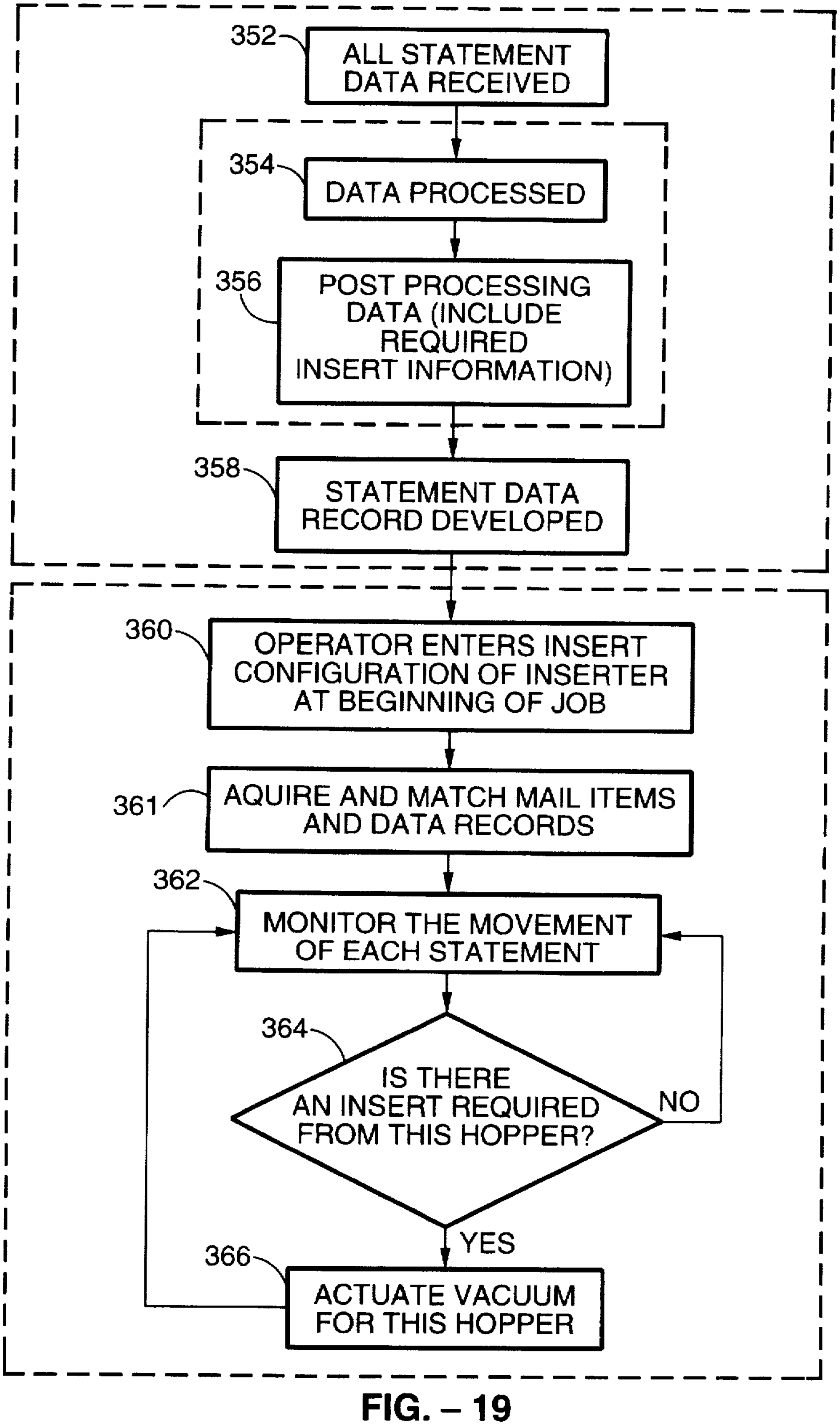
FIG. 19 is a flow diagram of information generally utilized in the subject invention.

For clarity of the subject dynamic insertion process, a controlling flow diagram is generally depicted in FIG. 19. The flow diagram in FIG. 19 is for exemplary purposes, and not intended as a limitation on the present invention. The bulk mailer generally receives 352 mailing data for high-volume mailing jobs from clients who mail monthly billing statements, account information, mass advertising, and the like, to large numbers of mail recipients. An operator for the bulk mailer processes 354 the mailing data, generally preparing a strategy for the bulk mailing job according to the client's instructions. The operator includes 356 postal processing data with the processed mail data, the post processing data containing selective insert parameters for individual mail recipients. The operator thus develops 358 a data record for each mail item in the bulk mailing job. This data record identifies, among other things, which inserts will ultimately be included with each mail item. Generally, the aforementioned data is entered upon, processed, and stored by the central informational computer noted above and interfaced to the mail item preparation system.

Once the mail item data record has been developed and stored, the operator (this can be accomplished electronically too) enters 360 the insert hopper configuration parameters into the integrated system controller computer, thus informing the controller computer which insert hoppers include particular inserts.

Following entering 360 of the insert hopper configuration, the insert system comprising the present invention is physically activated to acquire and match the mail items and data records 361, so that the mail preparing apparatus prints, separates, and organizes the mail items for physical transfer to the inserter apparatus. The subject process reliably matches the logical record and the physical mail item before the item is assembled.

As the mail items move along the inserter apparatus past the insert hoppers, the system controller monitors 362 the movement and position of each mail item 342 relative to the insert hoppers. As aforementioned, monitoring 362 is preferably accomplished by a plurality of photocells at select locations and the shaft encoder and tracking software.

As the system controller monitors 362 the movement of mail items, the system controller tracks 364 the item 342, along with its control record and applies insert data as needed at each insert hopper. This tracking 364 preferably occurs for each insert hopper one machine cycle before the actual mail item 342 arrives in front of the hopper. If the stored insert parameter data does not indicate that a particular insert is to be fed to the mail item from a particular hopper, the monitoring 362 of mail item movement continues, and the mail item moves past the hopper. If, however, the insert parameters require a particular insert to be included with the mail item, an insert hopper actuation step 66 is initiated, wherein an insert is included with the mail item. Actuation of the hopper is generally accomplished by use of vacuum or compressed air. Once the insert has been added, the monitoring 362 of mail item movement and receiving 364 of insert data continues, as the mail items proceed past each of the insert hoppers. Insert hopper actuation 362 occurs at subsequent hoppers according to the insert parameters received 364 by the system controller from the data processor containing the data record. Ultimately, the mail items move past the last insert hopper, and are directed by the system controller on to downstream processes such as envelope insertion and sealing and postage metering (not shown).

Preferred Mailing Envelope Edge Marker Process Details

A device for marking the edge of a document with indicia relevant for processing the document is disclosed in conjunction with the subject overall system. More specifically, an apparatus is related that labels the edges of important or strategic envelopes that are stacked into piles for later quick identification of those important or strategic envelopes.

Disclosed is a portion of the subject invention for marking an edge of a mailing piece, thereby permitting identification of the marked mailing piece. Generally, the subject invention comprises means for determining if the edge of the mailing piece is to be marked, means for directing the marking of the edge of the mailing piece, and means for marking the edge of the mailing piece.

More specifically, the subject process for marking an edge of a mailing piece, thereby permitting identification of the marked mailing piece within a stack of usually similar mailing pieces, comprises controller or computer means for determining if the edge of the mailing piece is to be marked and for directing the marking of the edge of the mailing piece. Included is an indicia placing means that transfers a characteristic mark to at least the edge of the mailing desired piece, usually after the mailing piece is assembled. The characteristic mark is, when the marked mailing piece is stacked with other similar mailing pieces, either or both an operator readable indicia or/and a machine readable indicia.

Ordinarily the subject apparatus marking means comprises a plurality of indicia imprinting means. Preferably, each indicia imprinting means within the plurality of indicia imprinting means is a solenoid linked to an inked marking pad, wherein when the solenoid is activated the solenoid forces the marking pad against the mailing piece's edge thereby marking the edge of the mailing piece. Generally, each marking pad has a characteristic ink color not duplicated in another solenoid linked marking pad within the plurality of indicia imprinting means. When each of the solenoids is activated the solenoid forces the marking pad against the mailing piece's edge thereby marking the edge of the mailing piece with any one color or a plurality of colors.

Figure 20:
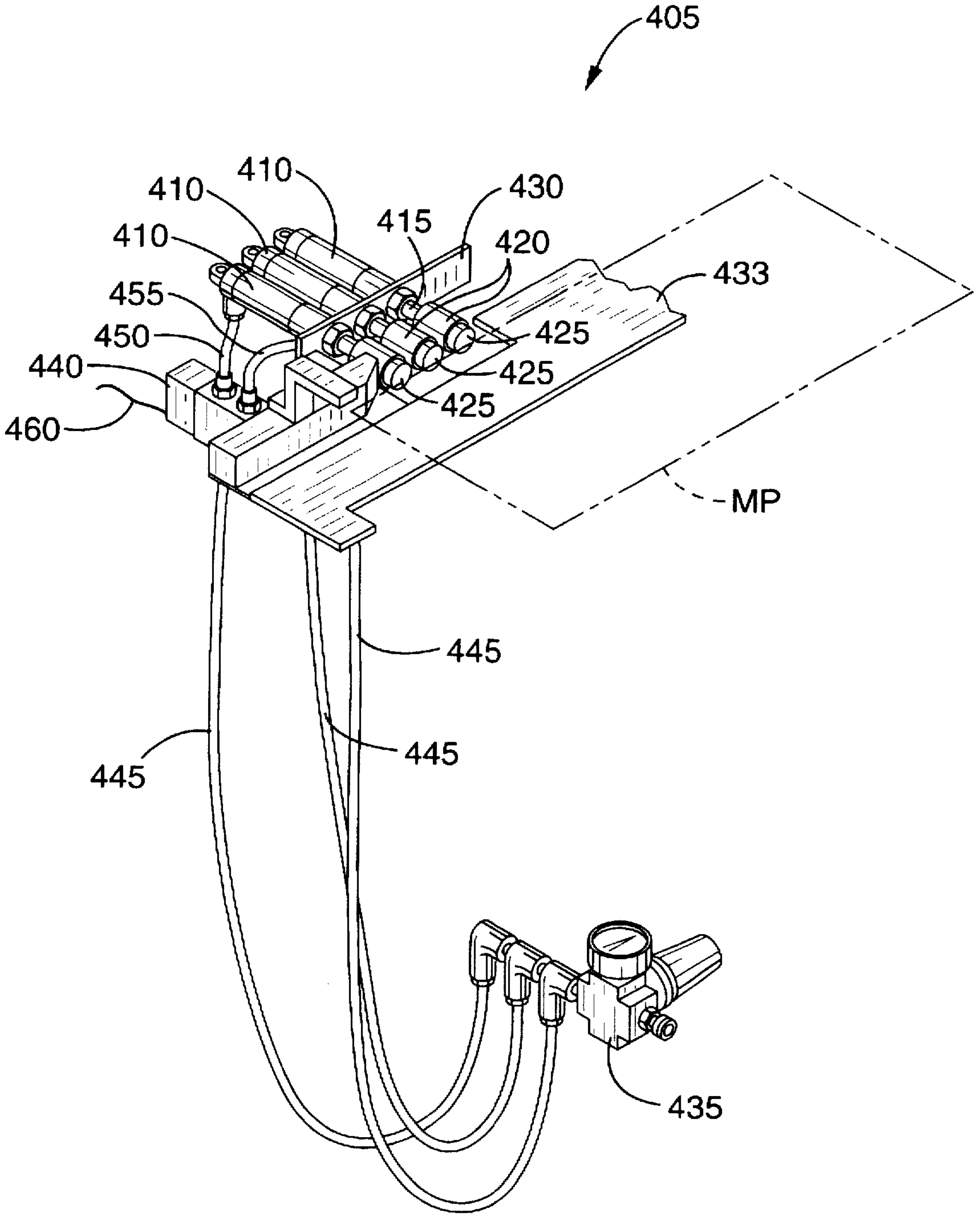
FIG. 20 is a perspective view of the subject invention showing a preferred embodiment thereof, including a typical mounting plate.
Figure 21:
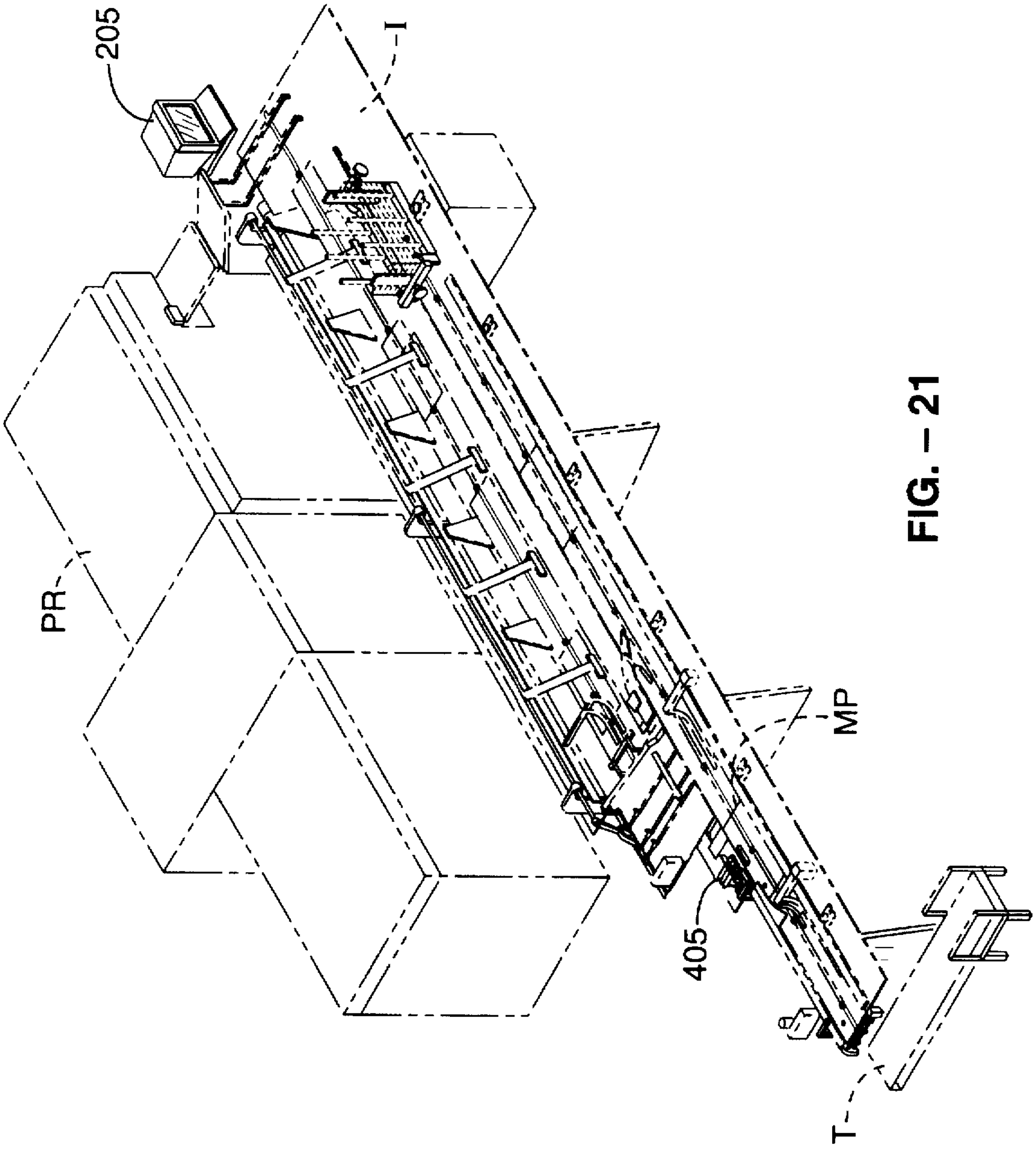
FIG. 21 is a perspective view of the subject invention secured to a generalized mailing piece handler.
Figure 22:
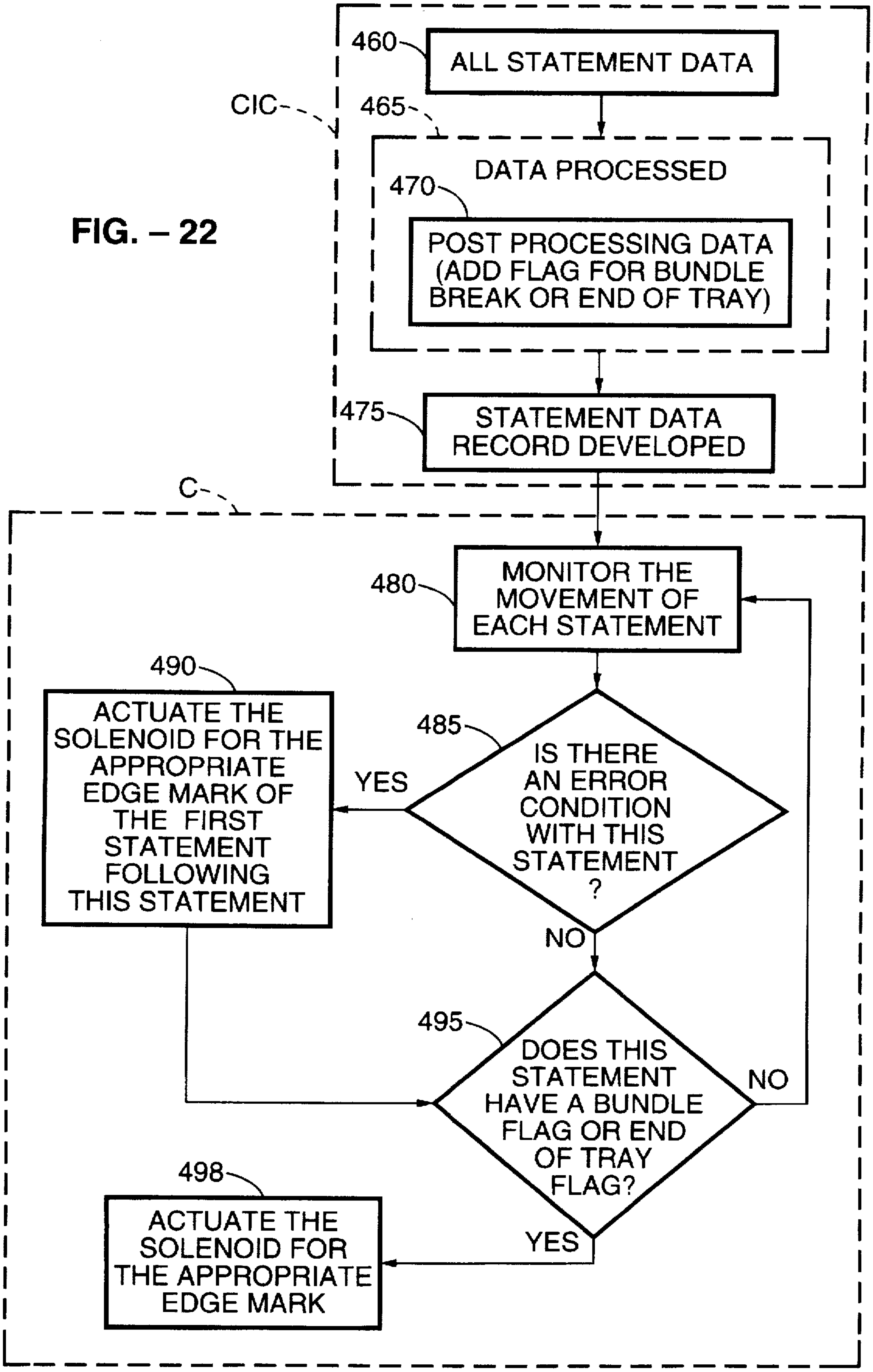
FIG. 22 is a flow diagram of the information utilized to control the subject edge marking apparatus in which the introduction of additional sheet streams enter at the CF location from other printers.

Referring now to FIGS. 20–22, there is shown a preferred embodiment of a mailing piece marker system for placing indicia on the edge of a mailing piece. The subject subsystem comprises an apparatus or system for marking the edge of a mailing piece with an operator or machine readable code. By marking the edge of a mailing piece an operator or machine can detect the presence of one or more marked items within a stack of similar items by merely viewing the edge of the complete stack, without the need of separating the stack into its component items.

The subject system includes means for determining if the edge of the mailing piece is to be marked, means for directing the marking of the edge of the mailing piece, and means for marking the edge of the mailing piece. FIG. 20 illustrates a preferred embodiment of the edge marking means 405. When directed by the controller or computer means (means for determining if the edge of the mailing piece is to be marked and the means for directing the marking of the edge of the mailing piece), an edge of a mailing piece is marked for either an operator or a machine to detect. For an operator to see easily, the mark is usually a broad dark brand. With such an easily visible mark or brand, an operator can quickly scan a stack of items with one or more marked individual items such as a packed mailing tray containing a stack of envelopes (or other edge marked items such as cards and the like) and see exactly where a required action is to be taken. A required action might involve noting where a mailing batch or mailing tray break should occur or where an error in a statement is detected by the controlling means.

The edge marking means 405 comprises an indicia placing means that transfers a characteristic mark to at least the edge of the mailing piece MP (usually a mailing envelope containing the billing documents and inserts), usually, after the mailing piece is processed or assembled. The characteristic mark is either or both an operator readable or/and machine readable indicia. Operator readable indicia includes black, colored, patterned, or the like marks placed on the edge of the mailing piece. The mark is placed to permit detection of the mark when the mailing piece is stacked with other mailing pieces, usually similar, and aligned to permit only viewing of the edges.

More specifically, the edge marking means 405 comprises a plurality of indicia imprinting means. FIG. 20 depicts the plurality of indicia imprinting means as a series of solenoids 410 associated with the required components for the imprinting. Each solenoid 410 has a plunger 415 linked or secured to a marker housing 420. Within each marker housing 420 is a marker pad 425. The marker pad 425 includes a suitable ink, dye, or equivalent material for operator or machine detection and may include compounds such a magnetic or optically suitable substances and the like for machine detection. Each of the marking pads 425 within a set of solenoids 410 may have a characteristic ink color. Therefore, when desired, within a plurality of marking pads 425 found in the subject apparatus, the characteristic ink color is not duplicated in another solenoid linked marking pad 425. FIG. 20 shows three solenoids 410 and the ink for each associated pad 425 may be black or colored, as desired. By placing combinations of ink pad marks (a series of black with black, or black with other colors, or various colors, and the like) on the mailing piece MP edge various codes are communicated to an operator or reading machine.

Although other equivalent configurations are contemplated, preferably, the solenoids 410 are affixed to a mounting plate 430. The mounting plate is attached to a base member 433 that is a portion of a machine utilizing the subject invention or a separate element that fastens to a machine utilizing the subject invention.

The means for directing the use of the edge marker activates each required solenoid via a driving force such as electricity, pressure (either positive or negative pressure), and the like. Shown in FIG. 20 is a pressure driven solenoid apparatus. Required pressure is delivered through an appropriate valve and coupling component 435. Each solenoid 410 is connected via an attachment and control member 440 and by a pressure line 445 to the valve 435. The pressure line attachment and control member 440 feeds the pressure via standard lines 450 and 455 to activate or inactivate each solenoid 410. Each pressure line attachment and control member 440 functions to accept a signal or signals from the means directing the marking to occur. An (or more) electrical connector 460 transfers the activation or deactivation signal or signals to each solenoid 410 from the controller 205 (see FIG. 21).

Generally, the subject system comprises, in addition to the marking means 405, either combined or separate means for determining if the edge of the mailing piece MP is to be marked and means for directing the marking of the edge of the mailing piece MP. As seen in FIG. 20, when a mailing piece MP is to be marked the mailing piece MP encounters the subject marking apparatus 405 by presenting an edge to be marked. For further clarity on how the subject invention functions, FIG. 21 is presented. FIG. 21 illustrates the subject invention incorporated into a typical setting involving an envelope inserter I (usually the above mentioned PHILLIPSBURG inserter device). Once an envelope (mailing piece) MP is marked, the marked envelope MP is transferred to post marking equipment T.

As indicated, controlling the marking apparatus are means for determining if the edge of the mailing piece is to be marked and means for directing the marking of the mailing piece by the marking means 405. Preferably, the two determining and directing means are combined into the controller, computer means, or computer 205, shown in FIG. 21. The controller 205 is programmed (either hard or soft programming) with the requirements for determining if any mailing piece edge is to be marked. The programming may include accessing databases involving postal requirement and other information for any particular set of items being processed. Additionally and usually, the controller 205 is also programmed to activate the marking means 405 when the determining means determines the edge of the mailing piece is to be marked. Activation is generally by transmitting an appropriate signal to the marking means 405.

The following specific instance for implementing the subject system in a bulk mailing setting is presented by way of example only and not by way of limitation. The subject invention is utilized to place relevant information on the edges of envelopes that contain billing statements. Statement data is processed by the controller and a record for each statement is developed. As the data is processed, relevant information (such as information for determining if the edge of the statement is to be marked) needed for handling the statement is added to the record. Statement handling includes but is not limited to mailing purposes such as filling a mailing tray efficiently and economically, qualifying for desirable bulk postal rates, and the like. Within the handling information for a particular record is a flag for a bundle break or the last statement in a mailing tray. When the statement is passing by the subject edge marking apparatus, the subject edge marker is activated and the envelope marked with a code to indicate that the envelope is at a bundle break, the last statement in a mailing tray, or the like.

Additionally, the controller monitors the location and activities of each statement during processing for mailing. If an error condition (missing information, misprint, or the like) arises in a statement that will cause the statement to be diverted out of the normal flow for correction, the controller or computer means causes the statement following the erred statement to receive the appropriate edge mark code. An operator or other detection device identifies the edge mark code and performs the required action such as inserting a corrected statement or the like.

FIG. 22 illustrates a specific control scheme flow diagram for the controller of the subject invention as involved in the above bulk mailing example. For processing billing statements the data is handled in the central information computer CIC. The data 460 for all of the statements is processed 465 and post processing additional data is attached 470 such as adding a flag for a mailing bundle break or an end of mailing tray notation. From this post processing data 470 a statement data record is developed 475.

Generally, the statement data record 475 is transferred physically or electronically to the subject system controller 205 that monitors the movement of each statement or billing document and inserts 480 within the mailing process or assembly of a mailing packet or item containing the billing statement. The controller 205 ask if there is an error condition detected with the statement 485. If an error condition is detected 490 a (this may be one or more) marking pad associated solenoid 410 is activated to mark the edge of the statement following the statement that had the error. If no error condition is detected 495, or the error has been detected and the edge marked, the controller 205 asks if the statement has a bundle flag or end of tray flag. If no flag is set the statement is passed on to any further processing, but if a flag is set 498 a (this may be one or more) marking pad associated solenoid 410 is activated to mark the appropriate edge. For example, the error condition detected in step 490 might cause a red mark to be placed on the edge of the statement, while a bundle flag might cause a green mark to be made, and an end of tray flag might cause a blue mark to be scored of the appropriate edge. Naturally, the exact colors or combinations of colors for the coding marks are arbitrary and are selectable for any particular situation.

Preferred Wetting and Sealing Process Details

Disclosed is an automated apparatus for spray wetting a glue covered region on an envelope flap and sealing the wetted envelope flap to an associated envelope. More specifically, a dynamically controlled wetting and sealing system having a spraying module, a sealing unit, and control means is related.

Disclosed for utilization with an envelope having a flap, a body, and a fold region connecting the flap to the body, is a wetting and sealing apparatus. The subject apparatus is for wetting the envelope flap with a liquid and sealing, after folding at the fold region, the wetted envelope flap to the envelope body. Comprising the subject invention is a controller means for monitoring envelope processing, including detecting any envelope processing errors and for directing the wetting and sealing operations. Wetting means for applying the liquid, usually water, producing an active adhesive to the envelope flap is included. Usually, provided are means for folding the wetted envelope flap at the folding region. Additionally, means for sealing the folded and wetted envelope flap to the envelope body is encompassed. Further, supplied is a means for folding the envelope flap against the envelope body.

More specifically, the controller means generally comprises a computer programmed to activate the wetting means only when no envelope processing error is detected by the computer. The controller is also programmed to activate the sealing means at appropriate times, usually with or without the envelope having a wetted flap.

Included in a preferred embodiment of the subject invention are means for maintaining the wetting means in a primed state. The wetting means usually comprises an air actuated nozzle that sprays the envelope flap with water via a plurality of spray bursts. Each of the spray bursts is for a computer initiated first period of time. Generally, the primed state maintaining means comprises releasing a burst of spray from the nozzle for a computer initiated second period of time if the envelope has not moved in a computer determined third period of time. A collection means is included to gather excess moisture during the wetting and priming events.

The sealing means comprises a pressure foot that presses or "stomps" the wetted envelope flap against the envelope body. The computer directs and coordinates the application of the pressure foot.

Referring now to FIGS. 23–30, there is shown a preferred embodiment of a wetting and sealing units 505 and the controller or computer 205 of the subject invention. Generally, the subject apparatus is utilized in connection with the envelope assembly system that assembles mailing pieces for bulk mailing operations. As indicated above, the assembled mailing piece often comprises an outer mailing envelope, internal forms or folded pages (such as detailed and summary billing statements), inserts (such as advertisements, notices, and the like), a return envelope, and similar items. Each mailing envelope is of a traditional or standard configuration having a flap with an area for adhesive, a body, and a fold region connecting the flap to the body. Usually, the envelope or mailing piece assembly system comprises a forms or pages source such as the duplex printer PR, means (shown here for simplicity and summary as combined) for collating duplex printed pages with simplex printed pages and folding or a transport assembly for transferring the forms or pages to subsequent equipment CF, a traditional (PHILLIPSBURG) envelope inserter machine I that places various hopper H held inserts into a mailing envelope E, and a transport T apparatus for subsequent processing of the stuffed and sealed envelopes (in particular, see FIG. 23). The subject envelope wetting means and sealing means 505 are positioned at the end of the inserter I, between the point on the inserter I at which the inserts are actually inserted into the envelope by the insertion means (usually inserter arms IA) and the subsequent transport T apparatus.

Figure 23:
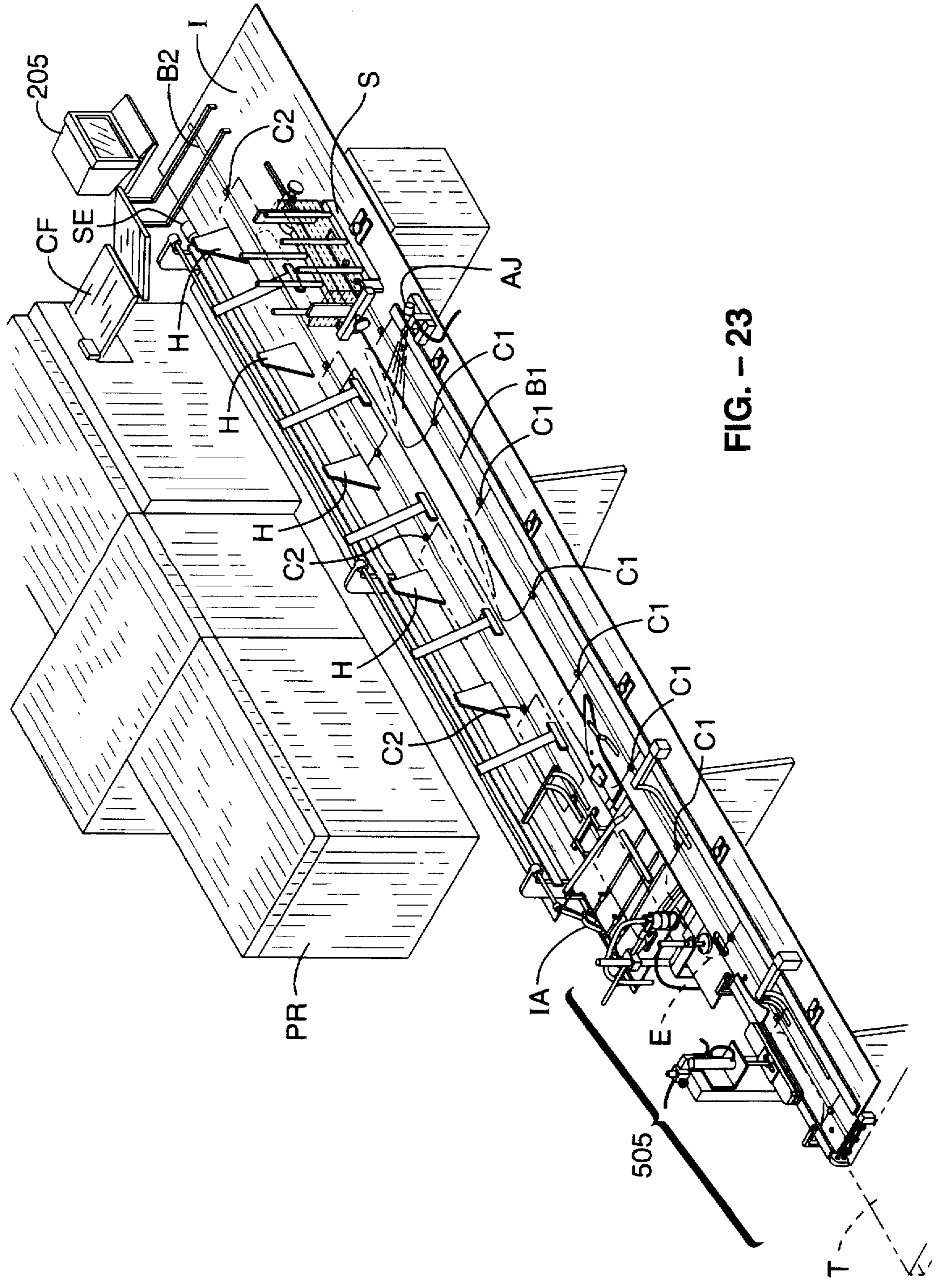
FIG. 23 is a perspective view of the subject invention illustrating use on a typical envelope processing or assembly system having a printer, folder, and inserter.

Usually, a typical mailing piece comprising a bill from a product or service provider is assembled as follows: 1) detailed and summary statement sheets are printed in the high speed printers (duplex PR and simplex (not shown in this series of FIGS. 23–30 and also not directly shown in FIG. 23 is a multi-printer system except via the abbreviated notation of the CF collation and folding means that includes multi-printers bringing in sheets for collation)); 2) the statement sheets are collated and folded by suitable means CF and transferred to the inserter machine I and collected in with the subsequent inserts; 3) from a mailing envelope source S, mailing envelopes E have their flaps opened by an air jet and associated components AJ and are moved across the upper surface of the inserter by appropriate means such as a first chain or belt B1 system with claws C1 for catching each envelope E; 4) single or multiple inserts are supplied via the various hoppers H and associated mechanisms and delivered by a second chain or belt B2 system with claws C2 to the actual insertion means or insertion arms IA; 5) to avoid hitting the envelope flaps, each envelope E flap is deflected downwardly and enters a lower region via an entrance EN (see FIG. 28 for details) and the insertion arms IA slide each insert packet (inserts and statements) into each mailing envelope E; 6) each stuffed envelope is moved to the subject wetting means and the flap emerges from below the upper surface of the inserter I via an exit EX (again, see FIG. 28 for details) and is once again exposed and wetted (an encoding device ED is often included for dating or marking each envelope after it is wetted); 7) the wetted envelope moves past a subject flap folding means that folds the flap against the body of the envelope; 8) each envelope is "stomped" or pressed by the subject sealing means to seal wetted flaps to the envelope; and 9) the assembled mailing piece is placed in a transport T apparatus for subsequent processing. It must be noted that even though the above scheme is a common assembly pathway, more complex assembly pathways are contemplated and will be discussed in more detail below and include detection of errors in a mailing piece and stopping the assembly process for whatever reason.

More specifically, the subject invention comprises a wetting and sealing apparatus having a controller means for overseeing the assembly operation. Although the controller means may be any now known or later developed hardwired or equivalent means, preferably, the controller means is the previously described computer 205 programmed to monitor and direct the assembly of each mailing piece according to appropriate data base and equivalent information. The controller 205 is normally used by an operator and is a stand alone unit or linked directly or indirectly to additional hardware and software, or the equivalent, having additional information and controlling routines. The controller 205 monitors and directs, usually in cooperation with the operator, the various phases of the assembly process.

Since the controller 205 oversees the assembly process, the location of each item comprising the mailing piece is carefully tracked. The computer is configured and equipped with appropriate input devices to detect various errors such as mismatched forms, inserts, envelopes, and the like. Such error detection devices include readers (bar code readers and the like) that scan for indicia encoded forms, envelopes, inserts, and the like to verify that correct items are within each mailing piece. When errors are encountered by the controller 205 the assembly process can be halted or allowed to proceed, depending upon an operator's election or standard protocol. Typically, should a faulty mailing piece be detected the computer has the option of stopping the process or simply not wetting the incorrectly assembled piece, thereby producing a non-sealed mailing piece that can be checked by the operator. Usually, when no envelope processing error is detected by the computer the subject wetting means is activated.

The subject computer establishes the locations for the various mailing pieces and items to go within mailing pieces by tracking encoded indicia at known positions in the apparatus and by utilizing the machine cycle of the typical inserter I. A typical inserter I includes a central rotating timing and drive shaft that operates the insert hoppers H, insertion means IA, drive chains C1 and C2, mailing envelope opener AJ, and the like. A standard shaft encoder SE is coupled to the inserter's central timing shaft and utilized to fix the position of any item on the inserter I. Combining the established locations for the error detection scanners with the information derived from the shaft encoder allows the computer to know when each correctly assembled mailing piece needs to have its mailing envelope flap sprayed with a wetting liquid. Should an incorrectly assembled mailing piece reach the subject wetting means, the controller 205 merely directs that no wetting occur for that piece. Since a mailing piece that is not wetted will not seal, to simplify the sealing process, all of the mailing pieces passing through the sealing means can be acted upon (pressured clamped) and only the correctly assembled ones will seal. Although not preferred, it is noted that the sealer means may be turned off for any non-wetted mailing piece.

Further comprising this portion of the subject invention is the wetting means. The subject means for wetting an envelope flap is shown in FIGS. 23, 24, 25, and 28. After the correct inserts, forms, and the like are inserted into the mailing envelope E by the associated inserter I, the mailing envelope is ready to be sealed. However, should the controller detect that an incorrectly assembled mailing piece is present the wetting means is usually not activated, thereby producing a non-sealable (not wetted) envelope that can easily be opened and corrected by the operator.

Most envelopes wetted by the subject system have on the underside of the flap (underside after sealing against the body of the envelope) a pre-applied adhesive or gluing material. Although the liquid applied to the flap of the envelope is generally and preferably water of a like solution that wets and activates the pre-applied adhesive or glue material, the adhesive itself could be delivered by the subject wetting system. The mainly water liquid may have additional substances to aid in the wetting process.

Figure 25:
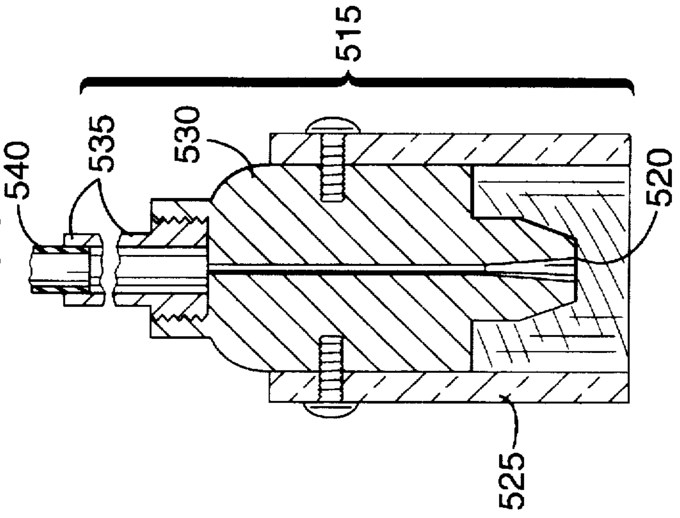
FIG. 25 is a perspective view of the spray head of the subject invention.
Figure 24:
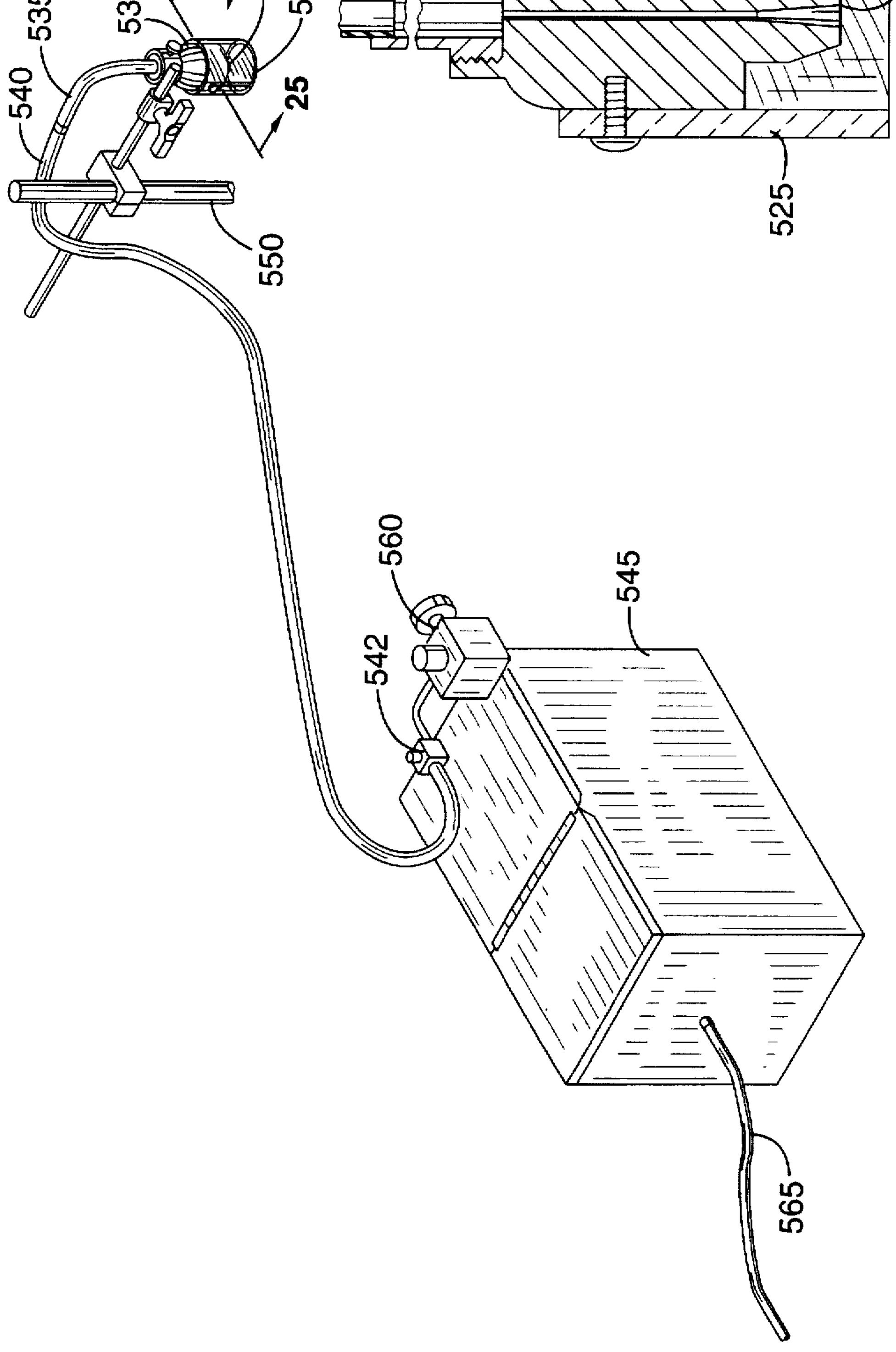
FIG. 24 is a perspective view of the spray unit of the subject invention.
Figure 28:
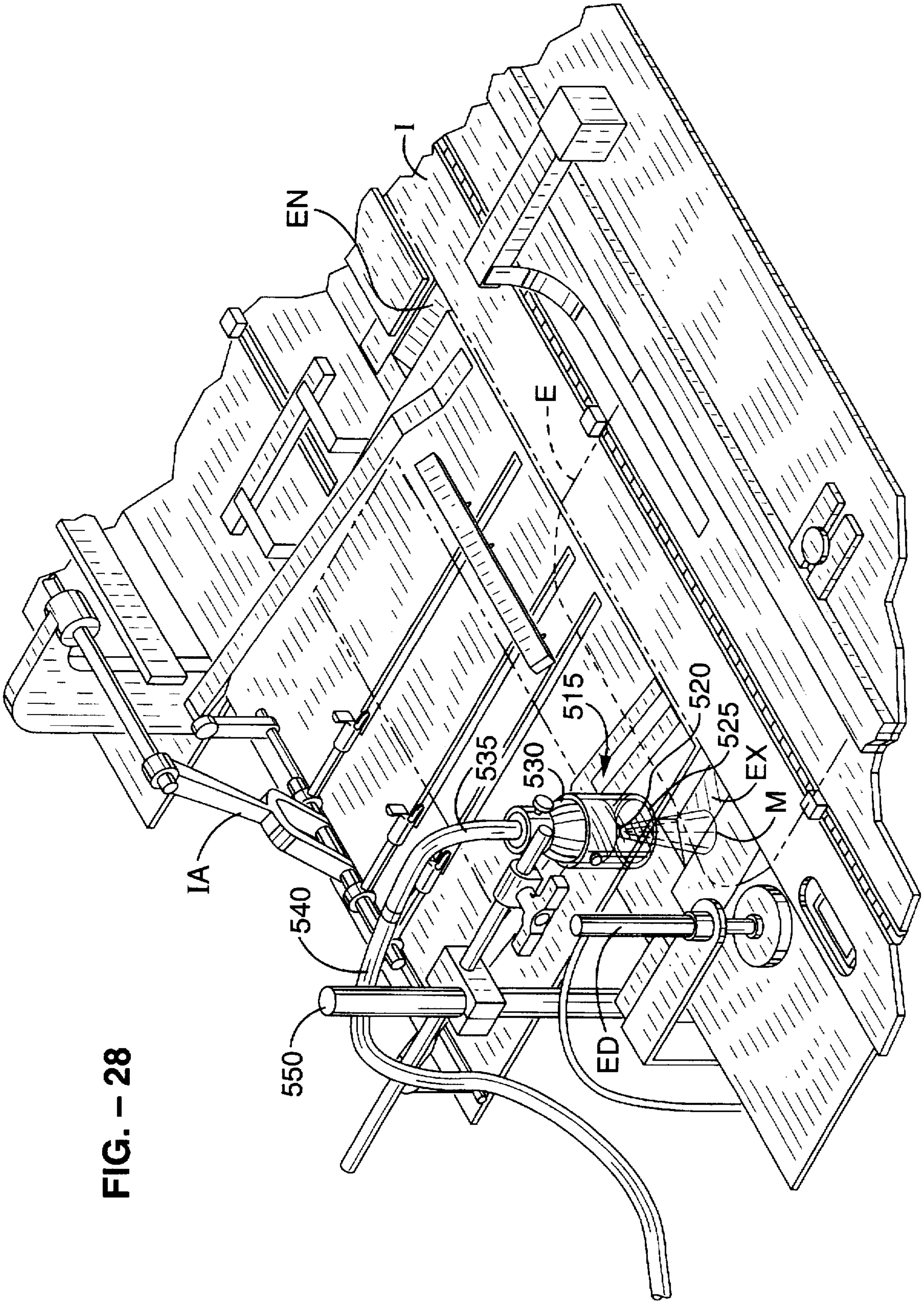
FIG. 28 is a perspective view of the wetting means of the subject invention associated with an inserter apparatus.

Referring in particular to FIGS. 24, 25, and 28, comprising the preferred wetting means is a spraying head 515 (enlarged in FIG. 25) having a nozzle 520 and mist collecting hood 525 secured to a mounting member 530. Feeding the nozzle 520 with liquid is a spray arm member 535 that leads via a hose 540 and coupler 542 to the liquid reservoir 545. A brace member 550 anchors the spraying head 515 to the associated inserter I.

Since the spraying head nozzle 520 is preferably an air actuated system, the liquid reservoir 545 also includes an air source with necessary pressure gauges 560. The hose 540 is usually a coaxial structure having an inner water tube and an outer air passageway. The water is drawn out of the inner feeder tube by the pressurized air escaping through the spray nozzle 520 in a type of Venturi phenomenon. The escaping air causes the exiting liquid to atomized into a mist M (see FIG. 28 for indication of mist M) which is directed onto the flap.

The air driven type of liquid spray delivery system is easily activated by the subject controller which is connected via appropriate means 565. Usually the spray head 515 is turned on by the controller 205 for a set period of time. The duration of the spray burst may be varied as needed. Generally, the controller 205 activates the spraying head 515 for a series of spray bursts. The advantage of utilizing a plurality of spray bursts is that the speed of the passing envelope can vary yet sufficient wetting of the flap occurs. For example, if the envelope is moving at a rapid velocity, the flap is wetted by perhaps the middle or last bursts in a series of spray bursts. If the envelope is moving at a slow velocity, the flap is wetted by perhaps the initial or middle bursts in a series of spray bursts. The exact number of spray bursts can vary between one and ten or greater, however, between three and five is more usual and preferably four spray bursts has been found acceptable in most instances. Each spray burst is usually for approximately the same span of time, but variable time periods are contemplated.

Because the envelopes can travel at relatively high speeds or velocities and can move from the stuffing position on the inserter I to the wetting means in a short interval of time, the wetting means is equipped with a priming mechanism to keep the spray head 515 in a primed condition or state between envelopes E and ready to immediately deliver a spray after either a short or prolonged delay. When the associated inserter I pauses, the liquid in the feeder tube tends to drain back into the reservoir 545, thereby requiring a finite amount of time for the expended air to bring the liquid back to the tip on the nozzle 520 for wetting. The delay in delivering liquid to the nozzle 520 tip could result in non-wetted and thus non-sealed envelopes. To overcome this difficulty, the priming scheme was developed. The controller is programmed to keep the spraying head 515 primed by initiating a timed pulse or burst of mist after a determined period of time, even when no envelopes are beneath the spraying head 515. For convenience and neatness, the priming mist M or excess wetting mist M is conveyed into a liquid waste container via the envelope exit EX and is transported away from the envelope pathway.

Figure 26:
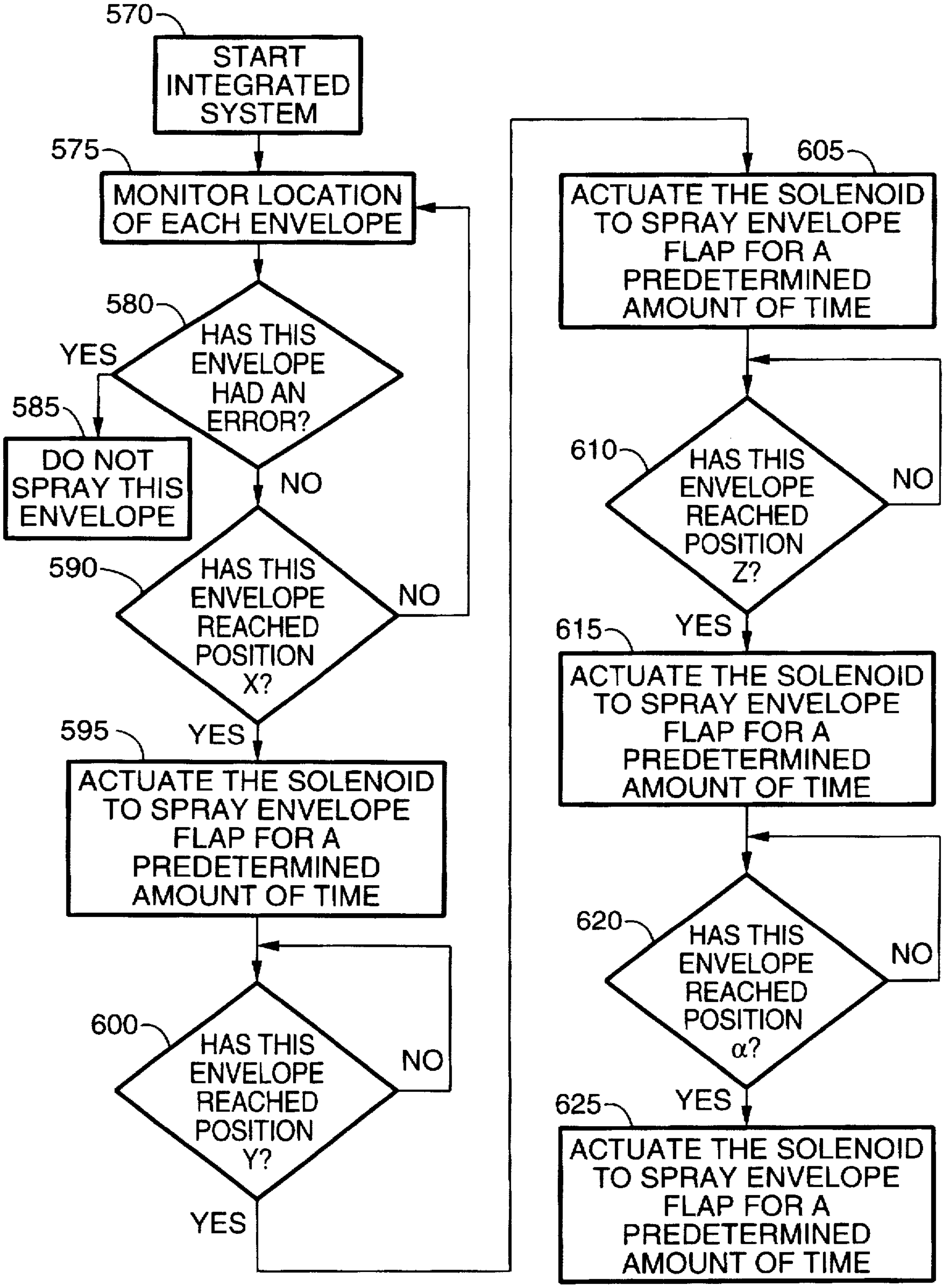
FIG. 26 is a flow diagram of the information controlling the spray unit of the subject invention.

Shown in FIG. 26 is a typical flow diagram for the information that controls the spray bursts to wet an envelope flap. Although four spray bursts are depicted in FIG. 26, this number, as noted above, can vary between one and greater values and this and other variations on the control scheme are contemplated to be within the realm of this disclosure, as applied by one skilled in the relevant art. As described above, the positional timing and placement for the envelopes traveling through the inserter I come from noting the rotation of the central timing shaft in the inserter I via a shaft encoder scheme.

The controller 205 is programmed to start the integrated wetting and sealing system 570, in particular here the wetting portion is focused in on. The computer means 10 monitors the location of each mailing envelope 575. It is determined if an error has been detected in the processing of the contents of the mailing envelope 580 and if so that envelope is not wetted 585. If no processing error is detected by the controller 205, the controller 205 establishes if the envelope has reached a rotational position "X" 590 (corresponding to a first position of the flap beneath the spraying head 515). If no is the answer to step 590, the system loops back to step 575 until satisfied and then proceeds to step 595. At step 595 the solenoid valve 542 controlling the release of spray is activated to cause the first burst of spray.

The controller 205 then verifies in step 600 that a second rotational position "Y" has been reached. If the "Y" position has not been achieved, the step loops until it has been noted and proceeds to step 605 in which a second burst of spray is actuated. The controller 205 then verifies in step 610 that a third rotational position "Z" has been reached. If the "Z" position has not been achieved, the step loops until it has been noted and proceeds to step 615 in which a third burst of spray is actuated. The controller 205 then verifies in step 620 that a fourth rotational position "$\alpha$" has been reached. If the "$\alpha$" position has not been achieved, the step loops until it has been noted and proceeds to step 625 in which a fourth, or last in this embodiment, burst of spray is actuated. The wetted envelope E then leaves the wetting area.

Figure 29:
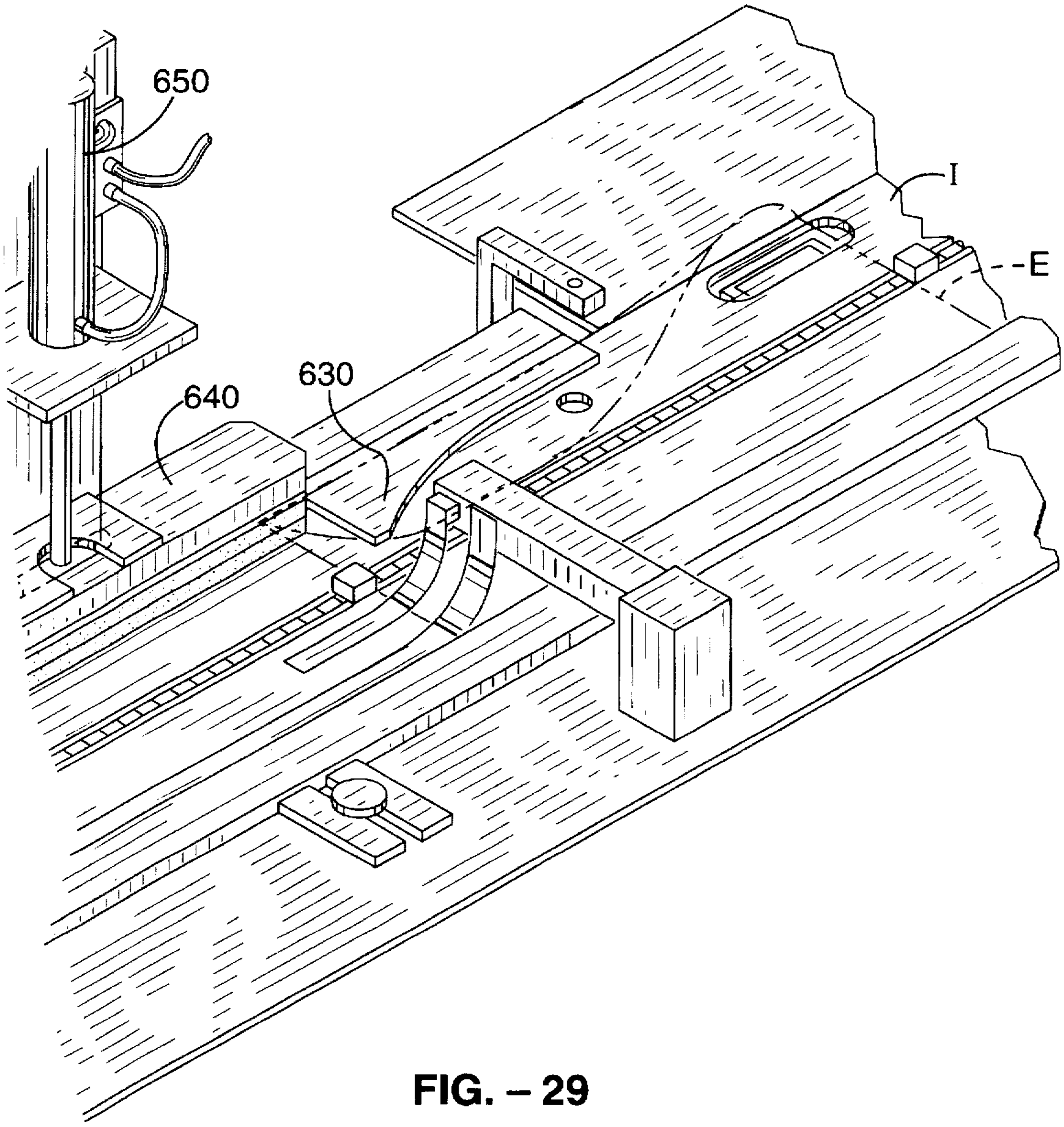
FIG. 29 is a perspective view of the flap folding means and a portion of the sealing means (for orientation purposes) of the subject invention associated with an inserter apparatus.
Figure 30:
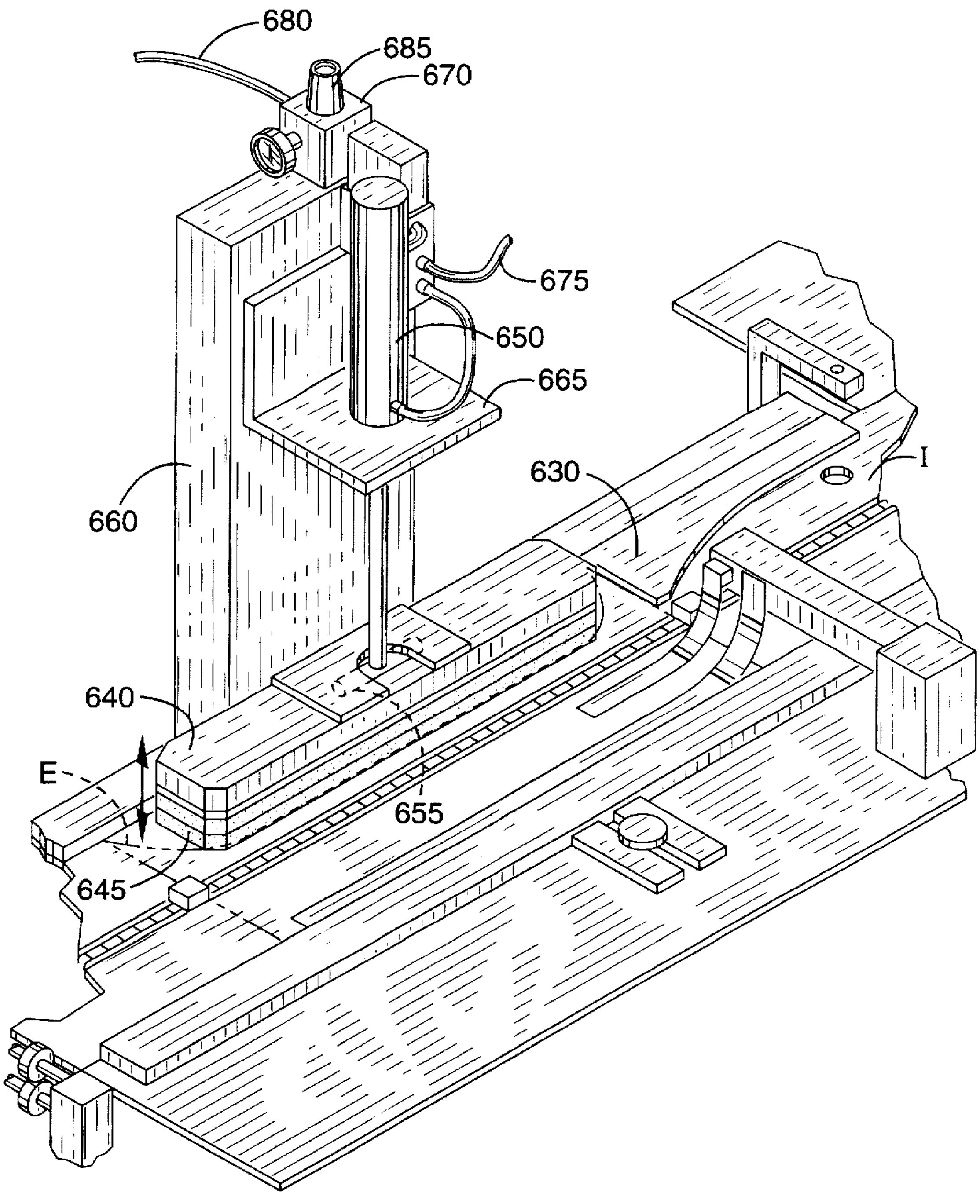
FIG. 30 is a perspective view of the sealer means of the subject invention associated with an inserter apparatus.

As seen in FIG. 29, included in the subject invention is the flap folding means comprising a contoured blade 630 that forces the wetted (or if an error is detected, a non-wetted) flap to fold along the fold region. The folding blade has a shaped lower surface that initiates and prompts the flap to fold over against the body of the envelope.

Additionally comprising the subject invention is the sealing means shown generally in FIG. 23 and in detail in FIG.

30. Each envelope E entering the sealing means has its flap either wetted or not and folded against the body of the envelope by the folding means. Preferably, the action required to seal a wetted envelope is performed on every envelope that enters the sealing means, with or without wetting, however, the sealing action can be adjusted by the controller to only occur on wetted envelopes. Comprising the sealing means is a rigid pressure foot member 640 with an attached pad 645 that cushions the impact of the foot 640 against the flap. The pressure foot member 640 presses or "stomps" the folded flap against the envelope body to cause sealing of a wetted flap. After pressing the envelope, the foot 640 is raised to release the applied pressure and the sealed envelope is then transported to subsequent processing equipment T. The foot 640 and pad 645 are sized to span enough of the envelope to cause sealing to occur.

The foot 640 activated by a solenoid unit 650 driven by standard means such as pressure, vacuum, or electricity and preferably by pressure. The foot 640 is secured to the solenoid plunger 655 which causes the up and down "stomping" motion as the solenoid is directed by the controller means to release and press, respectively. The solenoid is anchored to the inserter I by a mounting block 660 and bracket 665. The solenoid is activated by associated a control unit 670 linked to the system controller by suitable information transmissions lines or cables 675. Usually, a pressure line 680 feeds the control unit 670 with activating pressure, via a pressure regulation means 685. As the system controller 205 directs, the solenoid plunger 655 is lowered and raised. The actual pressure exerted by the solenoid on an envelope can be adjusted.

Figure 27:
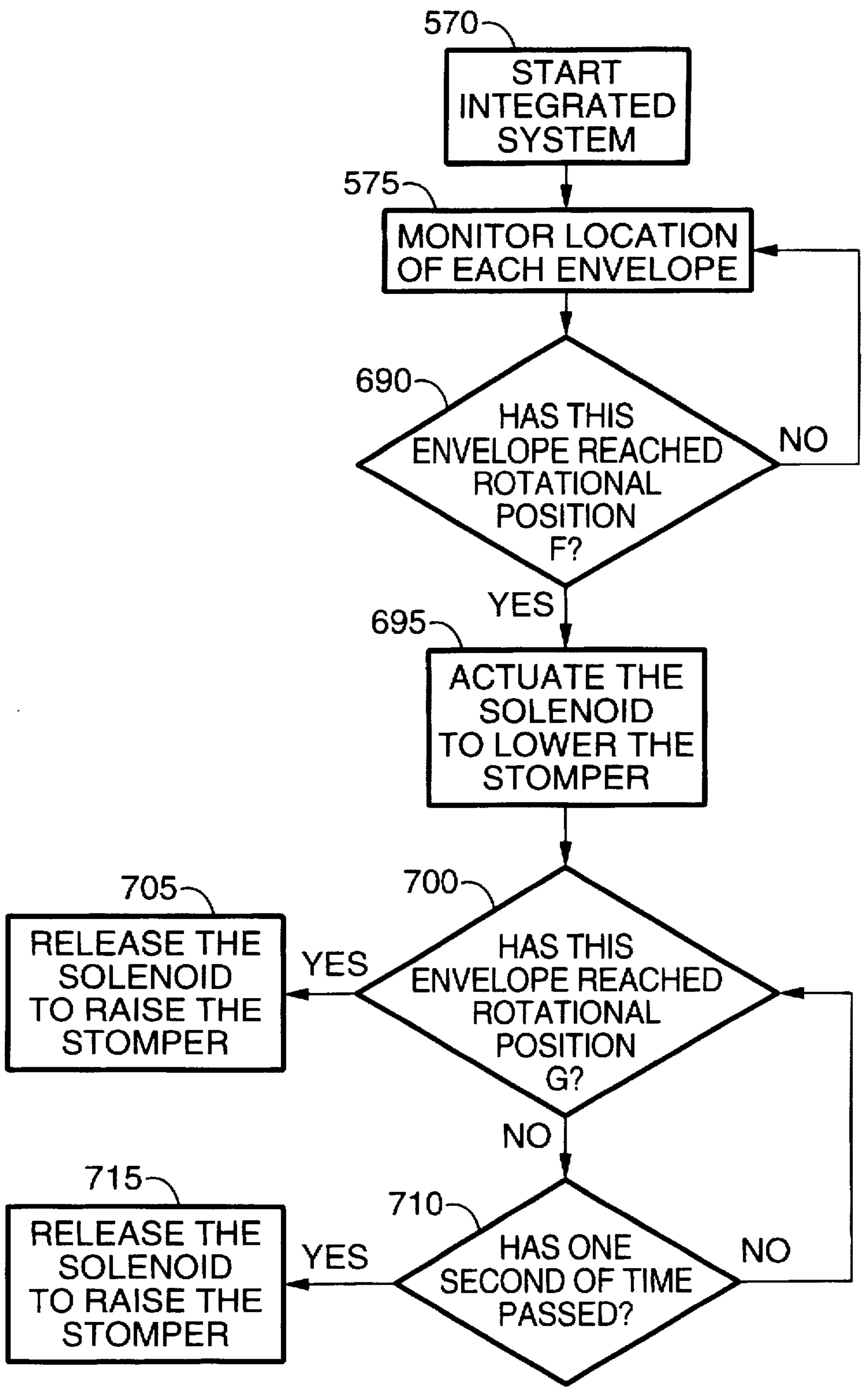
FIG. 27 is a flow diagram of the information controlling the sealer unit of the subject invention.

Shown in FIG. 27 is a typical flow diagram for the information that controls the sealing means. As indicated above, the controller 205 is programmed to start the integrated wetting and sealing system 570, in particular here the sealing portion is focused in on. As noted above, the controller 205 monitors the location of each mailing envelope 575. In step 690, the controller 205 establishes if the envelope has reached an inserter I timing shaft rotational position "F" (corresponding to a position of the envelope beneath the foot 640). If no is the answer to step 690, the system loops back to step 575 until satisfied with the position of the envelope being under the foot 640. When the envelope is below the foot 640 of the sealing means, the solenoid is activated 695.

Step 700 entails determining if the envelope (or statement packet) has reached a rotational position G on the central timing shaft of the inserter I. If the rotational position G has been achieved, step 705 is the release of the solenoid to raise the foot 640. However, if the rotational position G has not been reached, step 710 queries if a set period of time has passed, usually about one second, but the time period may be lesser or greater than one second. If the time period selected in step 710 has been passed, step 715 is the release of the solenoid to raise the foot 640.

Preferred Dynamic Motion Control (Motion Profile) Process Details

Another portion of the overall subject system comprises a method for decreasing wear and tear or mechanical degradation on an envelope inserting apparatus and thereby increasing the life of the envelope inserting apparatus. The envelope inserting apparatus or transferring means (as noted above, transferring in the sense of taking the incoming documents and inserts from the moving means or folder, assembling the mail items, and transferring the mail items to any further processing equipment) is coupled to means for printing document packets which are moved to the inserting apparatus at variable intervals. More specifically, for an inserter machine that receives packets of documents having possibly different numbers of pages within each packet and each packet is inserted into a mailing envelope, a system that efficiently coordinates the operational speed of the inserter with the period of time required to print the document pages within each incoming packet, thereby minimizing repairs to the inserter machine.

Disclosed is a system for coordinating an operational speed of an envelope inserter receiving incoming packets containing a predetermined number of document pages with an interval of time required to generate or receive each incoming packet. The system comprises means for printing the document pages within each of the packets. Additionally, controller or computer means are provided for coordinating the operational speed of the envelope inserter with the interval of time required by the printing means to generate each incoming packet (or the time needed to receive an incoming packet from a stack of pre-printed pages).

The computer means or controller is programmed with steps for determining for an incoming packet the number of document pages within the incoming packet. Further, the computer initiates operation of the inserter based on the page number determination and adjusts the operational speed of the inserter based on the page number determination.

More specifically, the controller determines for a first incoming packet the number of document pages within the first incoming packet. Also, the controller establishes for a second incoming packet following the first incoming packet the number of document pages within the second incoming packet and adjusts the operational speed of the inserter based on the page number determination for both the first and the second incoming packets.

Optionally, the controller ascertains for at least one additional incoming packet following the second incoming packet the number of document pages within the additional incoming packet and adjusts further the operational speed of the inserter based on the page determination for the additional incoming packets. Additional refinements of the subject system are noted in detail below.

Although the subject invention is functional with a wide variety of document transferring equipment that would benefit from operating at optimized speeds based on time intervals between incoming documents, preferably, utilization of the subject invention revolves around a typical inserter apparatus that places mailable items within a mailing envelope and associated equipment such as folders, collators, and the like as described several times above. Referring now to FIG. 17, once again, for illustrative purposes there is shown a typical and simplified insertion system 310 that is utilized for controlling, generating, moving, and transferring by including selected inserts in mailed statements. Generally, utilized for the illustrative insertion system is a document preparation apparatus or duplex printer PR, document collating and folder means CF, controller 205, and inserter apparatus I.

By way of example for bulk mailing situations, billing statements having one to a plurality of document pages are produced, according to prepared data, by the shown printer PR, that is a duplex printer (shown here) or a simplex printer (not shown here). More than one printer feed sheets together via the noted CF collating and folding means shown in FIG. 17 and described in detail above), collated and folded by suitable means CF, and inserted, via a conveyor belt system 340 or its equivalent, into the mailing envelope by the inserter I, along with other envelope inserts held within various hoppers H to produce a mailing item 342. The inserter I not only fills the envelope with selected documents, it transfers each mail item between the folder and the next processing stage (not shown in FIG. 17) such as mailing or shipping trays and the like.

Although the preferred manner for operating the subject invention is to have the duplex printer PR coupled immediately, via the collator and folder CF, to the inserter I, the printing of the documents could be done off-line and a stack of the documents with different page counts could then be sent through the collator and folder CF to the inserter I. Thus, when the term "generating" a document is employed in this disclosure, it refers to situations in which the relevant documents are either printed immediately before being handled by the collator and folder CF or printed separately partially separately (simplex of some pages and duplex of other pages) and then handled at a later time by the folder, under direction by the controller 205 which has information concerning the exact page count for each bill. In either case, a greater time is required to move a complete multiple page bill from the printer or stack to the inserter I than for a one page bill.

One example of a commercially available printer PR which can be interfaced (via a moving means) with the inserter apparatus I and controlling computer 205 for use with the subject invention is the above noted DELPHAX SYSTEMS 300IE printer and post-processing system interface.

As indicated above, the invention also includes a transferring means or inserter apparatus I which has means for mechanically interfacing to the printer PR. The mechanical interface means that moves the items from the printer PR to the inserter I preferably includes mail item moving means in the form of a transfer tray, collator, or folder.

The overall subject system 310 is driven by suitable data processing means, often in the form of a microprocessor, personal computer 205, or other equivalent means, connected to the system 310 (including printer PR, inserter I, and other associated components) by suitable and standard interfacing means for communication. As indicated above, the controller 205 generally includes standard data input means, such as keyboard, floppy disk drives and equivalent means, and interface cables, as well as existing or future data storage means and data display means. Preferably, the controller 205 is proximate to mail handling components of the subject invention or, optionally, located in a separate computer room to isolate the operator from noise associated with mail item preparation.

The collator, folder CF and the transferring means or inserter I are driven by integrated system controlling means, preferably in the form of integrated system controller 205. Interfacing communication means, preferably in the form of network linking means such as ethernet interface and parallel interface provide data communication from the printer PR to system controller computer 205. Interfacing communication means allows control instructions from system controller computer 205 to be directed to inserter apparatus I. The system controller 205 generally includes means for monitoring the position and movement of mail items along the inserter apparatus I (similar means are usually included in the printer PR and collator and folder CF for monitoring the position and movement pages within the printer PR and collator-folder CF). The monitoring means is typically in the form of one or more photocell detectors or other equivalent position detecting means, which note the presence or absence of mail items at particular locations on the inserter I.

Information shared between the printer PR and the controller 205 includes how many document pages will be present in any given billing statement packet. Since the controller 205 also operates the inserter I, the controller 205 is in a position to maximize the efficiency of the operational speed of the inserter I, in relation to the size of an incoming packet. A typical transferring means or inserter I is the PHILLIPSBURG inserter mentioned several times above, but other equivalent machines are acceptable for use with the subject process. The speed of the inserter is determined by noting with appropriated means the position of the inserter shaft angle.

By looking "up-stream" into the oncoming flow of document packets being created by the printer PR (including the single summary page generated by the simplex printer and any additional summary pages printed by the duplex printer), the subject invention permits a synchronicity of the operational speed of the inserter I to match the variable speed of the incoming stream of document packets from the printer PR or printers, via the collator, which is generally the time required to receive the packets. Generally, the controller 205 "looks" or processes page count and timing factors for: 1) the packet arriving at the inserter I from the printer PR; 2) the packet being generated by the printer PR which will immediately follow item 1; and 3) the packet that is produced by the printer PR which will immediately follow item 2. Should a preprinted stack of document pages be utilized instead of freshly printed pages, the controller 205 would adjust to process suitable page count and timing factors for the moving of the pages from the stack to the inserter I or generally the time required to receive the pages from the stack. The controller 205 analyzes the information, in view of a subject algorithm, described by example below, and adjusts the speed of the inserter I. If a "finer tuning" for the operational speed of the inserter I is required or desired, the subject controller 205 may look even further upstream than only the next packet to be produced and incorporate this data into the process.

Figure 31:
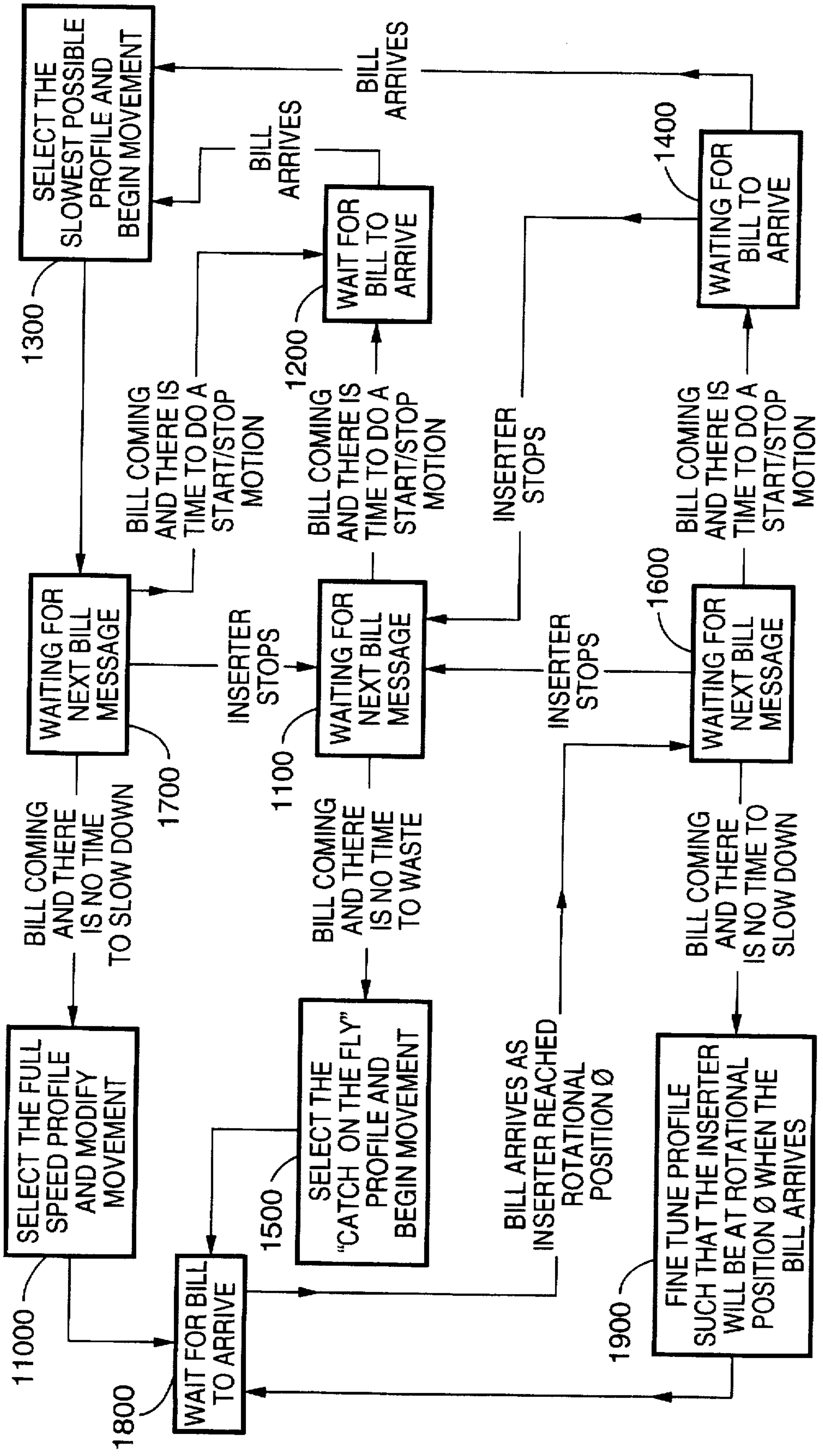
FIG. 31 is a state diagram or machine illustrating the operational steps comprising an embodiment of the subject invention.

Specifically, FIG. 31 shows a state diagram or machine illustrating the typical operational steps comprising a preferred embodiment of the subject invention and initiated by the controller 205. The system controller or computer 205 is programmed with an algorithm that starts the operation of and controls the speed of the transferring means or inserter I in a manner that produces an inserter that runs as slowly as is reasonable for any given document packet size (packet size reflecting the number of pages within the packet and the time required to print the packet). The speed of the moving means or collator-folder CF is not normally altered by the subject system. For illustrative purposes only and not by limitation, each document packet will be a billing statement or bill. Since, in actual practice, most bills are large enough (require a significant amount of time to print) that the inserter I would run too slowly if the slowest possible inserter speed was used, most inserter I motions are of a start/stop nature. That is, the inserter finishes a cycle and comes to a complete stop before the next bill arrives.

For smaller bills, the subject system inserter speed control algorithm will cycle the inserter at a speed that will catch the bill while the machine is still in motion from the last bill (controlled operation speed variations combined with adjustments as to when each insert cycle is initiated). This requires very precise control of the machine's speed and knowledge of the time between bills. Because of this, the actual details of the implementation varies among different printers and/or printer speeds for any one printer.

The following example incorporates the FIG. 31 state diagram with individual steps and illustrates how the subject speed control system functions for a printer that operates at approximately 340 ms between bill pages or a maximum of approximately 3 pages per second. Other time intervals are within the realm of the subject invention, including times necessary merely to move pages within a preprinted stack of documents to the inserter I via the moving means CF. The subject invention programming within the controller 205 permits the operational decisions necessary for the system to operate. For this example, it will be assumed that the following sequence of bills is produced by the printer:

REST-2 pages-2 pages-5 pages-1 page-1 page-2 pages-1 page-REST

Steps:

1. The system is at rest, so the state diagram is at Circle 1100 of FIG. 31 (all of the "Circle" references denote location in the FIG. 31 state diagram). In Circle 1100, the system is waiting for information for the next bill concerning the number of pages it contains.

2. As the sequence of bills example above indicates, a two page bill is coming first, followed by another two page bill, and then a five page bill. This allows time to do a start/stop motion for the first bill on the inserter I, so the state diagram advances to Circle 1200. The inserter I waits for the bill to arrive. It is noted that should the second or third bill be only one page in length (not shown in the above sequence example), then there would not be enough time to do a start/stop motion on the inserter and the state diagram would advance to Circle 1500 instead of Circle 1200. The procedure noted in Circle 1500 is a "catch on the fly" profile that accommodates that there is no time to waste with a one page bill immediately following the one that is coming. After the "catch on the fly" procedure, the state diagram advances to Circle 1800 discussed in detail below.

3. The current two page bill arrives at the inserter I. The state diagram advances to Circle 1300.

4. Select a speed for the inserter that results in an approximately 1700 ms cycle time. Given the approximately 340 ms timing of the proposed printer, the 700 ms results in continuous motion for a stream of two page bills. The state diagram advances to Circle 1700.

5. Noting the above sequence of bills, another two page bill is coming to the inserter I. The state diagram advances to Circle 1200.

6. The current two page bill arrives at the inserter I. The state diagram advances to Circle 1300.

7. The same inserter speed as in step 4 is used again for this two page bill. The inserter I has not come to a complete stop, therefore, the resulting cycle time is less than approximately 700 ms. This results in making up some of the error introduced by not completing the cycle before the arrival of this bill. If there was a long stream of two page bills, the error would eventually be eliminated and the inserter I would stop before the next bill arrived. This technique is utilized for two and three page bills and results in a much smoother motion of the inserter I. For example, see the second timing graph or diagram discussed below and seen in FIG. 32B. The state diagram advances to Circle 1700.

8. The controller detects that a five page bill is coming. This five page bill is followed by a one page bill Thus, there is no time to use a start/stop motion by the inserter I on the five page bill before the one page bill arrives. The state diagram advances to Circle 11000.

9. The controller 205 records or stores the time at which the five page bill leaves the folder. This time is used for adaptive speed control in step 12 below. The controller 205 selects a speed that results in the inserter I running at full speed when the five page bill arrives at the inserter I. The full speed start times and velocities are carefully calculated to make sure that the inserter I will never exceed the top speed of approximately one cycle/340 ms, for the exemplary printer PR. Because it takes the inserter I more than approximately 340 ms to accelerate to full speed from a complete stop, an empty slot (in the conveyor sequence) will be created before the five page bill arrives at the inserter I. The state diagram advances to Circle 1800.

10. The five page bill arrives as the inserter I reaches full speed and is at rotational position denoted as "0" which is needed to catch the bill. The state diagram advances to Circle 1600

11. The first one page bill is coming to the inserter I. The controller 205 detects and stores the time at which the one page bill exits the folder. Since the bill is only one page, no time exists to slow the inserter I down. The state diagram advance to Circle 1900.

12. The controller 205 fine tunes the speed of the inserter I to generate a suitable speed profile. This fine tuning accommodate the fact that the one page bill is not exactly 340 ms behind the five page bill (transport, folding, and like variations introduce this difference in timing). The times recorded for the actual exiting of bills from the folder are employed in this process. The state diagram advances to Circle 1800.

13. The first one page bill arrives at the inserter I. The inserter I is at rotational position denoted as "0." The state diagram advances to Circle 1600.

14. The second one page bill (see sequence noted above) is detected as coming. The controller 205 stores the time at which the bill exits the folder. The state diagram advances to Circle 1900.

15. Once again the controller 205 adjusts the speed of the inserter I to allow for the fact that the bills are not exactly 340 ms apart. The state diagram advances to Circle 1800.

16. The second one page bill arrives at the inserter I. The inserter I is at rotational position denoted as "0." The state diagram advances to Circle 1600.

17. The controller 205 notes that a two page bill is coming next from the printer PR. If the bill after this two page bill was greater than one page (in fact it is one page), the inserter I would be directed to slow down. But, if the inserter I slows down for the two page bill, it would not be able to speed back up in time for the actual one page bill that follows it in the exemplary sequence. The controller 205 records or stores the exit time from the folder for the two page bill. The state diagram advances to Circle 1900.

18. The controller 205 makes the fine tuning adjustments to the speed of the inserter I to allow for the fact that the bills are not exactly 680 ms (2×340 ms) apart. In this example, since the next bill is a two page bill, an empty slot will occur in the conveyor system of the inserter I. The state diagram advances to Circle 1800.

19. The two page bill arrives at the inserter I. The state diagram advances to Circle 1600.

20. The controller 205 notes that another one page bill is coming, but since there is no bill behind it. This still requires a full speed cycle, since this bill will arrive at the inserter I 340 ms after the previous one. The controller 205 records or stores the time at which the bill exits the folder. The state diagram advances to Circle 1900. (Had there been time to do a start/stop because of the next bill being of sufficient size, the controller 205 would have recorded the time at which the bill exited the folder and the state diagram would have advanced to Circle 1400. Following Circle 1400, the state diagram would have then proceeded to Circle 1300 and then Circle 1700 before ending at Circle 1100.)

21. Once again the controller 205 adjusts the speed of the inserter I to allow for the fact that the bills are not exactly 340 ms apart. The state diagram advances to Circle 1800.

22. The last one page bill arrives at the inserter I. The inserter I is at rotational position denoted a "0." The state diagram advances to Circle 1600.

23. No more bill messages arrive, therefore, the inserter I comes to a stop or rest. The state diagram advances to Circle 1100.

Figure 32A:
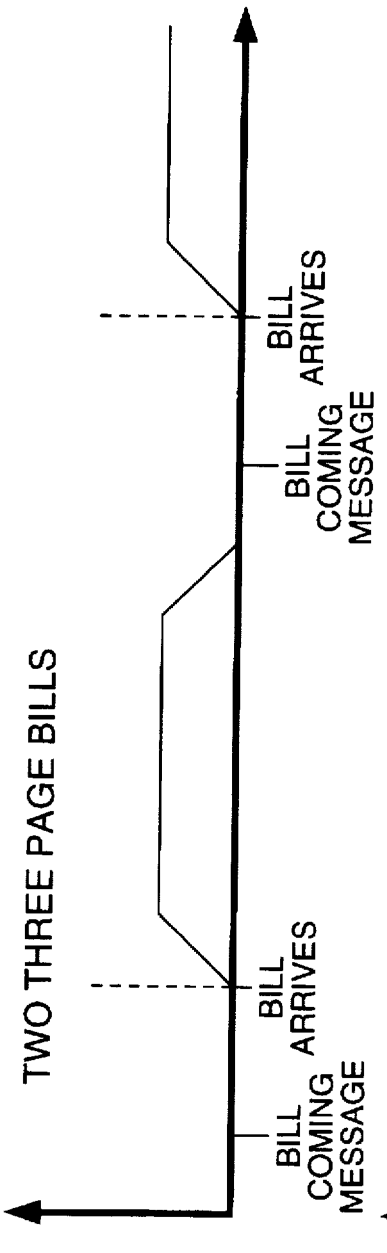
FIG. 32A is a timing graph for the subject invention operating on a first three page packet followed by a second three page packet.
Figure 32B:
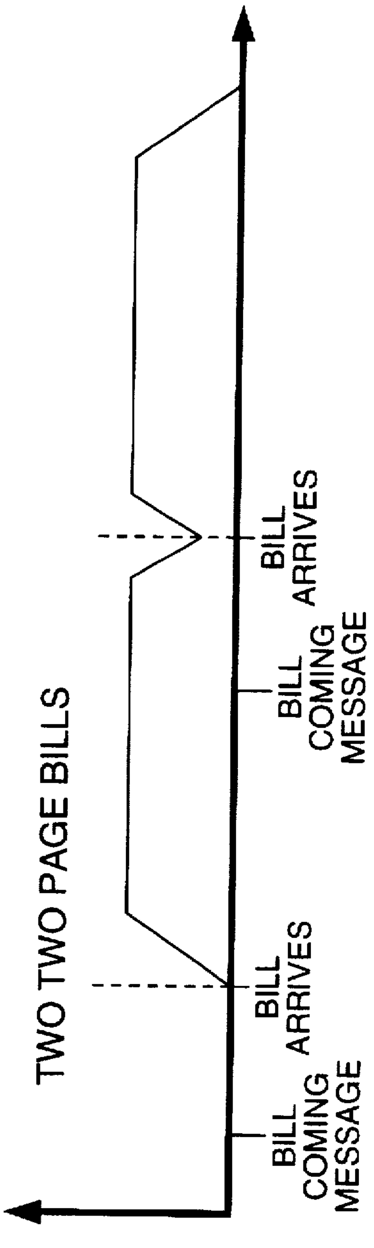
FIG. 32B is a timing graph for the subject invention operating on a first two page packet followed by a second two page packet.
Figure 32C:
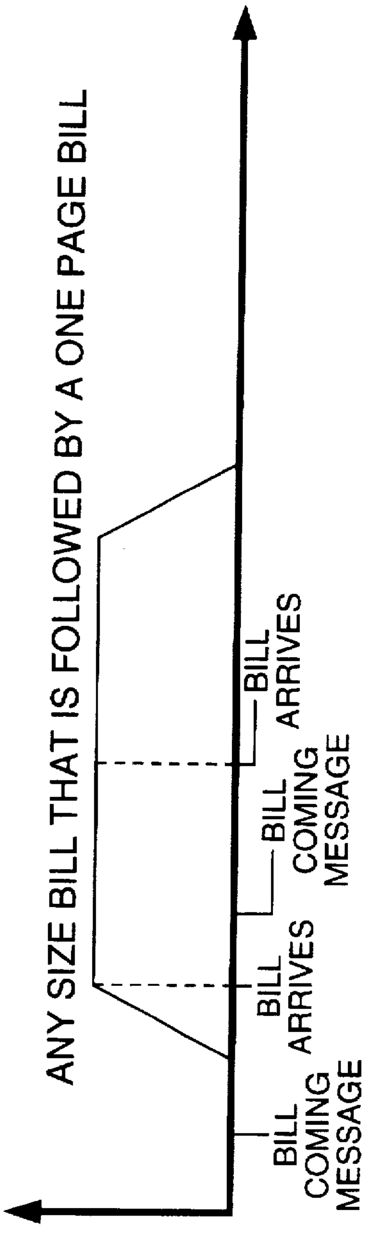
FIG. 32C is a timing graph for the subject invention operating on a first packet having any number of pages followed by a second one page packet.

To further clarify the subject inventions, three timing diagrams are presented in FIGS. 32A, 32B, and 32C. Each diagram has inserter velocity on the vertical axis and time on the horizontal axis. FIG. 32A illustrates a typical timing profile utilized by the subject system for processing two sequential three page bills. The inserter has sufficient time to operate under the stop/start mode and the velocity of the inserter is selected to be as slow as practicable.

FIG. 32B depicts a typical timing profile used by the subject system for handling two sequential two page bills (see step 7 above). Since less time is available between bills, the inserter velocity is higher in FIG. 32B case than in the FIG. 32A situation. The second bill is caught as the inserter is in the process of accelerating.

FIG. 32C portrays the situation in which the initial bill in a two bill sequence is of any page size and second bill is a one page bill. Since the one page bill arrives only about 340 ms after the first bill, no time exists for a start/stop motion. The overall velocity for this option is the highest of the three depicted cases.

The invention, both the overall total system and the component subsystems have now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A bulk mailing system for controlling and processing mailing envelopes with each mailing envelope containing enclosures selected from combinations of inserts and a document having one or more pages, comprising:

a) a controller;

b) at least one document page supplying device;

c) a collator for merging supplied document pages if document pages are supplied by more than one said document page supplying device or for passing on document pages if supplied from one said document page supplying device, wherein the collator is in communication with said controller;

d) collator input control means for supervising collation of the document by said collator and indicating when the document is ready to be sent on to an inserter; and e) said inserter for filling the mailing envelopes with the enclosures, wherein said inserter is in communication with said controller.

2. A bulk mailing system for controlling and processing mailing envelopes with each mailing envelope containing enclosures selected from combinations of inserts and a document having one or more pages, comprising:

a) a controller;

b) a plurality of document page supplying devices;

c) a collator for merging document pages from said document page supplying devices into the document, wherein said collator is interfaced with said controller;

d) collator input control means for supervising collation of the document by said collator and indicating when the document is ready to be sent on to an inserter; and e) said inserter for filling the mailing envelopes with the enclosures, wherein said inserter is in communication with said controller.

3. A bulk mailing system for controlling and processing mailing envelopes according to claim 2, wherein said controller is a programmable computer.

4. A bulk mailing system for controlling and processing mailing envelopes according to claim 2, wherein said plurality of document supplying devices comprises a plurality of printers.

5. A bulk mailing system for controlling and processing mailing envelopes according to claim 2, wherein said plurality of document supplying devices comprises a first printer and a second printer.

6. A bulk mailing system for controlling and processing mailing envelopes according to claim 2, further comprising means selecting the enclosures in the mailing envelopes.

7. A bulk mailing system for controlling and processing mailing envelopes according to claim 2, further comprising controller interfaced means associated with said inserter for marking edges of envelopes with desired information indicia.

8. A bulk mailing system for controlling and processing mailing envelopes according to claim 2, further comprising controller interfaced means associated with said inserter for wetting and sealing flaps of selected envelopes wherein said wetting and sealing means comprises for said sealing means a reciprocating pressure foot that presses a wetted envelope flap against a body of each of the mailing envelopes and raises to release a sealed mailing envelope.

9. A bulk mailing system for controlling and processing mailing envelopes according to claim 2, further comprising controller interfaced means for coordinating an operational speed of said inserter with an interval of time required to receive each document.

10. A bulk mailing system for controlling and processing mailing envelopes according to claim 9, wherein said coordinating means is a controller with programming comprised of the steps:

a) determining for an incoming document the number of document pages within said document;

b) initiating operation of said inserter based on said page number determination; and c) adjusting the operational speed of said inserter based on said page number determination.

11. A bulk mailing system for controlling and processing mailing envelopes with each mailing envelope containing enclosures constituting selected combinations of inserts and a document having one or more pages, comprising:

a) a programmable computer controller;

b) a plurality of printers with each printer generating printed document pages;

c) a collator having a plurality of collator trays for merging document pages from said printers, wherein said collator is interfaced with said controller;

d) collator input control means for supervising collation of the document by said collator and indicating when the document is ready to be sent on to an inserter; and e) said inserter for filling the mailing envelopes with the enclosures, wherein said inserter is in communication with said controller.

12. A bulk mailing system for controlling and processing mailing envelopes according to claim 11, wherein said plurality of printers comprises first and second printers.

13. A bulk mailing system for controlling and processing mailing envelopes according to claim 11, further comprising means for selecting the enclosures in the mailing envelopes.

14. A bulk mailing system for controlling and processing mailing envelopes according to claim 11, further comprising controller interfaced means associated with said inserter for marking edges of envelopes with desired information indicia.

15. A bulk mailing system for controlling and processing mailing envelopes according to claim 11, further comprising controller interfaced means associated with said inserter for wetting and sealing flaps of selected envelopes wherein said wetting and sealing means comprises for said sealing means a reciprocating pressure foot that presses a wetted envelope flap against a body of each of the mailing envelopes and raises to release a sealed mailing envelope.

16. A bulk mailing system for controlling and processing mailing envelopes according to claim 11, further comprising controller interfaced means for coordinating an operational speed of said inserter with an interval of time required to receive each document.

17. A bulk mailing system for controlling and processing mailing envelopes according to claim 16, wherein said coordinating means is a controller with programming comprised of the steps:

a) determining for an incoming document the number of document pages within said document;

b) initiating operation of said inserter based on said page number determination; and c) adjusting the operational speed of said inserter based on said page number determination.

18. A bulk mailing system for controlling and processing mailing envelopes with each mailing envelope containing enclosures constituting a combination of inserts and a billing document, wherein the billing document has at least a summary billing page and, if selected, one or more detailed billing pages, comprising:

a) a programmable computer controller;

b) a first printer for printing summary billing information on the summary billing page;

c) a second printer for printing detailed billing information on selected detail billing pages;

d) a collator for merging into the billing document the summary billing page with any selected detailed billing pages, wherein said collator is interfaced with said controller;

e) collator input control means for supervising collation of the document by said collator and indicating when the document is ready to be sent on to an inserter; and f) said inserter for filling each of the mailing envelopes with the selected combination of the inserts and the billing document, wherein said inserter is in communication with said controller.

19. A bulk mailing system for controlling and processing mailing envelopes according to claim 18, further comprising means for selecting the enclosures in the mailing envelopes.

20. A bulk mailing system for controlling and processing mailing envelopes according to claim 18, further comprising controller interfaced means associated with said inserter for marking edges of envelopes with desired information indicia.

21. A bulk mailing system for controlling and processing mailing envelopes according to claim 18, further comprising controller interfaced means associated with said inserter for wetting and sealing flaps of selected envelopes wherein said wetting and sealing means comprises for said sealing means a reciprocating pressure foot that presses a wetted envelope flap against a body of each of the mailing envelopes and raises to release a sealed mailing envelope.

22. A bulk mailing system for controlling and processing mailing envelopes according to claim 18, further comprising controller interfaced means for coordinating an operational speed of said inserter with an interval of time required to receive each document.

23. A bulk mailing system for controlling and processing mailing envelopes according to claim 22, wherein said coordinating means is a controller with programming comprised of the steps:

a) determining for an incoming document the number of document pages within said document;

b) initiating operation of said inserter based on said page number determination; and c) adjusting the operational speed of said inserter based on said page number determination.

24. A bulk mailing system for controlling and processing mailing envelopes with each mailing envelope containing enclosures constituting a combination of inserts and a billing document, wherein the billing document has at least a summary billing page and, if selected, one or more detailed billing pages, comprising:

a) a programmable computer controller;

b) a first printer for printing summary billing information on the summary billing page;

c) a second printer for printing detailed billing information on selected detail billing pages;

d) a collator for merging into the billing document the summary billing page with any selected detailed billing pages, wherein said collator is interfaced with said controller;

e) a folder after said collator for folding said billing document;

f) an inserter after said folder for filling each of the mailing envelopes with the selected combination of the inserts and the billing document, wherein said inserter is in communication with said controller;

g) means associated with said inserter and communicating with said controller for wetting and sealing flaps of selected mailing envelopes wherein said wetting and sealing means comprises for said sealing means a reciprocating pressure foot that presses a wetted envelope flap against a body of each of the mailing envelopes and raises to release a sealed mailing envelope; and h) means associated with said inserter and communicating with said controller for marking edges of the mailing envelopes with desired information indicia.

25. A bulk mailing system for controlling and processing mailing envelopes according to claim 24, further comprising means for verifying that correct document forms, inserts, and mailing envelopes are inserted into the mailing envelopes.

26. A bulk mailing system for controlling and processing mailing envelopes according to claim 24, further comprising means for selecting the combination of enclosures in the mailing envelopes.

27. A bulk mailing system for controlling and processing mailing envelopes according to claim 24, further comprising controller interfaced means for coordinating an operational speed of said inserter with an interval of time required to receive each document.

28. A bulk mailing system for controlling and processing mailing envelopes according to claim 27, wherein said coordinating means is a controller with programming comprised of the steps:

a) determining for an incoming document the number of document pages within said document;

b) initiating operation of said inserter based on said page number determination; and c) adjusting the operational speed of said inserter based on said page number determination.

* * * * *